United States Patent
Hirasawa et al.

(10) Patent No.: US 10,775,506 B2
(45) Date of Patent: Sep. 15, 2020

(54) IMAGING SYSTEM

(71) Applicant: Panasonic Intellectual Property Management Co., Ltd., Osaka (JP)

(72) Inventors: Taku Hirasawa, Kyoto (JP); Yasuhisa Inada, Osaka (JP); Akira Hashiya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 391 days.

(21) Appl. No.: 15/840,468

(22) Filed: Dec. 13, 2017

(65) Prior Publication Data

US 2018/0217258 A1 Aug. 2, 2018

(30) Foreign Application Priority Data

Jan. 31, 2017 (JP) .................. 2017-015684

(51) Int. Cl.
  *G01S 17/86* (2020.01)
  *G02F 1/295* (2006.01)
  (Continued)

(52) U.S. Cl.
  CPC ............ *G01S 17/86* (2020.01); *G01S 7/4817* (2013.01); *G01S 7/4818* (2013.01);
  (Continued)

(58) Field of Classification Search
  CPC ...... G01S 17/86; G01S 7/4817; G01S 7/4818; G01S 7/4863; G01S 7/4865; G01S 17/10; G01S 17/42; G01S 17/89; G02F 1/2955
  (Continued)

(56) References Cited

U.S. PATENT DOCUMENTS

| 4,950,880 A * | 8/1990 | Hayner ............... G01S 17/90 250/201.9 |
| 5,815,615 A * | 9/1998 | Taneya .............. G02B 6/12004 385/50 |

(Continued)

FOREIGN PATENT DOCUMENTS

| JP | 2002-039716 | 2/2002 |
| JP | 2002-174683 | 6/2002 |

(Continued)

OTHER PUBLICATIONS

Gu, Xiaodong et al., "Electro-Thermal Beam Steering Using Bragg Reflector Waveguide Amplifier," Japanese Journal of Applied Physics, 2012, vol. 51, 020206-1-020206-3.

(Continued)

*Primary Examiner* — Isam A Alsomiri
*Assistant Examiner* — Kimberly Jasmin Ramasarup
(74) *Attorney, Agent, or Firm* — McDermott Will & Emery LLP

(57) ABSTRACT

An imaging system includes a light-emitting device, an image sensor, and a control circuit. The light-emitting device includes a light source, a first waveguide that propagates light from the light source by means of total reflection, a second waveguide, and a first adjustment element. The control circuit causes the light source to repeatedly emit light pulses. Further, the control circuit causes at least some of the plurality of photo-detection cells to accumulate the signal charge in synchronization with the emission of the light pulses and thereby causes the image sensor to generate every first period of time a frame based on the signal charge thus accumulated. Furthermore, the control circuit causes the first adjustment element to change the direction of the emitted light from the second waveguide every second (Continued)

period of time that is shorter than or equal to half the first period of time.

19 Claims, 50 Drawing Sheets

(51) Int. Cl.
    *G01S 17/10*     (2020.01)
    *G01S 7/481*     (2006.01)
    *G01S 7/4865*     (2020.01)
    *G01S 17/89*     (2020.01)
    *G01S 17/42*     (2006.01)
    *G01S 7/4863*     (2020.01)

(52) U.S. Cl.
    CPC .......... *G01S 7/4863* (2013.01); *G01S 7/4865* (2013.01); *G01S 17/10* (2013.01); *G01S 17/42* (2013.01); *G01S 17/89* (2013.01); *G02F 1/2955* (2013.01)

(58) Field of Classification Search
    USPC ...................................... 356/5, 5.01
    See application file for complete search history.

(56) References Cited

U.S. PATENT DOCUMENTS

2013/0009177 A1    1/2013   Chang et al.
2015/0301177 A1*  10/2015  Tsukamoto ........... G01S 7/4865
                                                356/5.03

FOREIGN PATENT DOCUMENTS

| | | |
|---|---|---|
| JP | 2012-163642 | 8/2012 |
| JP | 2013-016491 | 1/2013 |
| JP | 2013-016591 | 1/2013 |
| WO | 2013/168266 | 11/2013 |
| WO | 2014/110017 | 7/2014 |

OTHER PUBLICATIONS

Nakamura, K. et al., "Slow-light Bragg reflector waveguide array for two-dimensional beam steering," Japanese Journal of Applied Physics, 2014, vol. 53, 038001-1-038001-3.

* cited by examiner

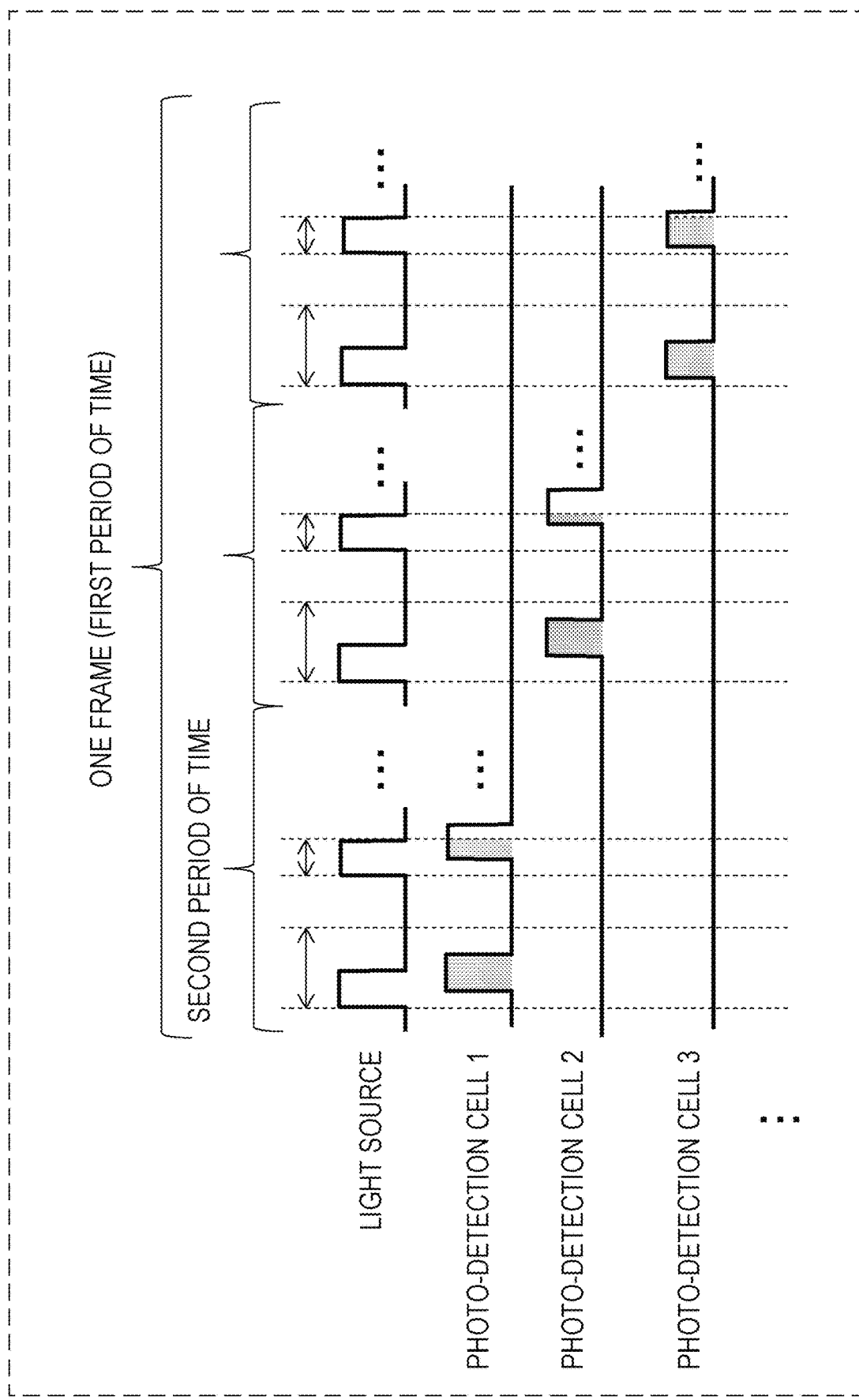

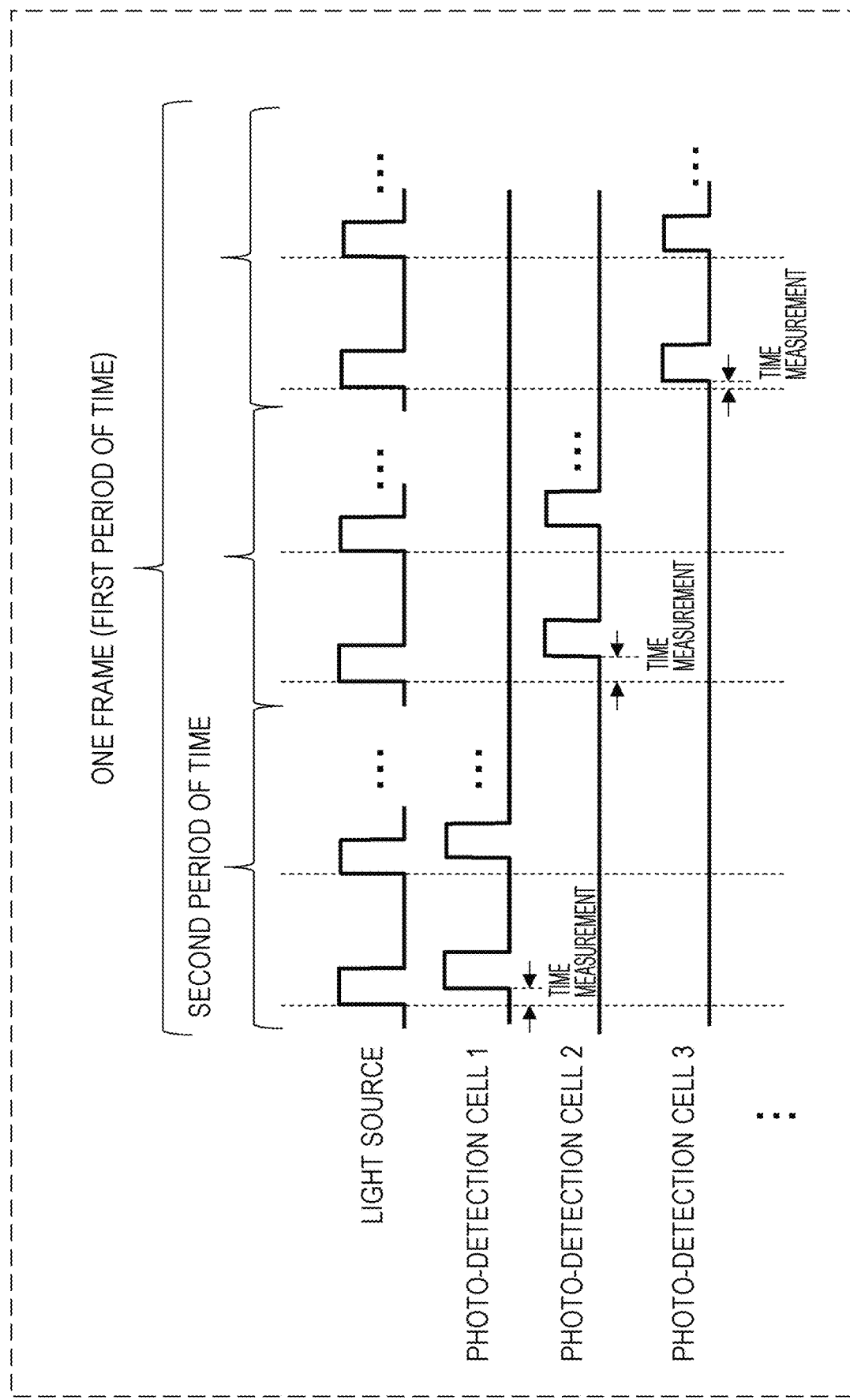

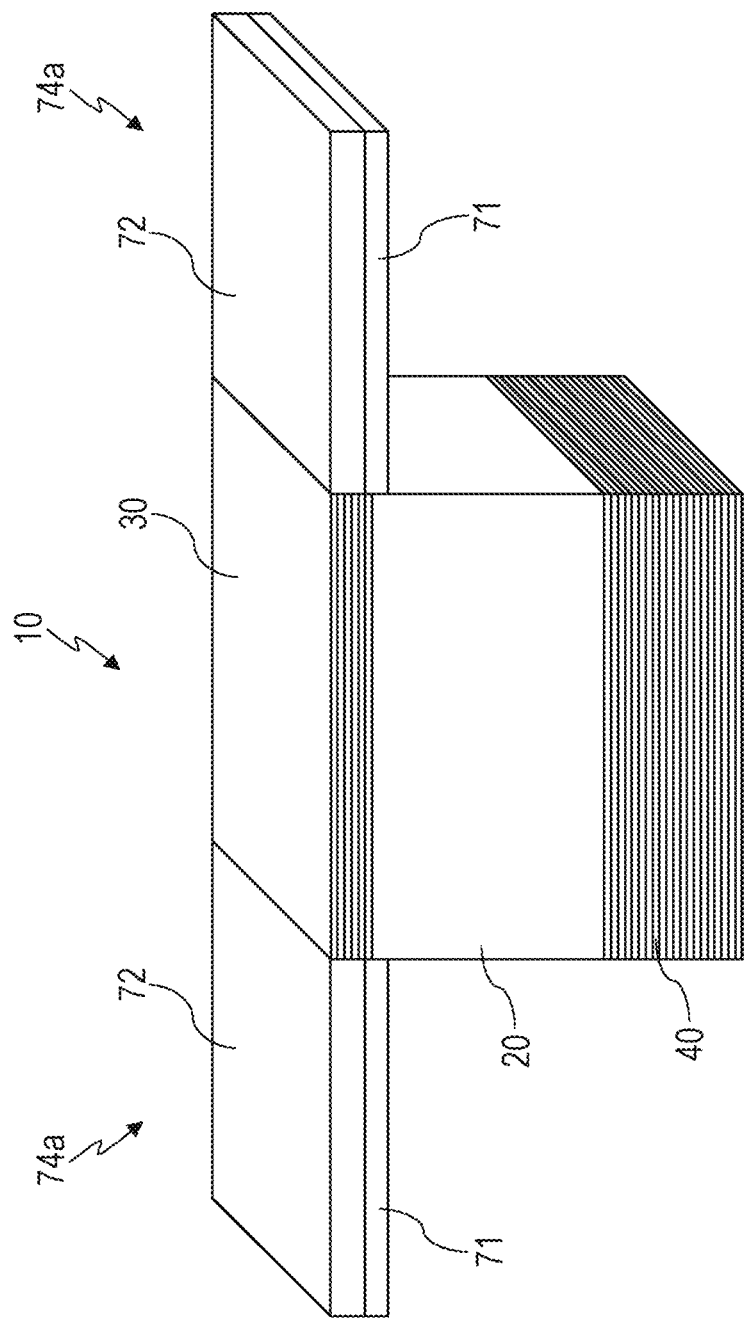

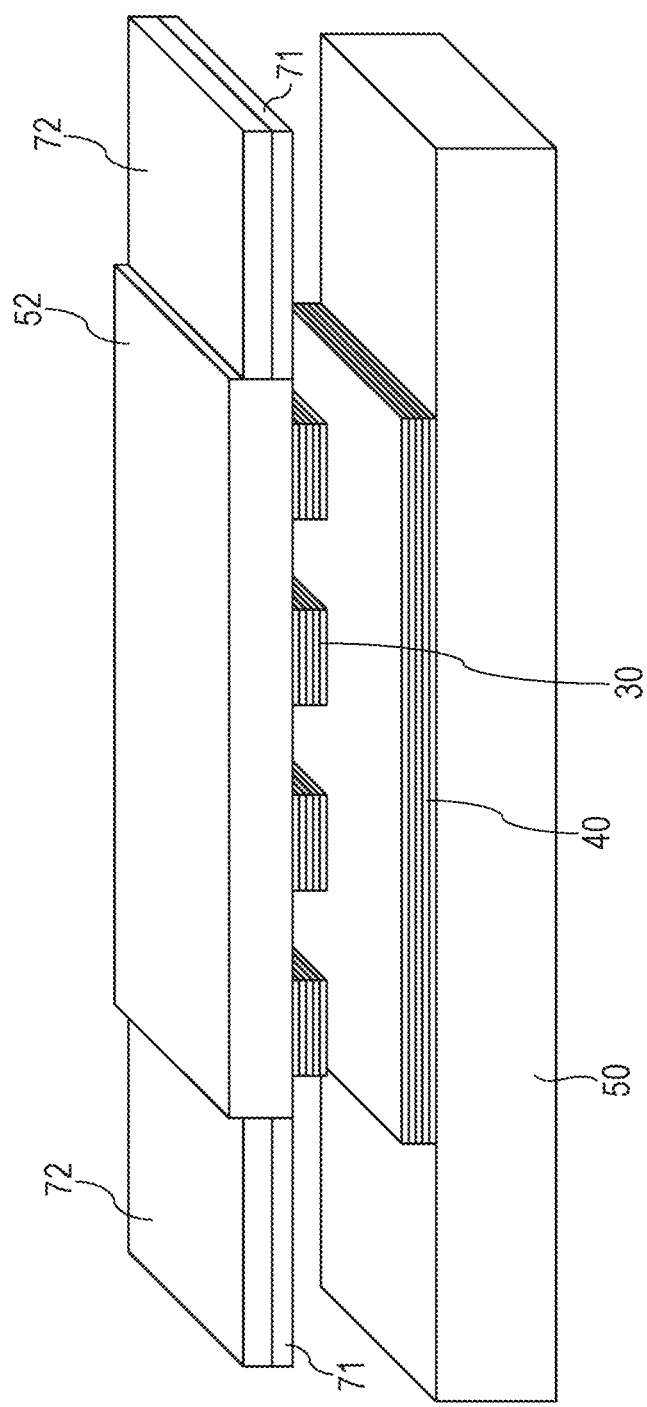

AIR n = 1

WAVEGUIDE

AIR n = 1

IMAGING SYSTEM

BACKGROUND

1. Technical Field

The present disclosure relates to an imaging system.

2. Description of the Related Art

Conventionally, there have been proposed various devices that can pass across (i.e., scan) a space with light.

International Publication No. 2013/168266 discloses a configuration in which a scan with light can be performed by using a driving apparatus that rotates a mirror.

Japanese Unexamined Patent Application Publication (Translation of PCT Application) No. 2016-508235 discloses an optical phased array including a plurality of two-dimensionally arrayed nanophotonic antenna elements. Each of the antenna elements is optically coupled to a variable optical delay line (phase shifter). In this optical phased array, a coherence light beam is guided to each of the antenna elements by a waveguide, and the phase of the light beam is shifted by the phase shifter. According to the disclosure, this makes it possible to vary an amplitude distribution of a far-field radiation pattern.

Japanese Unexamined Patent Application Publication No. 2013-16491 discloses an optical deflecting element including: a waveguide including an optical guiding layer through which light is guided and first distribution Bragg reflection mirrors formed on upper and lower surfaces of the optical guiding layer; a light entrance through which light enters the waveguide; and a light exit, formed on a surface of the waveguide, through which light having entered through the light entrance and being guided through the waveguide exits. The direction of emission of light can be varied by varying the wavelength of light that is inputted to the optical deflecting element.

A light-emitting device such as these that can vary the direction of emission of light is herein sometimes referred to as "optical scanning device" or "beam scanning device".

An optical scanning device and an imaging element (e.g., an image sensor) can be combined to construct an imaging system that acquires information on a distance distribution in an object region. Such an imaging system is called "lidar (LiDAR: light detection and ranging) system".

SUMMARY

One non-limiting and exemplary embodiment provides a novel imaging system that can more effectively acquire information on a distance distribution in an object region.

In one general aspect, the techniques disclosed here feature an imaging system including a light-emitting device, an image sensor, and a control circuit that controls the light-emitting device and the image sensor. The light-emitting device includes a light source, a first waveguide that propagates light from the light source by means of total reflection, a second waveguide, and a first adjustment element. The second waveguide includes a first multilayer reflective film, a second multilayer reflective film facing the first multilayer reflective film, and a first optical guiding layer joined directly to the first waveguide and located between the first multilayer reflective film and the second multilayer reflective film. The first optical guiding layer has a variable thickness and/or a variable refractive index with respect to the light and propagates the light having propagated through the first waveguide. The first multilayer reflective film has a higher light transmittance than the second multilayer reflective film and causes a portion of the light propagating through the first optical guiding layer to be emitted as emitted light toward outside the second waveguide. The first adjustment element changes a direction of the emitted light from the second waveguide by changing the thickness of the first optical guiding layer and/or the refractive index of the first optical guiding layer. The image sensor includes a plurality of photo-detection cells that receive reflected light from a physical object reflecting at least a portion of the emitted light from the second waveguide. Each of the photo-detection cells accumulates signal charge corresponding to an amount of light received. The control circuit causes the light source to repeatedly emit light pulses as the light. Further, the control circuit causes at least some of the plurality of photo-detection cells to accumulate the signal charge in synchronization with the emission of the light pulses by the light source and thereby causes the image sensor to generate every first period of time a frame based on the signal charge thus accumulated. Furthermore, the control circuit causes the first adjustment element to change the direction of the emitted light from the second waveguide every second period of time that is shorter than or equal to half the first period of time.

An aspect of the present invention makes it possible to more effectively acquire information on a distance distribution in an object region.

It should be noted that general or specific embodiments may be implemented as a device, an apparatus, a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6A is a diagram for explaining an example of a distance-measuring method according to an embodiment;

FIG. 6B is a diagram for explaining an example of a distance measurement based on a direct TOF method;

FIG. 32 is a diagram showing an example of an actuator in which supporting members shown in FIG. 30A are disposed on both sides, respectively, of a mirror;

FIG. 34 is a diagram showing an example of a configuration in which a supporting member (i.e., auxiliary substrate) supporting a plurality of first mirrors is driven en bloc by an actuator;

DETAILED DESCRIPTION

Underlying knowledge forming the basis of the present disclosure is explained prior to a description of an embodiment of the present disclosure.

Information on a distance distribution in an object region can be acquired by a system that irradiates the object region with light and detects a reflection of the light (including scattering light). Distance information can be acquired for each pixel by measuring a time of flight, i.e., a period of time from emission of a light pulse by a light source to reception of the light pulse by each photo-detection cell (i.e., pixel) of an imaging element (e.g., an image sensor). Such a distance-measuring method is called "direct TOF (time-of-flight) method". Meanwhile, the amount of signal accumulation in each photo-detection cell can be varied according to the distance to a physical object by appropriately controlling the timing of accumulation (hereinafter sometimes referred to as "exposure") of signal charge in the plurality of photo-detection cells of the imaging element in synchronization with the emission of a light pulse. Such control makes it possible to find a distance distribution on the basis of the amount of signal accumulation in each photo-detection cell. Such a distance-measuring method is called "indirect TOF method".

Figure 1:
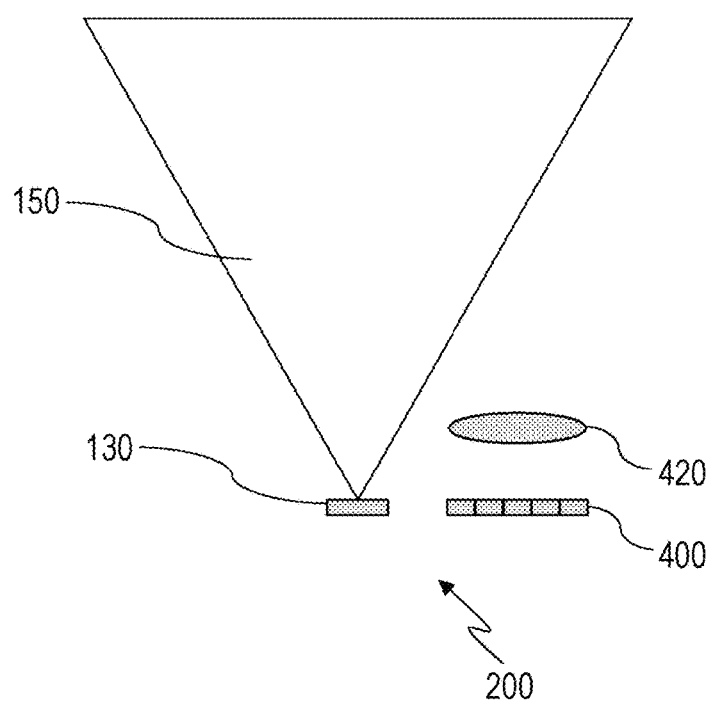
FIG. 1 is a diagram schematically showing an example (comparative example) of an imaging system that can find a distance distribution in an object region.

FIG. 1 is a diagram schematically showing a comparative example serving as an example of an imaging system that can find a distance distribution in an object region. This imaging system 200 includes a light source 130, an imaging element 400, and an optical system 420. The light source 130 and the imaging element 400 are controlled by a control circuit (not illustrated). The control circuit causes the light source 130 to emit a light pulse 150 and causes the imaging element 400 to detect a reflection of the light pulse 150 in synchronization with the emission of the light pulse 150. In this example, the light source 130 is a light source, such as a light-emitting diode (LED), which has a comparatively wide range of angles of emission of light. The control circuit exercises batch control over exposure (i.e., accumulation of signal charge) in all photo-detection cells of the imaging element 400 in synchronization with the emission of light by the light source 130.

The imaging element 400 functions as an electronic shutter. The electronic shutter is a mechanism that controls accumulation and emission of signal charge generated by a photoelectric conversion element of each photo-detection cell. Accumulating signal charge is herein sometimes expressed as "opening the electronic shutter", and emitting signal charge is herein sometimes expressed as "closing the electronic shutter". The electronic shutter is hereinafter sometimes simply referred to as "shutter". In the example shown in FIG. 1, the control circuit exercises batch control over the opening and closing of the electronic shutters of all photo-detection cells. For this reason, the imaging system 200 does not need to include a complex circuit configuration for individually controlling the opening and closing of the shutter of each photo-detection cell.

In this example, the control circuit controls shutter timing so that the amount of signal charge that is accumulated in a photo-detection cell varies according to the distance to a physical object. Such control makes it possible to find the distance for each photo-detection cell on the basis of the amount of signaling of that photo-detection cell.

Figure 2:
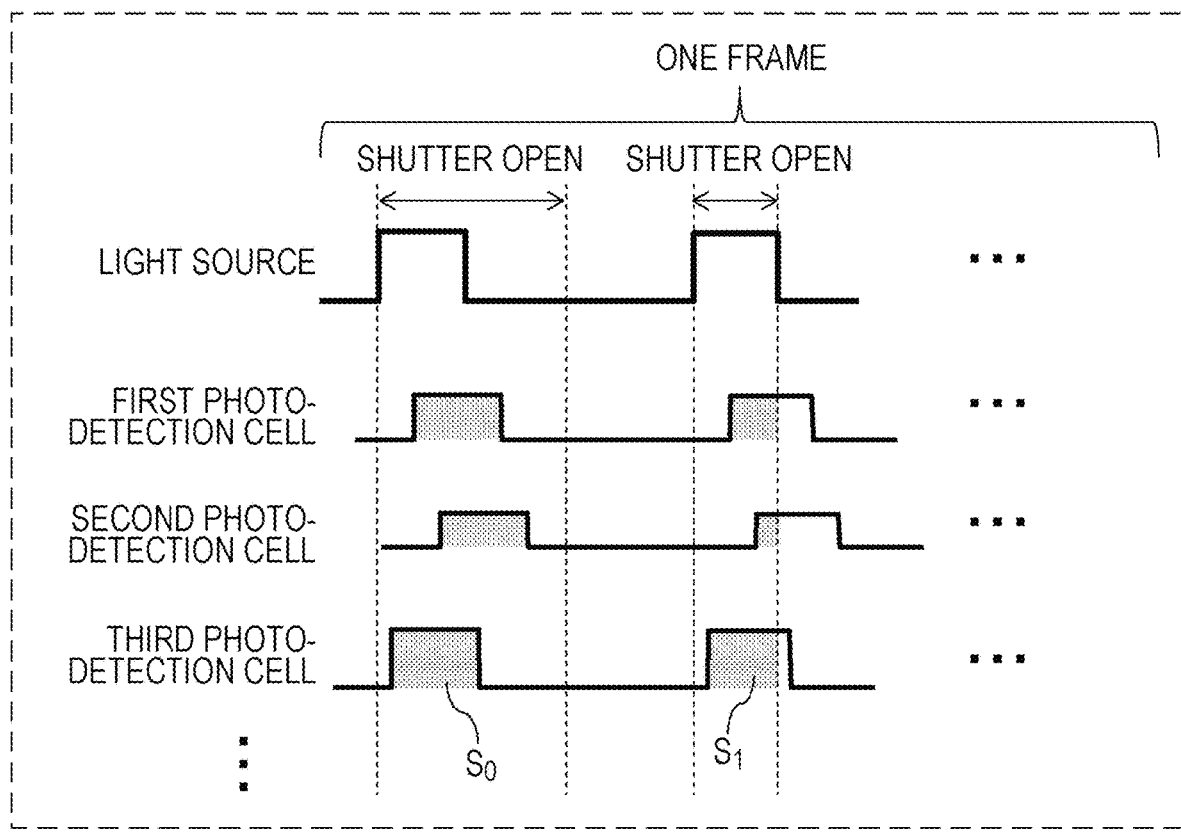
FIG. 2 is a diagram for explaining a distance-measuring method according to the comparative example.

FIG. 2 is a diagram for explaining a distance-measuring method according to the present comparative example. FIG. 2 schematically shows examples of time changes in intensity of a plurality of light pulses that are emitted from the light source 130 and time changes in intensity of light falling on each photo-detection cell in one frame period. In the present comparative example, a large number of light pulses are continuously emitted from the light source 130 within one frame period. The control circuit simultaneously opens and closes the electronic shutters of all photo-detection cells in synchronization with the emission of these light pulses. In the example shown in FIG. 2, shutter open periods vary from light pulse to light pulse. For example, the first shutter open period is longer than the period of emission (i.e., pulse width) of one light pulse. Meanwhile, the second shutter open period is about the same as the pulse width. The first to third photo-detection cells shown in FIG. 2 receive the whole of the light pulse during the first shutter open period and receive only a portion of the light pulse during the second shutter open period. In either shutter open period, a photo-detection cell at a longer distance to the physical object has smaller amounts of accumulation of signal charge ($S_0$ and $S_1$).

In actuality, light pulses may be emitted and received over and over again per frame, although FIG. 2 shows the emission of only two light pulses. From the integrated value of amount s of signal charge that is accumulated in each photo-detection cell in one frame period, the distance to the physical object from a position corresponding to that photo-detection cell can be estimated. The longer the distance to the physical object is, the lower the intensity of reflected light becomes and the longer it takes for the reflected light to fall on the photo-detection cell. For this reason, the smaller the integrated value of amounts of charge accumulation is, the longer the distance to the physical object becomes. A frame that is generated on the basis of the integrated value of amounts of signal charge accumulated in each photo-detection cell is an image signal representing a distance distribution in an object region.

The relationship between the integrated value of amounts of charge accumulation and the distance to the physical object varies according to the periods during which the shutter is open and the timing of emission of a light pulse. For example, let it be assumed that the opening of a shutter starts at the timing of arrival at a photo-detection cell of the termination of a reflected light pulse from a physical object placed at a predetermine distance from a light-emitting device. In this case, in a range from the predetermined distance to a distance that is longer than that distance by a distance corresponding to the pulse width, the integrated value of amounts of charge accumulation in each photo-detection cell becomes larger away from the predetermined distance.

With a configuration like the present comparative example in which the whole object region is irradiated with the light pulse 150 at once, it is impossible, due to safety constrains and insufficiency of output from the light source 130, to increase the intensity of light falling on each photo-detection cell. Therefore, a configuration is employed in which a signal-to-noise ratio (S/N ratio) is improved by emitting a plurality of light pulses continuously and repeating signal accumulation more than once. Considering the time required to read out signal charge accumulated in each photo-detection cell, the time per frame (frame period) is approximately a several tenths of a second. Within one frame period, the opening and closing of the shutter of each photo-detection cell are performed at high speeds and the integration of amounts of signal charge accumulated is performed, so that a distance image of the whole object region is generated.

Meanwhile, a light-emitting device (i.e., an optical scanning device) that can vary the direction of emitted light according to external control and an imaging element may be combined to construct an imaging system (i.e., a LiDAR system) that finds a distance distribution of an object region. In such a system, the optical scanning device irradiates some regions within a measurement area (i.e., object region) with light pulses in sequence. Light reflected (including light scattered) by a physical object within the measurement area enters the imaging element via an imaging lens. Passing through the imaging lens causes light coming from a particular direction to fall on a particular photo-detection cell. In this system, the energy of light concentrates on a region irradiated the light. For this reason, even with use of a light source of the same output as that of the configuration of the aforementioned comparative example, the light intensity of the irradiated region can be made higher. Since the intensity of light falling on a photo-detection cell or a photo-detection cell group corresponding to the irradiated region becomes higher accordingly, the number of signal accumulations for improving the S/N ratio can be reduced. Such a system makes it possible to measure the distance to a distant object and to measure the distance under conditions where there are many external perturbations, e.g., under daylight condition.

In a case where the operation in the aforementioned comparative example, i.e., the operation of simultaneously controlling the electronic shutters of all photo-detection cells, is combined with such an imaging system, one frame is allocated every time the direction of emission of a light pulse is changed. In this case, as many frames as parts into which the object region has been divided according to the size of a beam spot are required to obtain distance information on the whole object region. This has undesirably required a long time to obtain distance information on the whole object region.

The present inventors found the aforementioned problem and studied a configuration for solving this problem. The present inventors conceived that the aforementioned problem can be solved by, within one frame period, causing signal charge to be repeatedly accumulated in at least some photo-detection cells of an imaging element while varying the direction of light that is emitted from a light-emitting device. Thus, the present inventors have finally accomplished a technology of the present disclosure. The following gives an overview of an embodiment of the present disclosure.

The present disclosure includes an imaging system according to the following items.

Item 1

An imaging system including:
a light-emitting device that is able to vary a direction of emitted light;
an imaging element that receives light emitted from the light-emitting device and reflected by a physical object; and
a control circuit that controls the light-emitting device and the imaging element,
wherein the imaging element includes a plurality of photo-detection cells each of which accumulates signal charge corresponding an amount of light received and outputs an electric signal corresponding to an amount of the signal charge thus accumulated, and
the control circuit
causes the light-emitting device to repeatedly emits light pulses,
causes at least some of the plurality of photo-detection cells that receive the light pulses to accumulate the signal charge in synchronization with the emission of the light pulses and thereby causes the imaging element to generate every first period of time a frame based on the signal charge accumulated in the plurality of photo-detection cells, and
causes directions of the light pulses that are emitted from the light-emitting device to vary every second period of time that is shorter than or equal to half the first period of time.

Item 2

The imaging system according to Item 1, wherein the first period of time is n times (where n is an integer of 2 or larger) as long as the second period of time.

Item 3

The imaging system according to Item 1 or 2, wherein the control circuit scans an object region by causing the directions of the light pulses that are emitted from the light-emitting device to vary every second period of time, and a period of time required to scan the whole object region is equal to or longer than the first period of time.

Item 4

The imaging system according to Item 3, wherein the period of time required to scan the whole object region is m time(s) (where m is an integer of 1 or larger) as long as the first period of time.

Item 5

The imaging system according to any of Items 1 to 4, wherein the control circuit allows only at least one photo-detection cell that receives a reflection of the light pulses to accumulate the signal charge and does not allow the remaining photo-detection cells to accumulate the signal charge.

Item 6

The imaging system according to any of Items 1 to 5, wherein the control circuit allows some of the plurality of photo-detection cells that are chosen according to a position and size of a light spot that is formed by the light-emitting device to accumulate the signal charge and does not allow the remaining photo-detection cells to accumulate the signal charge.

Item 7

The imaging system according to any of Items 1 to 6, wherein the plurality of photo-detection cells are arrayed in a row-wise direction and a column-wise direction, the light-emitting device forms, within an object region, a light spot extending in a direction corresponding to the row-wise direction or the column-wise direction, and the control circuit moves the light spot every second period of time in a direction perpendicular to the direction in which the light spot extends, and causes the plurality of photo-detection cells to accumulate the signal charge row by row or column by column.

Item 8

The imaging system according to any of Items 1 to 7, further including a plurality of one-dimensionally or two-dimensionally arrayed imaging elements including the imaging element, wherein the control circuit causes the directions of the light pulses that are emitted from the light-emitting device to vary and thereby causes the light pulses to fall on the plurality of imaging elements in sequence so that the plurality of imaging elements generate frames in sequence.

Item 9

The imaging system according to any of Items 1 to 8, wherein the light-emitting device emits a plurality of diffracted beams including a zeroth-order diffracted beam and positive and negative first-order diffracted beams, and the control circuit allows only some of the plurality of photo-detection cells that receive at least portions of the zeroth-order diffracted beam and the positive and negative first-order diffracted beams to accumulate the signal charge and does not allow the remaining photo-detection cells to accumulate the signal charge.

Item 10

The imaging system according to any of Items 1 to 9, wherein the control circuit scans an object region by causing the directions of the light pulses that are emitted from the light-emitting device to vary every second period of time, the imaging system further including a signal processing circuit that generates, on the basis of the frame generated by the imaging element, an image signal representing a distance distribution in the object region.

Item 11

The imaging system according to Item 10, wherein the control circuit causes the at least some photo-detection cells to repeatedly accumulate the signal charge more than once in synchronization with the emission of the light pulses within the second period of time and an amount of the signal charge that is accumulated in the at least some photo-detection cells within the second period of time varies according to distance to the physical object, and the signal processing circuit generates, on the basis of at least one frame generated by the image sensor, an image signal representing the distance distribution in the object region.

Item 12

The imaging system according to Item 10, wherein the signal processing circuit measures distance to the physical object on the basis of a period of time from emission of light by the light-emitting device to reception of light by the at least some photo-detection cells.

Item 13

The imaging system according to any of Items 1 to 12, wherein the light-emitting device emits light of a particular wavelength range, the imaging system further including an optical filter that faces the plurality of photo-detection cells and selectively transmits the light of the particular wavelength range.

Item 14

The imaging system according to any of Items 1 to 13, wherein the light-emitting device includes a waveguide array including a plurality of waveguide elements, arrayed in a first direction, each of which propagates light in a second direction crossing the first direction, the plurality of waveguide elements emitting light in a third direction crossing a plane that is formed by the first and second directions, and a first adjustment element that varies the third direction in which the light is emitted from the plurality of waveguide elements, each of the plurality of waveguide elements includes a first mirror that has a reflecting surface crossing the third direction and extends in the second direction, a second mirror that has a reflecting surface facing the reflecting surface of the first mirror and extends in the second direction, and an optical guiding layer that is located between the first mirror and the second mirror and propagates light in the second direction, the first mirror has a higher light transmittance than the second mirror and emits toward outside the optical guiding layer a portion of light propagating through the optical guiding layer, and the first adjustment element changes refractive index and/or thickness of the optical guiding layer of each waveguide element and thereby varies the third direction in which the light is emitted from the plurality of waveguide elements.

Item 15

The imaging system according to Item 14, further including:

a plurality of phase shifters connected to the plurality of waveguide elements, respectively, and each including a waveguide joined directly or via another waveguide to a corresponding one of the plurality of waveguide elements; and a second adjustment element that varies differences in phase among rays of light propagating from the plurality of phase shifters to the plurality of waveguide elements and thereby varies the third direction in which the light is emitted from the plurality of waveguide elements.

Item 16

The imaging system according to Item 15, wherein the waveguide of each phase shifter contains a material whose refractive index changes in response to application of a voltage or temperature change, and the second adjustment element changes the refractive index in the waveguide of each phase shifter by applying a voltage to the waveguide or changing the temperature of the waveguide and thereby varies differences in phase among rays of light propagating from the plurality of phase shifters to the plurality of waveguide elements.

Item 17

The imaging system according to Item 15 or 16, wherein when a component in the second direction of a wave vector of light propagating in the third direction is an X component and a component in the first direction of the wave vector of the light propagating in the third direction is a Y component, the first adjustment element changes the X component of the wave vector and the second adjustment element changes the Y component of the wave vector.

Item 18

An optical scanning device including:

a waveguide array including a plurality of waveguide elements, arrayed in a first direction, each of which propagates light in a second direction crossing the first direction, the plurality of waveguide elements emitting light in a third direction crossing a plane that is formed by the first and second directions; and a first adjustment element that varies the third direction in which the light is emitted from the plurality of waveguide elements, wherein each of the plurality of waveguide elements includes a first mirror that has a reflecting surface crossing the third direction and extends in the second direction, a second mirror that has a reflecting surface facing the reflecting surface of the first mirror and extends in the second direction, and an optical guiding layer that is located between the first mirror and the second mirror and propagates light in the second direction, the first mirror has a higher light transmittance than the second mirror and emits toward outside the optical guiding layer a portion of light propagating through the optical guiding layer, and the first adjustment element changes refractive index and/or thickness of the optical guiding layer of each waveguide element and thereby varies the third direction in which the light is emitted from the plurality of waveguide elements.

Item 19

The optical scanning device according to Item 18, wherein when a component in the second direction of a wave vector of the light that is emitted in the third direction is an X component and a component in the first direction of the wave vector of the light that is emitted in the third direction is a Y component, the first adjustment element changes the X component of the wave vector by changing refractive index and/or thickness of the optical guiding layer of each waveguide element, and the Y component of the wave vector changes in a case where a phase difference between rays of light that are supplied to two adjacent ones of the plurality of waveguide elements varies.

Item 20

The optical scanning device according to Item 18 or 19, wherein the first direction and the second direction are orthogonal to each other.

Item 21

The optical scanning device according to any of Items 18 to 20, wherein the plurality of waveguide elements are arrayed at regular intervals in the first direction.

Item 22

The optical scanning device according to any of Items 18 to 21, wherein the optical scanning device satisfies a relationship $\lambda/2 \le p \le \lambda/\sin 10°$, where p is the center-to-center distance between two adjacent ones of the plurality of waveguide elements in the first direction and $\lambda$ is the center wavelength in free space of light propagating through the optical guiding layer of each waveguide element.

Item 23

The optical scanning device according to any of Items 18 to 22, wherein at least either of the first and second mirrors includes a dielectric multilayer film.

Item 24

The optical scanning device according to any of Items 18 to 23, further including:

a plurality of phase shifters connected to the plurality of waveguide elements, respectively, and each including a waveguide joined directly or via another waveguide to a corresponding one of the plurality of waveguide elements; and a second adjustment element that varies differences in phase among rays of light propagating from the plurality of phase shifters to the plurality of waveguide elements and thereby varies the third direction in which the light is emitted from the plurality of waveguide elements.

Item 25

The optical scanning device according to Item 24, wherein the waveguide of each phase shifter contains a material whose refractive index changes in response to application of a voltage or temperature change, and the second adjustment element changes the refractive index in the waveguide of each phase shifter by applying a voltage to the waveguide or changing the temperature of the waveguide and thereby varies differences in phase among rays of light propagating from the plurality of phase shifters to the plurality of waveguide elements.

Item 26

The optical scanning device according to Item 24 or 25, wherein when a component in the second direction of a wave vector of light propagating in the third direction is an X component and a component in the first direction of the wave vector of the light propagating in the third direction is a Y component, the first adjustment element changes the X component of the wave vector and the second adjustment element changes the Y component of the wave vector.

Item 27

The optical scanning device according to any of Items 24 to 26, wherein the plurality of phase shifters are located on both sides of the plurality of waveguide elements in the second direction.

Item 28

The optical scanning device according to any of Items 24 to 27, further including:

a light source that emits light whose free space wavelength is λ; and an optical divider that divides the light from the light source into rays of light and introduces the rays of light into the waveguides of the plurality of phase shifters.

Item 29

The optical scanning device according to any of Items 24 to 28, wherein each of the plurality of phase shifters includes a third mirror that has a reflecting surface crossing the third direction, extends in the second direction, and is connected to the first mirror of a corresponding one of the plurality of waveguide elements, and a fourth mirror that has a reflecting surface facing the reflecting surface of the third mirror, extends in the second direction, and is connected to the second mirror of the corresponding one of the plurality of waveguide elements, the waveguide of the each phase shifter is joined directly to the optical guiding layer of the corresponding one of the plurality of waveguide elements, and the third and fourth mirrors are lower in light transmittance than the first mirror.

Item 30

The optical scanning device according to any of Items 18 to 29, wherein the optical guiding layer of each waveguide element contains a material whose refractive index with respect to light propagating through the optical guiding layer changes in a case where a voltage is applied, and the first adjustment element includes a pair of electrodes between which the optical guiding layer is sandwiched and changes the refractive index of the optical guiding layer by applying a voltage to the pair of electrodes.

Item 31

The optical scanning device according to Item 30, wherein the optical guiding layer of each waveguide element contains a semiconductor material, a p-type semiconductor is contained in a first one of the pair of electrodes or located between the first one of the pair of electrodes and the optical guiding layer, an n-type semiconductor is contained in a second one of the pair of electrodes or located between the second one of the pair of electrodes and the optical guiding layer, and the first adjustment element changes the refractive index of the optical guiding layer by injecting carriers into the semiconductor material by applying a voltage to the pair of electrodes.

Item 32

The optical scanning device according to Item 30, wherein the optical guiding layer of each waveguide element contains an electro-optic material, and the first adjustment element changes the refractive index of the electro-optic material by applying a voltage to the pair of electrodes.

Item 33

The optical scanning device according to Item 30, wherein the optical guiding layer of each waveguide element contains a liquid crystal material, and the first adjustment element changes the refractive index of the optical guiding layer by changing the refractive-index anisotropy of the liquid crystal material by applying a voltage to the pair of electrodes.

Item 34

The optical scanning device according to any of Items 18 to 29, wherein the optical guiding layer of each waveguide element contains a thermo-optic material whose refractive index changes with changing temperature, and the first adjustment element includes a pair of electrodes between which the optical guiding layer is sandwiched and changes the refractive index of the optical guiding layer by heating the thermo-optic material by applying a voltage to the pair of electrodes.

Item 35

The optical scanning device according to any of Items 18 to 29, wherein the optical guiding layer of each waveguide element contains a thermo-optic material whose refractive index changes with changing temperature, the first adjustment element includes a heater disposed in contact with or near the optical guiding layer, and the first adjustment element changes the refractive index of the optical guiding layer by heating the thermo-optic material with the heater.

Item 36

The optical scanning device according to any of Items 18 to 29, wherein the optical guiding layer of each waveguide element contains a gas or liquid material, the first adjustment element includes an actuator connected to the first mirror and/or the second mirror of each waveguide element, and the actuator changes the thickness of the optical guiding layer by varying the distance between the first mirror and the second mirror.

Item 37

The optical scanning device according to Item 36, wherein the actuator includes a pair of electrodes, a first one of the pair of electrodes is fixed to the first mirror, a second one of the pair of electrodes is fixed to the second mirror, and the actuator varies the distance between the first mirror and the second mirror by generating interelectrode electrostatic force by applying a voltage to the pair of electrodes.

Item 38

The optical scanning device according to Item 36, wherein the actuator contains a piezoelectric material and varies the distance between the first mirror and the second mirror by deforming the piezoelectric material.

Item 39

The optical scanning device according to Item 36, wherein the actuator includes a supporting member that supports the first mirror or the second mirror of each waveguide element, and varies the distance between the first mirror and the second mirror by moving the supporting member.

Item 40

The optical scanning device according to Item 36, wherein at least either of the first and second mirrors of each waveguide element is a part of a single plate-shaped mirror, and the actuator varies the distance between the first mirror and the second mirror by moving the plate-shaped mirror.

Item 41

The optical scanning device according to any of Items 18 to 39, wherein at least either of the first and second mirrors of each waveguide element is a part of a single plate-shaped mirror.

Item 42

An optical receiver device including:

a waveguide array including a plurality of waveguide elements, arrayed in a first direction, each of which propagates light in a second direction crossing the first direction, the waveguide array causing light having fallen on the plurality of waveguide elements from a third direction crossing both the first and second directions to propagate in the second direction; and a first adjustment element that adjusts a direction of receivable light, wherein each of the plurality of waveguide elements includes a first mirror that has a reflecting surface crossing the third direction and extends in the second direction, a second mirror that has a reflecting surface facing the reflecting surface of the first mirror and extends in the second direction, and an optical guiding layer that is located between the first mirror and the second mirror and propagates light in the second direction, and the first adjustment element varies the direction of the receivable light by changing refractive index and/or thickness of the optical guiding layer of each waveguide element.
Item 43

The optical receiver device according to Item 42, further including:

a plurality of phase shifters connected to the plurality of waveguide elements, respectively, and each including a waveguide joined directly or via another waveguide to a corresponding one of the plurality of waveguide elements; and a second adjustment element that varies the direction of the receivable light by varying differences in phase among rays of light propagating from the plurality of phase shifters to the plurality of waveguide elements.
Item 44

The optical receiver device according to Item 42 or 43, wherein when a component in the second direction of a wave vector of light falling on the plurality of waveguide elements is an X component and a component in the first direction of the wave vector of the light falling on the plurality of waveguide elements is a Y component, the first adjustment element changes the X component of the wave vector of the receivable light and the second adjustment element changes the Y component of the wave vector of the receivable light.
Item 45

A LiDAR system including:

the optical scanning device according to any of Items 18 to 41;

a photodetector that detects light emitted from the optical scanning device and reflected from a physical object; and a signal processing circuit that generates distance distribution data on the basis of an output from the photodetector.

The following describes a more specific embodiment of the present disclosure. Note, however, that an unnecessarily detailed description may be omitted. For example, a detailed description of an already well-known matter and a repeated description of substantially the same configuration may be omitted. This is intended to facilitate understanding of persons skilled in the art by avoiding unnecessary redundancy of the following description. It should be noted that the present inventors provide the accompanying drawings and the following description so that persons skilled in the art can fully understand the present disclosure, and the accompanying drawings and the following description are not intended to limit the subject matters recited in the claims. In the following description, the same or similar constituent elements are given the same reference numerals.

Embodiment

Figure 3:
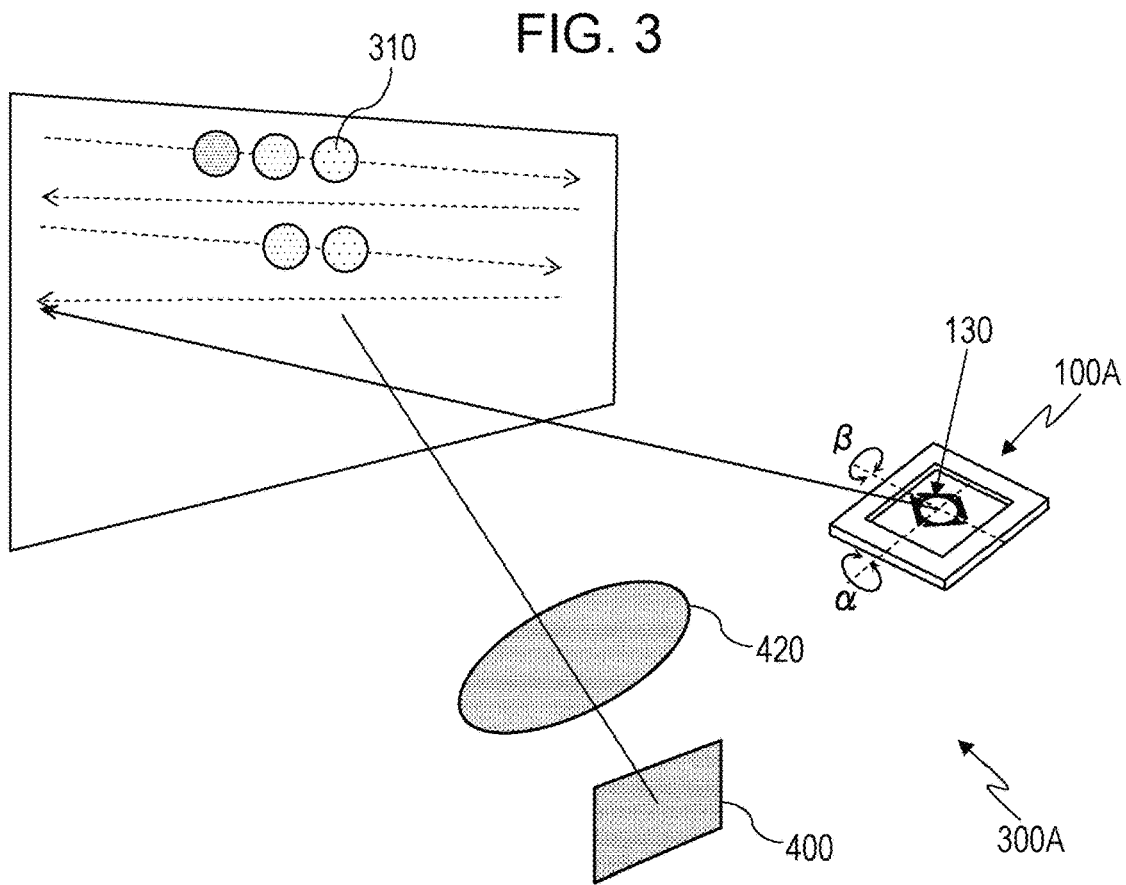
FIG. 3 is a schematic view schematically showing a configuration of an imaging system according to an exemplary embodiment of the present disclosure.

FIG. 3 is a schematic view schematically showing a configuration of an imaging system 300A according to an exemplary embodiment of the present disclosure. The imaging system 300A according to the present embodiment is a LiDAR system that generates an image signal (i.e., a signal of image data) representing a distance distribution in an object region. The imaging system 300A includes a light-emitting device (hereinafter sometimes referred to as "optical scanning device"), an imaging element 400, and an optical system 420. The light-emitting device 100A includes a mechanism that varies the direction of emitted light in response to a control signal from a control circuit (not illustrated). The light-emitting device 100A according to the present embodiment includes a light source 130 such as a laser and at least one movable mirror (e.g., a MEMS mirror). Light emitted from the light source 130 is reflected by the movable mirror and travels toward a predetermined region within the object region. The control circuit drives the movable mirror to vary the direction of emitted light from the light-emitting device 100A. This allows the object region to be scanned with light as indicated by dotted arrows in FIG. 3.

It should be noted that, instead of the light-emitting device 100A including the movable mirror, any light-emitting device that can vary the direction of emission of light can be used. For example, a light-emitting device including a reflective waveguide such as that described later may be used. Use of such a light-emitting device eliminates the need for a mechanical mechanism such as a movable mirror and therefore leads to simplification of the device.

FIG. 3 schematically shows how a two-dimensional scan is executed by radiating a light beam (e.g., laser light) far away from the light-emitting device 100A. The two-dimensional scan can be executed by moving a light spot (i.e., beam spot) 310 in a horizontal direction and a vertical direction. When combined with the aforementioned TOF method, the two-dimensional scan can generate an image signal or image data (hereinafter sometimes referred to as "distance image") representing a two-dimensional distance distribution. It should be noted that not a two-dimensional but a one-dimensional distance image may be generated depending on the purposes. In that case, the imaging element 400 needs only include a structure that generates a one-dimensional image signal.

The imaging element 400 includes a plurality of photo-detection cells having sensitivity in a wavelength range of light that is emitted from the light-emitting device 100A. In the present embodiment, the plurality of photo-detection cells are two-dimensionally arrayed on an imaging surface of the imaging element 400. Each photo-detection cell receives light emitted from the optical scanning device 100 and reflected from a physical object within the object region and accumulates signal charge corresponding to the amount of light received. Then, each photo-detection cell outputs an electric signal corresponding to the amount of signal charge thus accumulated. More specifically, each photo-detection cell includes a photoelectric conversion element that generates signal charge by means of photoelectric conversion, a charge accumulator that accumulates the signal charge, and a charge emitter that emits the signal charge. The control circuit performs an electronic shutter operation by controlling the accumulation and emission of signal charge in and from each photo-detection cell.

The optical system 420 includes at least one lens and forms an image on the imaging surface of the imaging element 400 by focusing the light emitted from the light-emitting device 100A and reflected by the physical object. Besides the lens, the optical system 420 may include another optical element such as a prism or a reflecting mirror.

Figure 4:
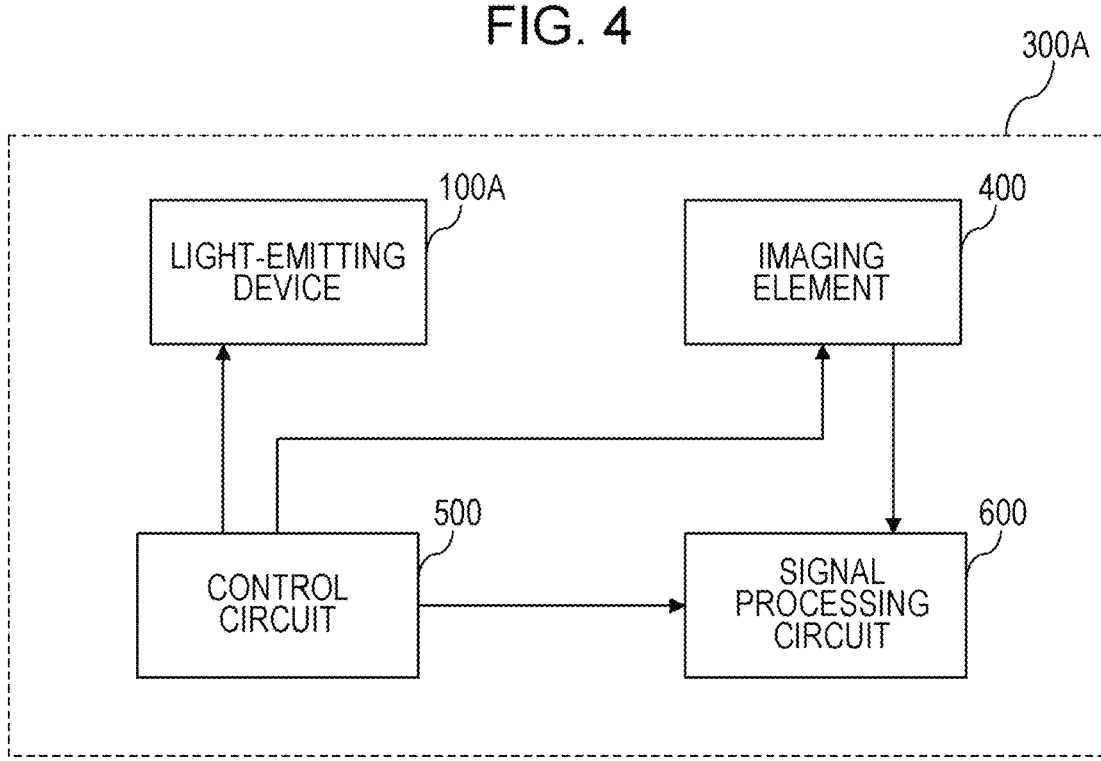
FIG. 4 is a block diagram showing a basic configuration of the imaging system.

FIG. 4 is a block diagram showing a basic configuration of the imaging system 300A. The imaging system 300A includes a control circuit 500 and a signal processing circuit 600 in addition to the light-emitting device 100A and the imaging element 400. The control circuit 500 is connected to and controls the light-emitting device 100A and the imaging element 400. The signal processing circuit 600 is connected to the imaging element 400 and the control circuit 500 and, in accordance with an instruction from the control circuit 500, processes a signal (e.g., a frame) outputted from the imaging element 400. The signal processing circuit 600 generates, on the basis of at least one frame generated by the imaging element 400, an image signal representing a distance distribution in the object region and outputs the image signal.

The control circuit 500 can be realized by a circuit such as a microcontroller unit (MPU) including, for example, a central processing unit (CPU) and a memory. In the memory, a computer program defining an operation according to the present embodiment can be stored. The control circuit 500 may be realized by a dedicated-circuit configured to be able to execute control according to the present embodiment.

The signal processing circuit 600 can be realized by a programmable logic device (PLD) such as a digital signal processor (DSP) or a field programmable gate array (FPGA) or a combination of a CPU, a graphics processing unit (GPU), and a computer program. Such a computer program is stored in a storage medium such as a memory. A distance image can be generated by a processor such as the CPU executing the program. The signal processing circuit 600 may be an element external to the imaging system 300A. A computer electrically connected to the imaging system 300A (e.g., a computer mounted on a vehicle or a cloud server on the Internet) may include the signal processing circuit 600.

The control circuit 500 according to the present embodiment causes the light-emitting device 100A to repeatedly emit a plurality of light pulses. The control circuit 500 causes at least some of the plurality of photo-detection cells of the imaging element 400 to accumulate signal charge in synchronization with the emission of the plurality of light pulses. Upon receiving an instruction from the control circuit 500, the imaging element 400 generates and outputs, every "first period of time", a frame (corresponding to an image signal) based on the signal charge accumulated in the plurality of photo-detection cells. The first period of time may range, for example, from approximately 1/1000 second to 1/10 second but is not limited to this range. The control circuit 500 causes the light-emitting device 100A to repeatedly emit a plurality of light pulses within this first period of time and vary the direction of emission of the light pulses every "second period of time" that is shorter than the first period of time. The second period of time is typically shorter than or equal to half the first period of time and can be set, for example, to be 1/n time (where n is an integer or 2 or larger) as long as the first period of time. The pulse width of each light pulse is short and can range, for example, from approximately 5 nanoseconds (ns) to 30 nanoseconds. For this reason, a large number of light pulses can be emitted within the first period of time or the second period of time. It should be noted that, in principle, distance information can be acquired even if only one light pulse is emitted within the second period of time. In the present embodiment, however, for the purpose of improving an S/N ratio, a plurality of light pulses are continuously emitted within the second period of time and signal charge is accumulated more than once in the same photo-detection cell.

In a case where the second period of time is set to be shorter than or equal to half the first period of time, a plurality of places within the object region are irradiated in sequence with the light spot 310 while one frame is being generated. For this reason, the time required to acquire distance information on the whole object region becomes shorter than that in a case where the rate at which the direction of emission of light is varied and the frame rate are equalized (i.e., the second period of time and the first period of time are equalized).

Light emitted from the light-emitting device 100A falls on one or more particular photo-detection cells of the imaging element 400 via the optical system 420. The control circuit 500 drives all or some photo-detection cells of the imaging element 400 so that at least one photo-detection cell located in a position corresponding to the position of the light spot 310 accumulates signal charge. This allows the imaging element 400 to generate every first period of time a frame (corresponding to an image signal) based on the amount of signal charge in each photo-detection cell.

In a case like the present embodiment where an optical scanning device is used as the light-emitting device 100A, the output of light concentrates on some places within the object region. For this reason, even when the output of a light source is the same as that of the configuration of the comparative example in which the whole object region is irradiated, the intensity of light that is applied to some places in the object region can be increased. Therefore, since the intensity of light falling on photo-detection cells that receive light from the places increase accordingly, the number of signal accumulations for improving the S/N ratio can be reduced. The present embodiment makes it possible to detect a distant object and to perform a measurement under conditions where there are many external perturbations, e.g., under daylight condition.

The following describes in more detail a configuration and operation of the imaging element 400 according to the present embodiment.

Figure 5A:
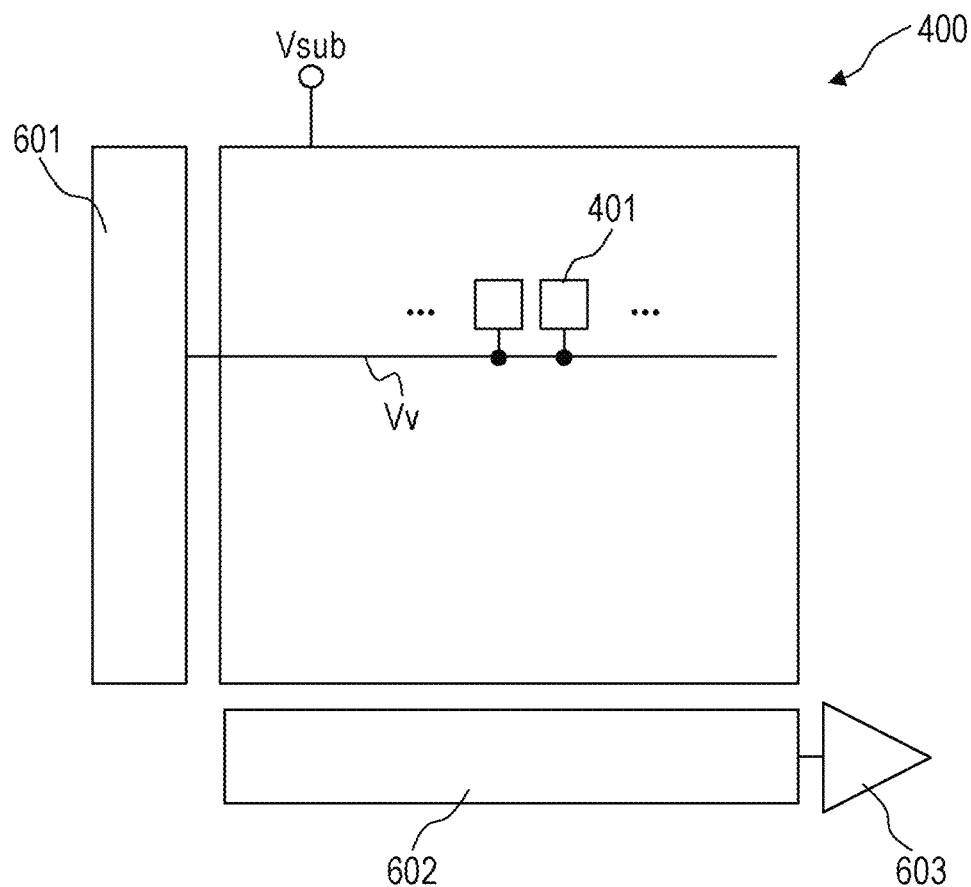
FIG. 5A is a diagram schematically showing an example configuration of an imaging element.

FIG. 5A is a diagram schematically showing an example configuration of the imaging element 400. In this example, the imaging element 400 includes a CCD (charge-coupled device) structure. As shown in FIG. 5A, the imaging element 400 includes a plurality of two-dimensionally arrayed photo-detection cells 401 (photo-detection cell array), a pixel driving circuit 601, a horizontal CCD 602, and an output circuit 603. For simplicity, FIG. 5A illustrates only two photo-detection cells 401 included in one row.

Figure 5B:
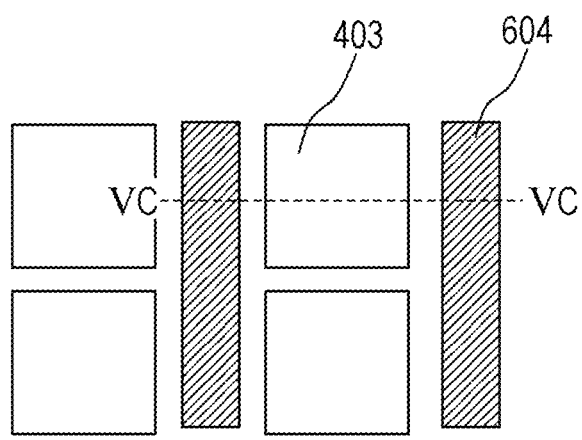
FIG. 5B is a diagram schematically showing four adjacent photo-detection cells of a photo-detection cell array.

FIG. 5B is a diagram schematically showing four adjacent photo-detection cells of the photo-detection cell array. Each photo-detection cell 401 includes a photodiode 403, which is a photoelectric conversion element. Vertical CCDs 604 are disposed adjacent to the plurality of photodiodes 403 arranged in a vertical direction (in FIG. 5B, a longitudinal direction). The vertical CCDs 604 are elements (i.e., charge accumulators) that accumulate and transfer signal charge.

Figure 5C:
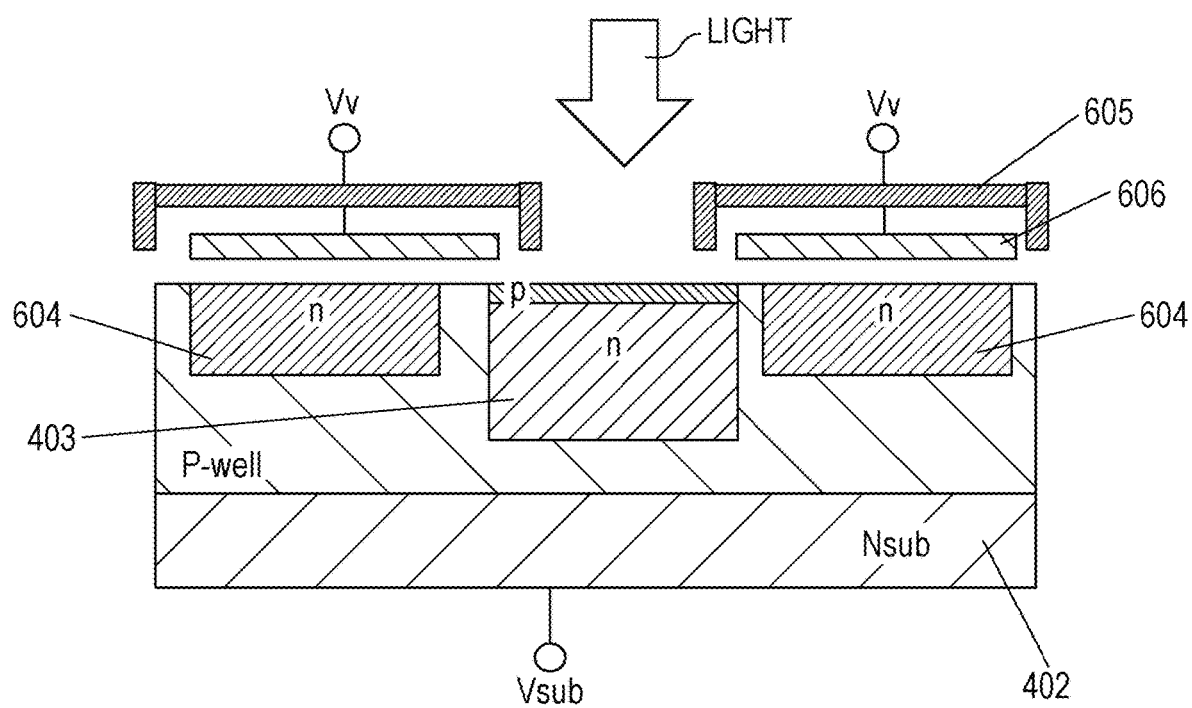
FIG. 5C is a diagram schematically showing a cross-section taken along line VC-VC in FIG. 5B.

FIG. 5C is a diagram schematically showing a cross-section taken along line VC-VC in FIG. 5B. As shown in FIG. 5C, an electrode 606 and a light-shielding member 605 covering the electrode 606 are provided above (in front of) each vertical CCD 604. An oxide film is present between the electrode 606 and the vertical CCD 604. Disposed on the back (in FIG. 5C, lower side) of the photo-detection cell is a drain 402 (in this example, an N-type semiconductor substrate) serving as a charge emitter. A voltage Vv is applied to the vertical CCD 604. A voltage Vsub is applied to the drain 402. The accumulation and emission of signal charge into and out of the vertical CCD 604 are determined by a magnitude relationship between the voltage Vv and the voltage Vsub. The control circuit 500 controls the accumulation and emission of signal charge in and from each photo-detection cell, for example, by holding the voltage Vv constant and adjusting the voltage Vsub via the pixel driving circuit 601.

When light falls on the photodiode 403, which is a photoelectric conversion element, signal charge is generated by photoelectric conversion and transferred to a vertical CCD 604, which is a charge accumulator. The vertical CCD 604 disposed in each column transfers the signal charge in a vertical direction (in FIG. 5B, a downward direction). The vertical CCD 604 is controlled by a control signal (voltage Vv) that is supplied from the pixel driving circuit 601. The signal charge transferred from the vertical CCD 604 of each column is transferred in sequence in a horizontal direction (in FIG. 5A, a rightward direction) by the horizontal CCD 602. The signal charge thus transferred is finally converted into a voltage, amplified, and outputted by the output circuit 603. Through the process, the imaging element 400 generates one frame.

It should be noted that the structure of the imaging element 400 shown in FIGS. 5A to 5C is merely an example. The imaging element 400 may include a structure which is different from that shown in FIGS. 5A to 5C. For example, the imaging element 400 may include a CMOS or NMOS structure or may include an internal amplification circuit that performs, for example, avalanche amplification by which to amplify a photoelectric current by applying a backward voltage. Each photo-detection cell may include a plurality of charge accumulators. A wider range of distance measurement is made possible by using different charge accumulators depending on the distances (i.e., ranges).

The following describes examples of distance-measuring methods according to the present embodiment.

FIG. 6A is a diagram for explaining an example of a distance-measuring method according to the present embodiment. The example shown in FIG. 6A is an example based on the indirect TOF method. FIG. 6A schematically shows examples of time changes in intensity of a plurality of light pulses that are emitted from the light source 130 of the light-emitting device 100A and time changes in intensity of light falling on the plurality of photo-detection cells. In this example, the control circuit 500 simultaneously controls the electronic shutters of all photo-detection cells. The control circuit 500 controls the opening and closing of the electronic shutter of each photo-detection cell in synchronization with the emission of the light pulses within the second period of time. In the example shown in FIG. 6A, it is assumed, for simplicity, that in a period of time during which a light pulse is emitted in a certain direction, a reflection of the light pulse falls on only one photo-detection cell. Typically, a reflection of the light pulse can fall on a plurality of nearby photo-detection cells.

The control circuit 500 causes at least one photo-detection cell that receives a reflection of a light pulse to repeatedly accumulate signal charge more than once within the second period of time. The amount of signal charge that is accumulated in a photo-detection cell within the second period of time varies according to the distance to a physical object located in a position corresponding to the pixel. More specifically, the longer the distance to the physical object is, the smaller the amount of accumulation of signal charge is.

The control circuit 500 varies the direction of emission of light every second period of time. For example, as shown in FIG. 3, the control circuit 500 first varies the direction of emission in increments of a predetermined angle along a horizontal direction (which corresponds to a row-wise direction of the imaging element 400). An amount of this angular variation is determined according to the required resolution. Upon completion of a scan of one row, the control circuit 500 moves the light spot 310 to the next row and performs a scan of the row in the same way. By repeating such an operation, the control circuit 500 completes a scan of the whole object region.

In the example shown in FIG. 6A, the direction of emission of light varies twice within one frame period (i.e., a first period of time). That is, three adjacent places within the object region are irradiated in sequence while one frame is being generated. For this reason, light pulses fall in sequence on the first to third photo-detection cells located in positions corresponding to the three places, and signal charge is accumulated in the first to third photo-detection cells. The imaging element 400 generates and outputs a frame having a pixel value corresponding to the amount of signal charge accumulated in each photo-detection cell.

Every time one frame is generated, the signal processing circuit 600 determines the distance to the physical object pixel by pixel or pixel group by pixel group on the basis of the value of each pixel of the frame. The distance can be determined, for example, on the basis of correlation data such a table or formula defining a correspondence relationship the value of each pixel and the distance. Such correlation data is stored in advance in a storage medium such as a memory.

The signal processing circuit 600 may make a correction on an as-needed basis in processing a signal of each pixel. As the light source 130 and the imaging element 400 cannot be installed in the same place, light can fall on different pixels depending on the distance to the physical object even with the direction of emission of light being the same. The effect of this displacement can be discounted in the case of a distant physical object, but may not be able to be discounted in the case of a nearby physical object. In such a case, the signal processing circuit 600 may perform a needed correction to lessen the effect of the aforementioned displacement.

The control circuit 500 and the signal processing circuit 600 repeat these operations until completion of a scan of the whole object region. Finally, the signal processing circuit 600 generates and outputs distance image data representing a distance distribution in the whole object region. One piece of distance image data can be generated, for example, at a time interval of approximately 1/30 second to 1 second. After that, the control circuit 500 and the signal processing circuit 600 repeat the aforementioned operations to repeatedly generate distance image data at predetermined time intervals.

In the example shown in FIG. 6A, the electronic shutters of all photo-detection cells are simultaneously driven. This makes it possible to make wires and circuit elements simpler in structure and smaller circuit size than they are in a configuration in which each photo-detection cell can be individually controlled. It should be noted that there are various possible methods for controlling the electronic shutters so that the amount of signal charge that is accumulated in each photo-detection cell varies according to the distance. The present embodiment may employ any of the methods.

Although the indirect TOF method is used in the aforementioned example, the direct TOF method may be used to find the distance.

FIG. 6B is a diagram for explaining an example of a distance measurement based on the direct TOF method. In this example, the distance to a physical object is measured on the basis of a period of time from emission of a light pulse from the light-emitting device 100A to reception of the light pulse by each photo-detection cell of the imaging element 400. FIG. 6B schematically shows examples of time changes in intensity of a plurality of light pulses that are emitted from the light source 130 and time changes in intensity of light falling on the plurality of photo-detection cells. Let it be assumed here that the count start time T0 is the time of a rising edge of a light pulse (i.e., the emission start time) and T1 is the time of a rising edge of the intensity of light detected by a photo-detection cell. The signal processing circuit 600 can calculate the distance L to a physical object through the operation L=c(T1−T0)/2 (where c is the velocity of light).

In the present embodiment, the period of time required to scan the whole object region is longer than one frame period (i.e., a first period of time). In this case, only a part of the object region is scanned in one frame period. In order to acquire a distance distribution of the whole object region, it is necessary to use a plurality of frames of data. Meanwhile, it is possible to increase the intensity of light falling on a photo-detection cell of the imaging element 400. This offers the advantage of improved sensitivity.

In a case where the period of time required to scan the whole object region is m time(s) (where m is an integer of 1 or larger) as long as the first period of time, simplified signal processing is achieved, as the timing of completion of the scan of the whole object region and the timing of generation of a distance image can be brought into coincidence with each other. In particular, in a case where the period of time required to scan the whole object region coincides with the first period of time, it is possible to generate distance image data on the whole object region by using one frame of data.

The following describes modifications of the present embodiment.

In order to improve the accuracy of distance measurement, it is important to reduce noise in light reception. Even with a configuration like the present embodiment in which a reflection of a light pulse falls only on some photo-detection cells, extraneous light (e.g., sunlight or light of external illumination) can actually fall on other photo-detection cells. Such extraneous light generates noise.

Figure 7:
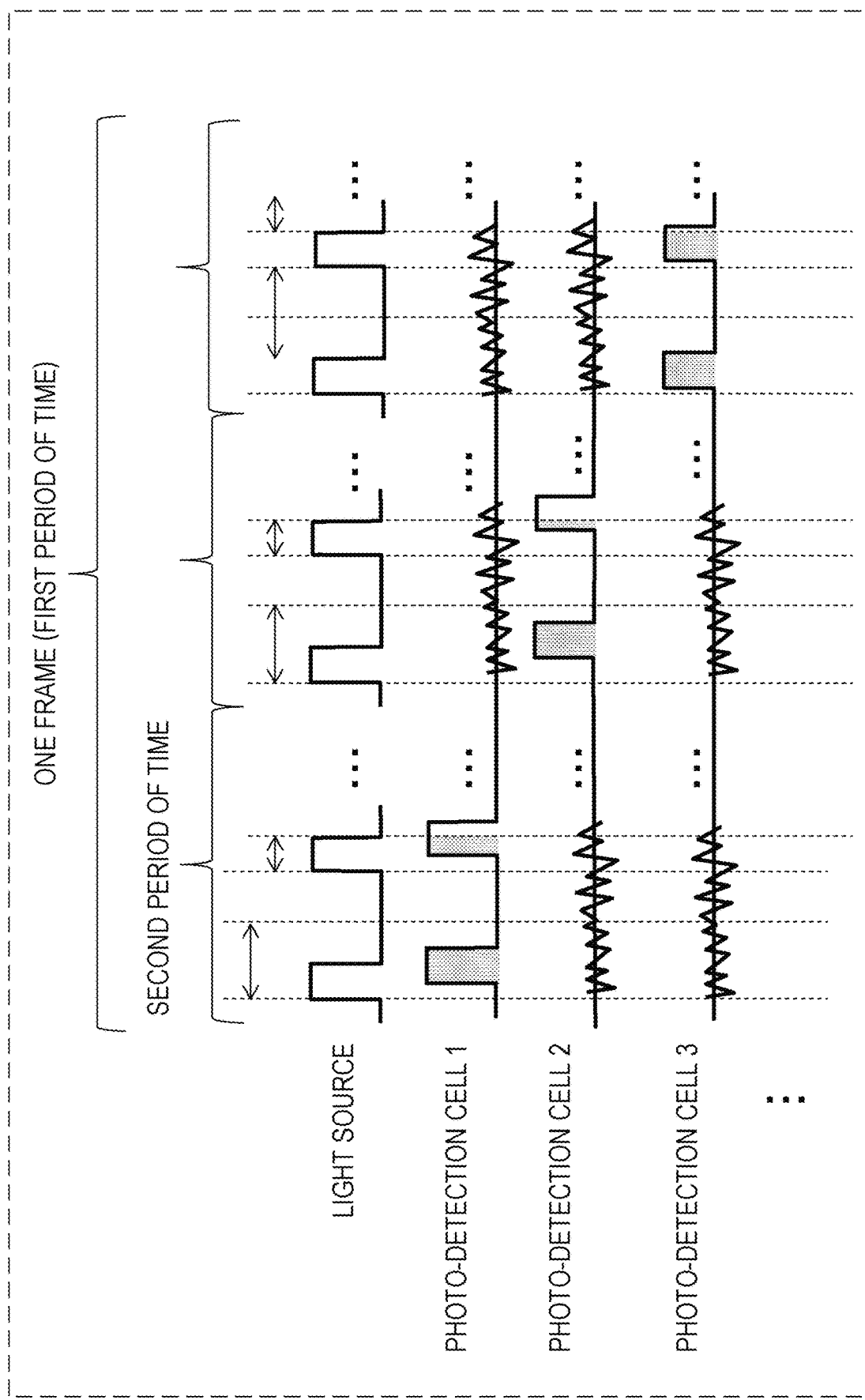
FIG. 7 is a diagram for explaining the effect of noise attributed to extraneous light.

FIG. 7 is a diagram for explaining the effect of noise attributed to extraneous light. Suppose here a case where a distance measurement based on the indirect TOF method which is similar to that of FIG. 6A is performed. As shown in FIG. 7, extraneous light can be detected as noise (indicated by a zigzag line in FIG. 7) in a photo-detection cell that does not receive a reflection of a pulse light. Although such noise is similarly contained in a signal from a photo-detection cell detecting a light pulse, FIG. 7 ignores the noise component for simplicity. This noise problem can similarly occur in a case where the direct TOF method is used.

In order to reduce noise generated by extraneous light, it is only necessary to close the electronic shutters of a plurality of photo-detection cells corresponding to the direction in which no light beam is radiated. In other words, the control circuit 500 needs only control the imaging element 400 so that only at least one photo-detection cell that receives a reflection of a light pulse accumulates signal charge and the remaining photo-detection cells do not accumulate signal charge. Such control reduces the effect of noise and therefore makes it possible to improve the accuracy of distance measurement. For example, such control makes it possible to detect a more distant physical object even in the daytime.

In order to eliminate or reduce noise by the aforementioned method, it is necessary to individually control the electronic shutter of each photo-detection cell. Achieving such control requires a mechanism that can individually control the accumulation and emission of signal charge in and from each photo-detection cell, thus possibly inviting increased circuit complexity. Therefore, in order to check an increase in circuit size, a configuration to be described below may be employed.

Figure 8A:
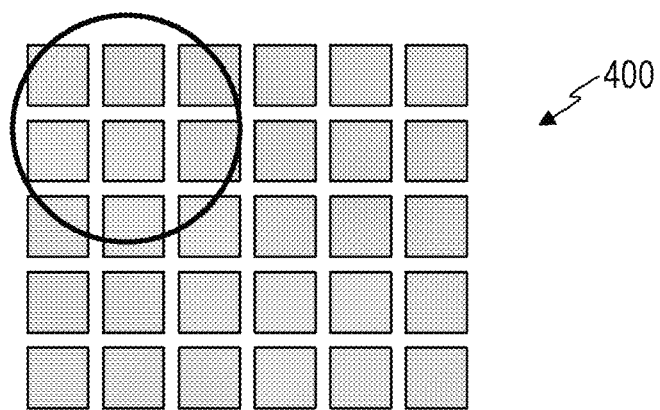
FIG. 8A is a diagram showing an example in which a plurality of photo-detection cells of an imaging element are driven on a group-by-group basis.

FIG. 8A is a diagram showing an example in which the plurality of photo-detection cells of the imaging element 400 are driven on a group-by-group basis. In this example, light (in this example, a circular light spot) that is emitted from the light-emitting device 100A is reflected by a physical object and falls on some photo-detection cells (e.g., 3×3 photo-detection cells shown in FIG. 8A). In this case, a mechanism that can control the accumulation and emission of signal charge needs only be provided for each group of nine photo-detection cells arranged in a 3-by-3 matrix. The control circuit 500 needs only control the imaging element 400 so that only some of the plurality of photo-detection cells that are chosen according to the position and size of the light spot that is formed by the light-emitting device 100A accumulate signal charge and the remaining photo-detection cells do not accumulate signal charge. Alternatively, a circuit that emits and resets accumulated charge of all photo-detection cells of the imaging element 400 may be provided so that the accumulated charge of all photo-detection cells may be reset after a predetermined group has been read out. This makes it possible to eliminate the effect of unwanted extraneous light on accumulated light.

The size of the light spot depends on the angle of divergence of light that is emitted from the light source 130. In a case where the light-emitting device 100A is supplied with constant electric power, the larger the size of the light spot is, the lower the intensity of light per unit area becomes and the lower detection sensitivity becomes. Meanwhile, the larger the size of the light spot is, the shorter time it takes to scan the whole object region. Accordingly, the number of photo-detection cells whose shutters are simultaneously controlled and the angle of divergence of light are determined according to the balance between the required sensitivity and the scan speed. Even a configuration like the example shown in FIG. 8A in which light simultaneously falls on a plurality of photo-detection cells makes it possible to better improve the sensitivity than the comparative example in which the whole object region is irradiated at once.

Although the shape of the light spot is circular in the aforementioned example, another shape may be taken.

Figure 8B:
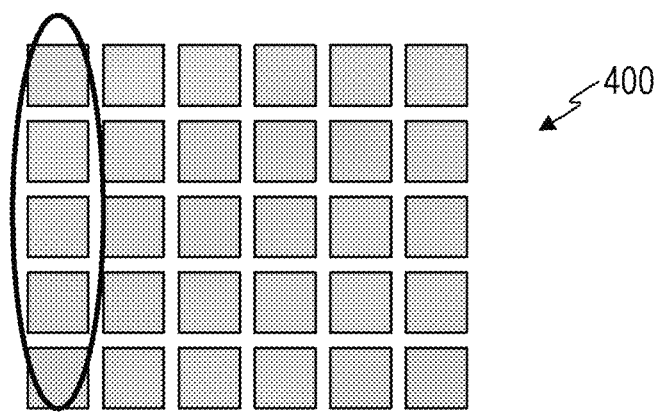
FIG. 8B is a diagram showing an example of a case where a light-emitting device forms, within an object region, a light spot extending in a direction corresponding to a column-wise direction of the imaging element.

FIG. 8B is a diagram showing an example of a case where the light-emitting device 100A forms, within the object region, a light spot extending in a direction corresponding to a column-wise direction of the imaging element 400. The light spot can be deformed into an unidirectionally-extended shape by using an optical element such as a diffraction grating. In the example shown in FIG. 8B, light from the light-emitting device 100A falls on one column of column-wise arranged photo-detection cells of the plurality of photo-detection cells. In this case, the control circuit 500 moves the light spot every second period of time in a direction (row-wise direction) perpendicular to the direction (column-wise direction) in which the light spot extends, and causes the plurality of photo-detection cells to accumulate signal charge column by column. With such a configuration, the imaging element 400 needs only have a structure in which the electronic shutters can be controlled column by column. It should be noted that the plurality of photo-detection cells may be driven row by row instead of being driven column by column. In that case, the light-emitting device 100A needs only form, within the object region, a light spot extending in a direction corresponding to the row-wise direction. The control circuit 500 allows a similar operation to be achieved by performing a column-wise scan with the row-wise extended light spot.

Figure 9A:
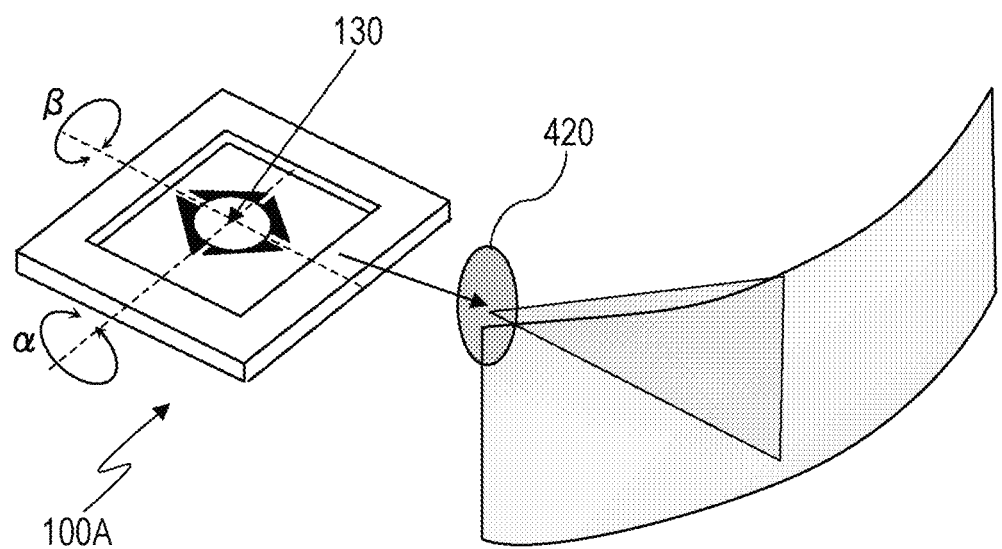
FIG. 9A is a schematic view showing another example in which to form a unidirectionally-extended light spot.

FIG. 9A is a schematic view showing another example in which to form a unidirectionally-extended light spot. A unidirectionally-extended light spot can be formed by using a cylindrical lens as the optical system 420 to be used in combination with the light-emitting device 100A.

Figure 9B:
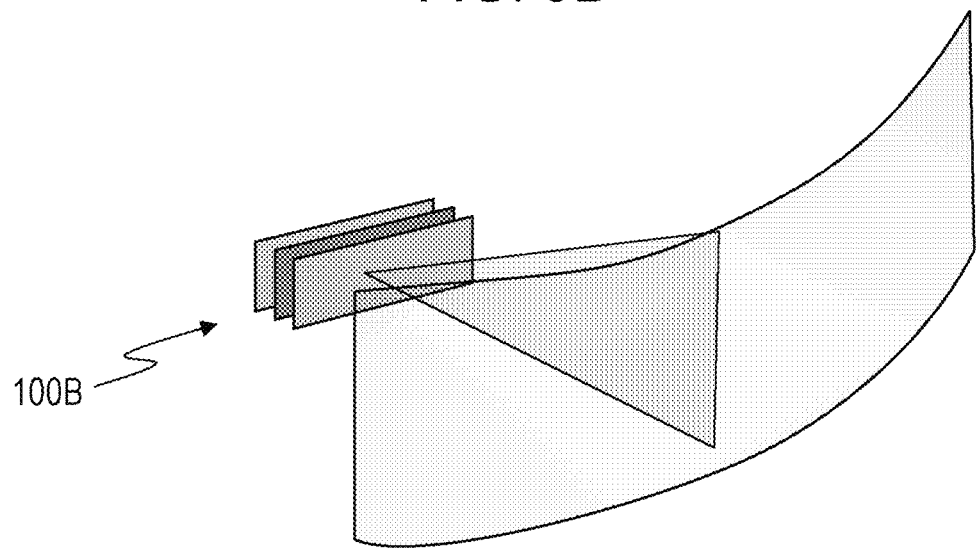
FIG. 9B is a schematic view showing still another example in which to form a unidirectionally-extended light spot.

FIG. 9B is a schematic view showing still another example in which to form a unidirectionally-extended light spot. This example uses a light-emitting device 100B that emits light according to principles which are different from those according to which the aforementioned light-emitting device 100A emits light. The light-emitting device 100B includes a structure similar to a waveguide element of an optical scanning device to be described in detail later. The waveguide element includes two mirrors facing each other and an optical guiding layer sandwiched therebetween. A first one of the mirrors has a higher light transmittance than a second one of the mirrors and causes a portion of light propagating through the optical guiding layer to be emitted toward the outside. The direction of emitted light can be varied by changing the refractive index or thickness of the optical guiding layer. Light that is emitted from such a light-emitting device 100B diverges in a direction perpendicular to the direction in which the waveguide element extends. Therefore, a unidirectionally-extended light spot can be formed by using such a light-emitting device 100B.

Figure 10:
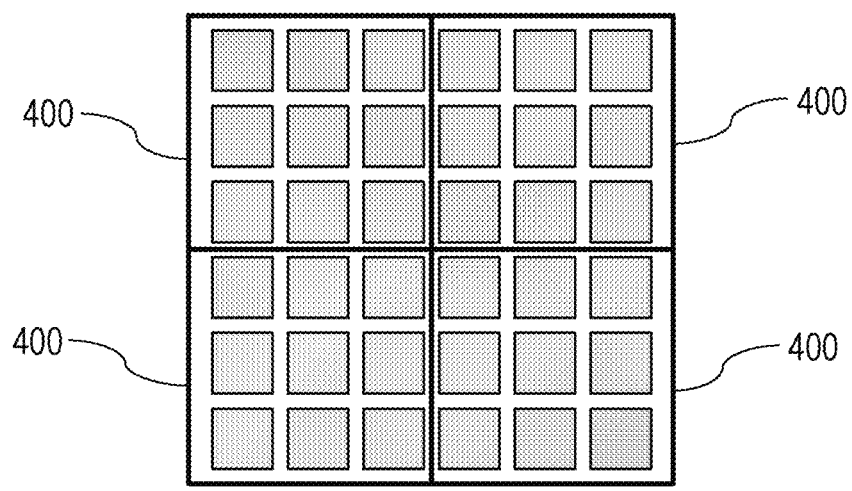
FIG. 10 is a diagram schematically showing another modification.

FIG. 10 is a diagram schematically showing another modification. An imaging system in this example generates one distance image by using a plurality of two-dimensionally arrayed imaging elements 400. It should be noted that although, for simplicity, FIG. 10 is drawn such that each imaging element 400 includes an extremely small number (nine) of photo-detection cells, each imaging element 400 can include a large number (e.g., thousands to tens of millions) of photo-detection cells in actuality. In this example, the control circuit 500 exercises batch control over the electronic shutters of all photo-detection cells of each imaging element 400. The control circuit 500 varies the direction of light pulses that are emitted from a light-emitting device and thereby causes the light pulses to fall on the plurality of imaging elements 400 in sequence so that the plurality of imaging elements 400 generate frames in sequence. The signal processing circuit 600 combines the frames that are outputted from the plurality of imaging element 400 and generates image data representing a distance distribution in an object region. Such a configuration eliminates the need to provide each imaging element 400 with a mechanism that can individually control the electronic shutter of each photo-detection cell. It should be noted that the plurality of two-dimensionally arrayed imaging elements 400 may be replaced by a plurality of one-dimensionally arrayed imaging elements 400. In a case where the light-emitting device performs a one-dimensional scan, such a configuration can be used.

Figure 11:
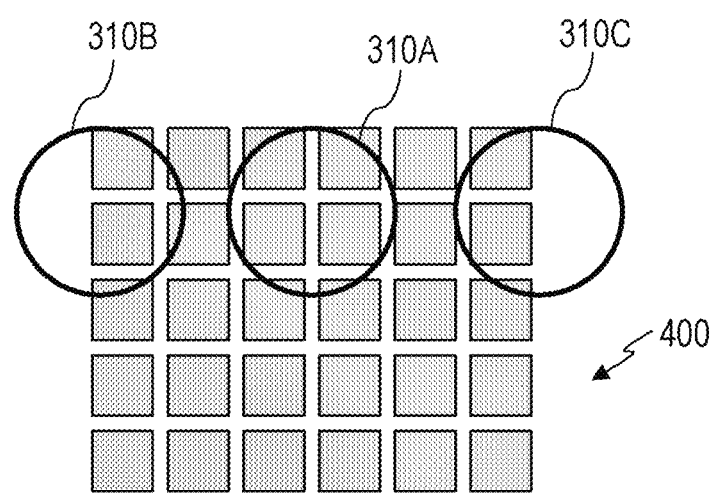
FIG. 11 is a diagram schematically showing still another modification.

FIG. 11 is a diagram schematically showing still another modification. A light-emitting device in this example has a diffraction structure that emits a plurality of diffracted beams including a zeroth-order diffracted beam and positive and negative first-order diffracted beams. Such a diffraction structure can be realized by a structure such as a diffraction element disposed in front of the light source or an array of waveguide elements of the after-mentioned optical scanning device. The regions 310A, 3106, and 310C indicated by circles in FIG. 11 represent light spots that are formed on the imaging surface by the zeroth-order diffracted beam, the positive first-order diffracted beam, and the negative first-order diffracted beam, respectively. When the direction of emitted light is varied, the light spots of the positive and negative first-order diffracted beams move as the light spot of the zeroth-order diffracted beam moves. The electronic shutters are controlled for each group of photo-detection cells onto which these light spots are projected. In this example, the control circuit 500 allows only a group of some of the plurality of photo-detection cells that receive at least portions of the zeroth-order diffracted beam and the positive and negative first-order diffracted beams to accumulate signal charge and does not allow the remaining photo-detection cells to accumulate signal charge. Different groups of photo-detection cells to be controlled are chosen every time the direction of emitted light from the light-emitting device is varied. Such a configuration can be realized by a simpler circuit configuration than the configuration in which each photo-detection cell is individually controlled.

Figure 12:
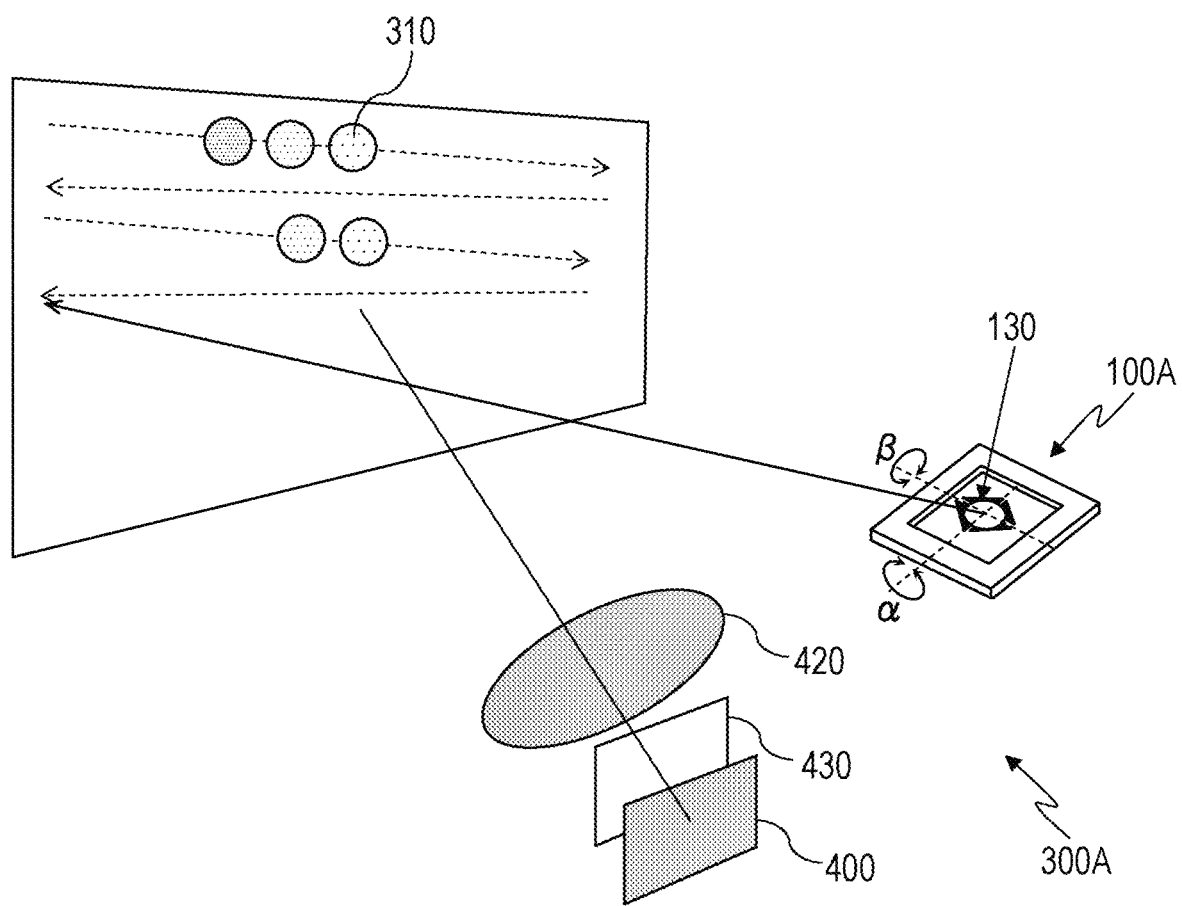
FIG. 12 is a diagram showing still another modification.

FIG. 12 is a diagram showing still another modification. In this example, the light-emitting device 100A emits only light of a comparatively narrow particular wavelength range. The imaging system 300A further includes an optical filter 430 that faces the plurality of photo-detection cells of the imaging element 400 and selectively transmits light of the wavelength range. The optical filter 430 may be incorporated in the imaging element 400. A combination of the light-emitting device 100A, which emits light a narrow band, and the optical filter 430 makes it possible to diminish the effect of extraneous light (or background light) and improve the S/N ratio.

In each aspect above, the imaging element 400 may concomitantly use a mechanical shutter mechanism in addition to the electronic shutter mechanism. In that case, the imaging element 400 includes a mechanical shutter that adjusts exposure for each photo-detection cell or each photo-detection cell group. For example, the imaging element 400 may apply electronic shutter control to photo-detection cells on which light from the light-emitting device 100A falls and may apply mechanical shutter control to the other photo-detection cells. That is, the imaging element 400 may use the electronic shutter mechanism to perform a high-speed shutter operation for use in distance measurement and use the mechanical shutter mechanism to perform a shutter operation for use in suppression of extraneous light. This makes it possible to prevent accumulation of signal charge by unwanted extraneous light.

Another Example of Light-Emitting Device

The following specifically describes another example of a light-emitting device (i.e., optical scanning device) that can be used in an imaging system according to an embodiment of the present disclosure.

Although the present disclosure does not limit the light-emitting device to any particular configuration, employing a configuration to be described below makes it possible to achieve a one-dimensional scan or a two-dimensional scan with light with a configuration that is simpler than the conventional ones.

The present inventors found that a scan with light is made possible with a simpler configuration by using a waveguide element including a pair of mirrors facing each other and an optical guiding layer sandwiched between the mirrors. A first one of the pair of mirrors of each waveguide element has a higher light transmittance than a second one of the pair of mirrors and causes a portion of light propagating through the optical guiding layer to be emitted toward the outside. As will be mentioned later, the direction of emitted light (or the angle of emission) can be varied by changing the refractive index and/or thickness of the optical guiding layer. More specifically, a component of the wave vector of emitted light in a direction along a longitudinal direction of the optical guiding layer can be changed by changing the refractive index and/or thickness. This allows a one-dimensional scan to be achieved.

Furthermore, in a case where an array of a plurality of waveguide elements is used, a two-dimensional scan can also be achieved. More specifically, the direction in which rays of light that are emitted from the plurality of waveguide elements reinforce one another can be varied by imparting an appropriate phase difference to light that is supplied to the plurality of waveguide elements and adjusting the phase difference. A change in phase difference effects a change in a component of the wave vector of emitted light in a direction crossing a direction along the longitudinal direction of the optical guiding layer. This makes it possible to achieve a two-dimensional scan. It should be noted that even in a case where a two-dimensional scan is performed, it is not necessary to change the refractive indices and/or thicknesses of the plurality of optical guiding layers by different amounts. That is, a two-dimensional scan can be performed by imparting an appropriate phase difference to light that is supplied to the plurality of waveguide elements and synchronously changing the refractive indices and/or thicknesses of the plurality of optical guiding layers by the same amount. Thus, the foregoing configuration makes it possible to achieve a two-dimensional scan with light with a comparatively simple configuration.

These basic principles can be similarly applied to uses where light signals are received as well as uses where light is emitted. The direction of light that can be received can be one-dimensionally varied by changing at least ether of the refractive index and thickness of each optical guiding layer. Furthermore, the direction of light that can be received can be two-dimensionally varied by changing the phase difference of light through a plurality of phase shifters connected to the plurality of waveguide elements, respectively.

Such an optical scanning device or optical receiver device can be used, for example, as an antenna in an LiDAR system serving as an example of an imaging system according to an embodiment of the present disclosure. The LiDAR system uses short-wavelength electromagnetic waves (e.g., visible light, infrared rays, ultraviolet rays) as compared with a radar system that uses radio waves such as millimeter waves, thus making it possible to find a distance distribution of an object with high resolution. Such a LiDAR system can be mounted on a movable body such as an automobile, a UAV (unmanned aerial vehicle, so-called drone), or an AGV (automated guide vehicle) to be used as one of the collision avoidance technologies.

Examples of "light" herein includes electromagnetic waves such as ultraviolet rays (whose wavelengths range from approximately 10 nm to approximately 400 nm) and infrared rays (whose wavelengths range from approximately 700 nm to approximately 1 mm) as well as visible light (whose wavelength ranges from approximately 400 nm to approximately 700 nm). Ultraviolet rays may be herein referred to as "ultraviolet light", and infrared rays as "infrared light".

The term "scan" with light herein means varying the direction of light. The term "one-dimensional scan" means linearly varying the direction of light along a direction crossing the direction of light. The term "two-dimensional scan" means two-dimensionally varying the direction of light along a plane crossing the direction of light.

The following describes in more detail an example of an optical scanning device that can be used in an imaging system according to an embodiment of the present disclosure.

Figure 13:
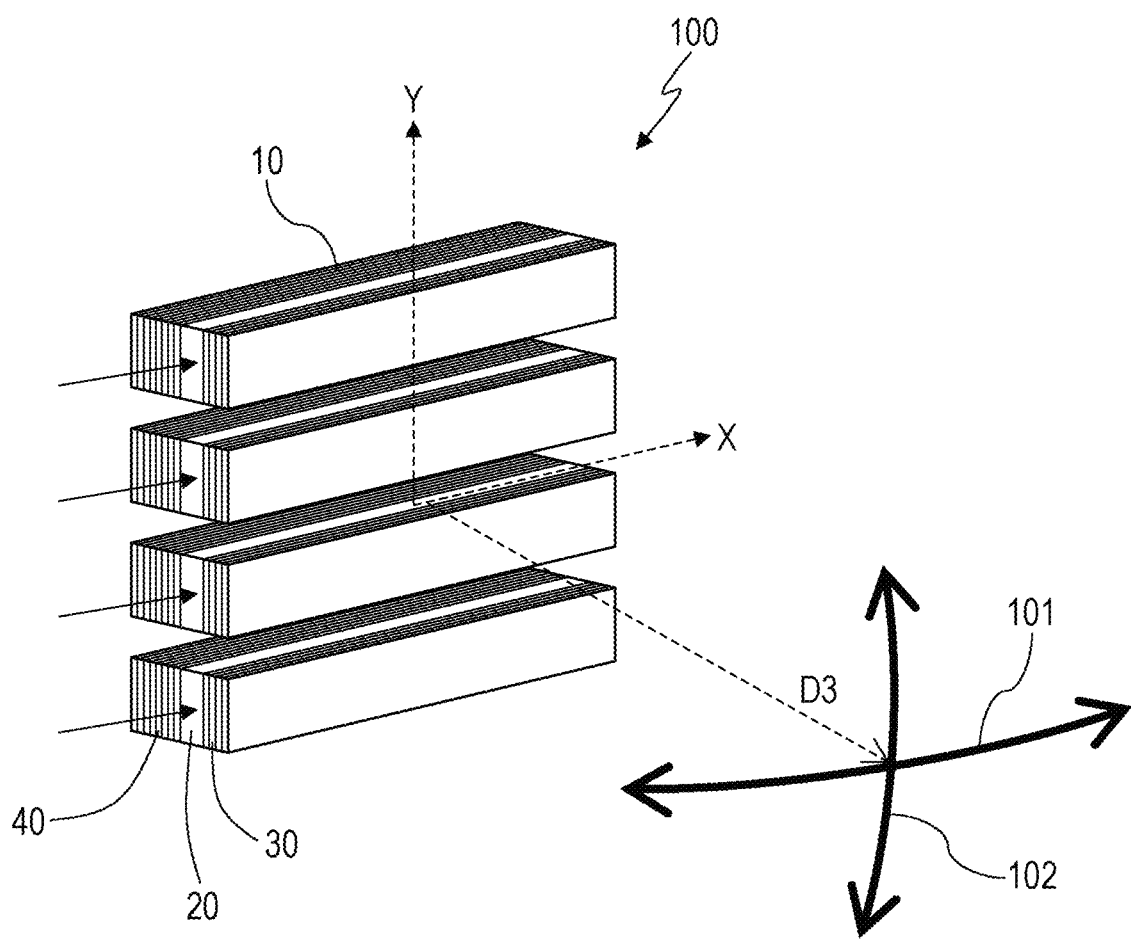
FIG. 13 is a perspective view schematically showing a configuration of an optical scanning device of an imaging system according to an exemplary embodiment of the present disclosure.

FIG. 13 is a perspective view schematically showing a configuration of an optical scanning device 100 according to an exemplary embodiment of the present disclosure. The optical scanning device 100 includes a waveguide array including a plurality of waveguide elements 10 regularly arrayed in a first direction (in FIG. 13, a Y direction). The plurality of waveguide elements 10 are an example of a plurality of second waveguides. Each of the plurality of waveguide elements 10 has a shape extending in a second direction (in FIG. 13, an X direction) crossing the first direction. The plurality of waveguide elements 10 propagates light in the second direction and, at the same time, emits light in a third direction D3 crossing a plane that is formed by the first and second directions. In other words, the plane that is formed by the first and second directions is a virtual plane that is parallel to the first and second directions. Although, in the present embodiment, the first direction (Y direction) and the second direction (X direction) are orthogonal to each other, they do not need to be orthogonal to each other. Although, in the present embodiment, the plurality of waveguide elements 10 are placed at regular intervals in the Y direction, they do not necessarily need to be placed at regular intervals.

It should be noted that the orientation of a structural body shown in a drawing of the present disclosure is set for ease of comprehension of explanations and is not intended to restrict in any way the orientation in which the structural body faces when an embodiment of the present disclosure is actually carried out. Further, the shape and size of the whole or any part of a structural body shown in a drawing are not intended to restrict the actual shape and size.

Each of the plurality of waveguide elements 10 includes first and second mirrors 30 and 40 facing each other (hereinafter sometimes simply referred to as "mirrors") and an optical guiding layer 20 located between the mirror 30 and the mirror 40. Each of the mirrors 30 and 40 has a reflecting surface at the interface with the optical guiding layer 20. The reflecting surface crosses the third direction D3. The mirrors 30 and 40 and the optical guiding layer 20 have shapes extending in the second direction (X direction). It should be noted that, as will be described later, the plurality of first mirrors 30 of the plurality of waveguide elements 10 may be a plurality of parts of an integrally-constructed third mirror. Further, the plurality of second mirrors 40 of the plurality of waveguide elements 10 may be a plurality of parts of an integrally-constructed fourth mirror. Furthermore, the plurality of optical guiding layers 20 of the plurality of waveguide elements 10 may be a plurality of parts of an integrally-constructed optical guiding layer. A plurality of waveguides can be formed at least by (1) each first mirror 30 being constructed separately from another first mirror 30, (2) each second mirror 40 being constructed separately from another second mirror 40, or (3) each optical guiding layer 20 being constructed separately from another optical guiding layer 20. The phrase "being constructed separately" encompasses not only physically providing a space but also placing a material of a different refractive index in between for separation. The reflecting surface of the first mirror 30 and the reflecting surface of the second mirror 40 face parallel to each other. Of the two mirrors 30 and 40, at least the first mirror 30 has the property of transmitting a portion of light propagating through the optical guiding layer 20. In other words, the first mirror 30 has a higher light transmittance with respect to the light than the second mirror 40. For this reason, a portion of the light propagating through the optical guiding layer 20 is emitted from the first mirror 30 toward the outside. Such mirrors 30 and 40 can be multilayer mirrors that are formed, for example, by dielectric multilayer films (sometimes referred to as "multilayer reflective films").

A two-dimensional scan with light can be achieved by controlling the phase of light that is inputted to each of the waveguide elements 10 and, furthermore, synchronously (and simultaneously) changing the reflective indices and/or thicknesses of the optical guiding layers 20 of these waveguide elements.

In order to achieve such a two-dimensional scan, the present inventors analyzed in detail the operating principle of a waveguide element 10. As a result of their analysis, the present inventors succeeded in achieving a two-dimensional scan with light by synchronously driving a plurality of waveguide elements 10.

As shown in FIG. 13, inputting light to each waveguide element 10 causes light to be emitted from the plane of emission of that waveguide element 10. The plane of emission is located on a side opposite to the reflecting surface of the first mirror 30. The direction D3 of the emitted light depends on the refractive index and thickness of the optical guiding layer 20 and the wavelength of light. In the present embodiment, the refractive index and/or thickness of each optical guiding layer 20 is synchronously controlled so that each waveguide element 10 emits light in substantially the same direction. This makes it possible to change an X-direction component of the wave vector of light that is emitted from the plurality of waveguide elements. In other words, the direction D3 of emitted light can be varied along a direction 101 shown in FIG. 13.

Furthermore, since the plurality of waveguide elements 10 emit rays of light in the same direction, the emitted rays of light interfere with one another. The direction in which the rays of light reinforce one another by interfering can be varied by controlling the phase of the light that is emitted from each of the waveguide elements 10. For example, in a case where a plurality of waveguide elements 10 of the same size are placed at regular intervals in the Y direction, rays of light differing in phase by increments of a constant amount are inputted to the plurality of waveguide elements 10. By changing the phase difference, a Y-direction component of the wave vector of emitted light can be changed. In other words, the direction D3 in which the emitted rays of light reinforce one another can be varied along a direction 102 shown in FIG. 13 by varying phase differences among rays of light that are introduced into the plurality of waveguide elements 10. This makes it possible to achieve a two-dimensional scan with light.

The following describes in more detail the configuration and operating principle of the optical scanning device 100 according to the present embodiment.

Operating Principle of Waveguide Element

Figure 14:
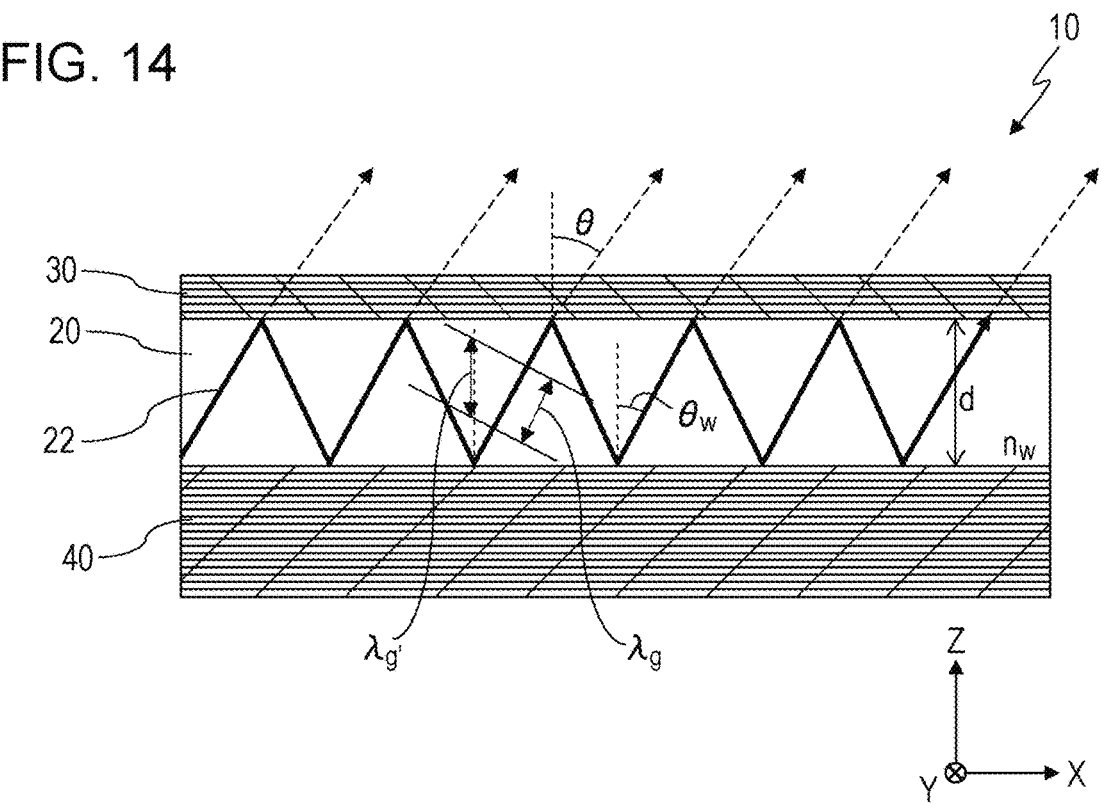
FIG. 14 is a diagram schematically showing a cross-sectional structure of one waveguide element and an example of light propagating therethrough.

FIG. 14 is a diagram schematically showing a cross-sectional structure of one waveguide element 10 and an example of light propagating therethrough. FIG. 14 schematically shows a cross-section of the waveguide element 10 that is parallel to an XZ plane, with the Z direction being a direction perpendicular to the X and Y direction shown in FIG. 13. In the waveguide element 10, a pair of mirrors 30 and 40 are disposed so that an optical guiding layer 20 is sandwiched therebetween. Light introduced into the optical guiding layer 20 through an end thereof in the X direction propagates through the optical guiding layer 20 while being repeatedly reflected by the first mirror 30 provided on an upper surface (i.e., a surface on the upper side of FIG. 14) of the optical guiding layer 20 and the second mirror 40 provided on a lower surface (i.e., a surface on the lower side of FIG. 14) of the optical guiding layer 20. The light transmittance of the first mirror 30 is higher that the light transmittance of the second mirror 40. This makes it possible to output a portion of light mainly from the first mirror 30.

In the case of a common waveguide such as an optical fiber, light propagates along the waveguide while repeating total reflection. On the other hand, in the case of the waveguide element 10 according to the present embodiment, light propagates while being repeatedly reflected by the mirrors 30 and 40 disposed on the upper and lower surfaces, respectively, of the optical guiding layer 20. For this reason, there is no restrictions on the angle of propagation of light (i.e., the angle of incidence on the interface between the mirror 30 or 40 and the optical guiding layer 20), so that light falling on the mirror 30 or 40 at a more nearly perpendicular angle can propagate. That is, light falling on the interface at an angle that is smaller than the critical angle of total reflection (i.e., an more nearly perpendicular angle) can propagate. For this reason, the group velocity of light in the direction of propagation of light is much lower than the velocity of light in free space. Because of this, the waveguide element 10 has such a property that propagation conditions of light vary greatly with respect to changes in the wavelength of light, in the thickness of the optical guiding layer 20, and in the refractive index of the optical guiding layer 20.

The propagation of light through the waveguide element 10 is described in more detail. Let it be assumed that $n_w$ is the refractive index of the optical guiding layer 20 and d is the thickness of the optical guiding layer 20. Note here that the thickness d of the optical guiding layer 20 is the size of the optical guiding layer 20 in a direction normal to the reflecting surface of the mirror 30 or 40. Considering the interference condition of light, the angle of propagation $\theta_w$ of light of wavelength λ satisfies Expression (1):

$$2dn_w \cos \theta_w = m\lambda \tag{1}$$

where m is the mode number. Expression (1) is equivalent to the condition in which light in the optical guiding layer 20 forms a standing wave in a thickness direction. When the wavelength $\lambda_g$ in the optical guiding layer 20 is $\lambda/n_w$, it can be assumed that the wavelength $\lambda_{g'}$ in the thickness direction of the optical guiding layer 20 is $\lambda/(n_w \cos \theta_w)$. When the thickness d of the optical guiding layer 20 is equal to an integral multiple of a half $\lambda/(2n_w \cos \theta_w)$ of the wavelength $\lambda_{g'}$ in the thickness direction of the optical guiding layer 20, a standing wave is formed. From this condition, Expression (1) is obtained. It should be noted that, in Expression (1), m represents the number of anti-nodes of a standing wave.

In a case where the mirrors 30 and 40 are multilayer mirrors, light also penetrates into the mirrors 30 and 40 at the time of reflection. For this reason, it is technically necessary that a term corresponding to the optical path length by which the light penetrated be appended to the left-hand side of Expression (1). However, since the effects of the refractive index $n_w$ and thickness d of the optical guiding layer 20 are much greater than the effect of the penetration of the light into the mirrors 30 and 40, a basic operation can be explained by Expression (1).

The angle of emission θ at which light propagating through the optical guiding layer 20 is emitted through the first mirror 30 to the outside (which is typically air) can be described as in Expression (2) below according to Snell's law.

$$\sin\theta = n_w \sin\theta_w \qquad (2)$$

Expression (2) is obtained from the condition in which the wavelength λ/sin θ in a planar direction of light on the air side and the wavelength λ/($n_w$ sin $\theta_w$) in the direction of propagation of light on the waveguide element 10 side are equal on the plane of emission of light.

From Expressions (1) and (2), the angle of emission θ can be described as in Expression (3):

$$\sin\theta = \sqrt{n_w^2 - \left(\frac{m\lambda}{2d}\right)^2} \qquad (3)$$

As can be seen from Expression (3), the direction of emission of light can be varied by changing any of the wavelength λ of light, the refractive index $n_w$ of the optical guiding layer 20, and the thickness of the optical guiding layer 20.

For example, in a case where $n_w$=2, d=387 nm, =1550 nm, and m=1, the angle of emission is 0 degree. A change in refractive index from this state to $n_w$=2.2 causes the angle of emission to change to approximately 66 degrees. Meanwhile, a change in thickness to d=420 nm without a change in refractive index causes the angle of emission to change to approximately 51 degrees. A change in wavelength to λ=1500 nm without a change in refractive index or thickness causes the angle of emission to change to approximately 30 degrees. In this way, the direction of emission of light can be greatly varied by changing any of the wavelength λ of light, the refractive index $n_w$ of the optical guiding layer 20, and the thickness of the optical guiding layer 20.

It is conceivable, on this principle, that the direction of emission of light may be controlled by providing wavelength-variable means for varying the wavelength of light propagating through the optical guiding layer 20. However, incorporation of the wavelength-variable means into a light source such as a laser makes the light source complex in configuration.

To address this problem, the optical scanning device 100 according to the present embodiment controls the direction of emission of light by controlling the refractive index $n_w$ and/or thickness d of the optical guiding layer 20. In the present embodiment, the wavelength λ of light does not vary but is held constant during operation. The wavelength λ is not limit to any particular value. For example, the wavelength λ can be included in a wavelength range of 400 nm to 1100 nm (from visible light to near-infrared light) in which a photodetector or an image sensor that detects light by absorbing light by means of common silicon (Si) gives high detection sensitivity. In another example, the wavelength λ can be included in a wavelength range of near-infrared light of 1260 nm to 1262 nm in which an optical fiber or a Si waveguide is comparatively small in transmission loss. It should be noted that these wavelength ranges are merely examples. The wavelength range of light to be used is not limited to a wavelength range of visible light or infrared light but may for example be a wavelength range of ultraviolet light. Although wavelength control is not performed in the present embodiment, wavelength-varying control may be performed in addition to the refractive-index and/or thickness control.

The present inventors verified, on the basis of an optical analysis, whether it is actually possible to emit light in a particular direction as above. The optical analysis was conducted by calculations using Cybernet Systems' Diffract MOD. This simulation is based on RCWT (rigorous coupled wave theory) and makes it possible to accurately calculate the effect of wave optics.

Figure 15:
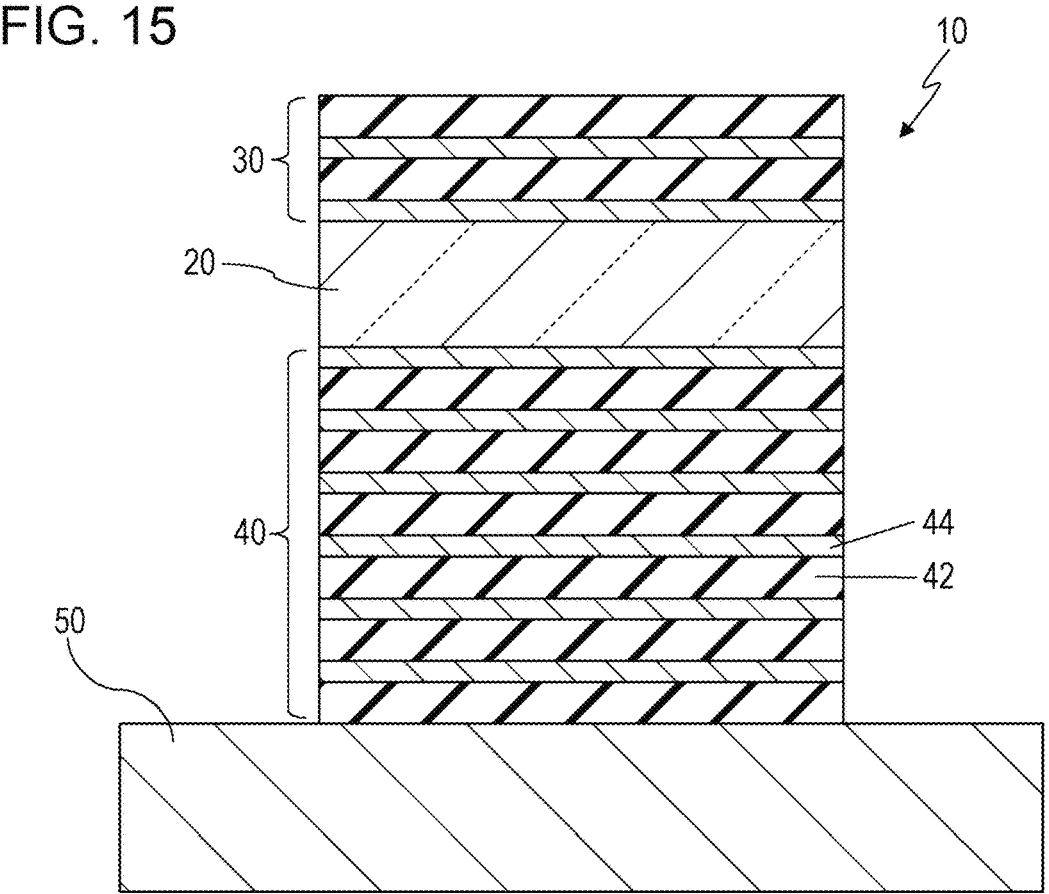
FIG. 15 is a diagram schematically showing a computation model used in a simulation.

FIG. 15 is a diagram schematically showing a computation model used in the present simulation. In this computation model, the second mirror 40 is stacked on a substrate 50, with the optical guiding layer 20 stacked on the second mirror 40 and the first mirror 30 stacked on the optical guiding layer 20. The first mirror 30 and the second mirror 40 are both multilayer mirrors including dielectric multilayer films. The second mirror 40 has a structure in which six low-refractive-index layers 42 with a relatively low refractive index and six high-refractive-index layers 44 with a relatively high refractive index (i.e., a total of twelve layers) are alternately stacked. The first mirror 30 has a structure in which two low-refractive-index layers 42 and two high-refractive-index layers 44 (i.e., a total of four layers) are alternately stacked. The optical guiding layer 20 is disposed between the mirror 30 and the mirror 40. The medium other than the waveguide element and the substrate 50 is air.

This model was used to examine optical response to incident light with varying angles of incidence of light. This corresponds to examining how much incident light from air and the optical guiding layer 20 are coupled to each other. Depending on the condition in which the incident light is coupled to the optical guiding layer 20, a reverse process takes place by which light having propagated through the optical guiding layer 20 is emitted toward the outside. Therefore, finding the angle of incidence in a case where the incident light is coupled to the optical guiding layer 20 is equivalent to finding the angle of emission at which the light having propagated through the optical guiding layer 20 exits outward. When the incident light is coupled to the optical guiding layer 20, there occurs a loss in the optical guiding layer 20 due to absorption and scattering of light. That is, under a condition in which a great loss occurs, the incident light is strongly coupled to the optical guiding layer 20. If there is no loss of light due to absorption or the like, the sum of the transmittance and reflectance of light is 1, but if there is a loss, the sum of the transmittance and the reflectance is smaller than 1. The present calculation took the effect of absorption of light by calculating, as the magnitude of a loss, a value obtained by introducing an imaginary part into the refractive index of the optical guiding layer 20 and subtracting the sum of the transmittance and the reflectance from 1.

The present simulation assumed that the substrate 50 is made of Si, that each of the low-refractive-index layers 42 is made of $SiO_2$ (with a thickness of 267 nm), and that each of the high-refractive-index layers 44 is made of Si (with a thickness of 108 nm). The magnitude of a loss of light of the wavelength λ=1.55 μm was calculated with varying angles of incidence.

Figure 16A:
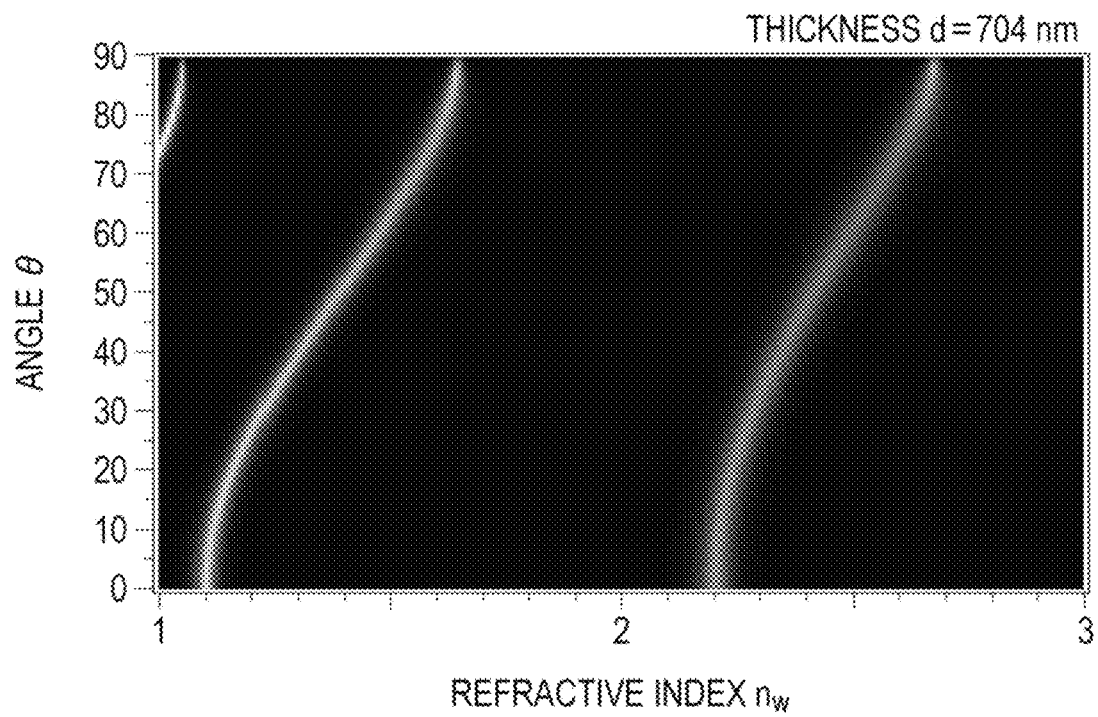
FIG. 16A shows a result of calculating a relationship between the refractive index $n_w$ of an optical guiding layer in a case where the thickness d of the optical guiding layer is 704 nm and the angle of emission θ of light whose mode number m is 1.

FIG. 16A shows a result of calculating a relationship between the refractive index $n_w$ of the optical guiding layer 20 in a case where the thickness d of the optical guiding layer 20 is 704 nm and the angle of emission θ of light whose mode number m is 1. While lines represent great losses. As shown in FIG. 16A, the angle of emission θ of light with a mode number m of 1 is 0 degree near $n_w$=2.2. An example of a substance with a refractive index close to $n_w$=2.2 is lithium niobium.

Figure 16B:
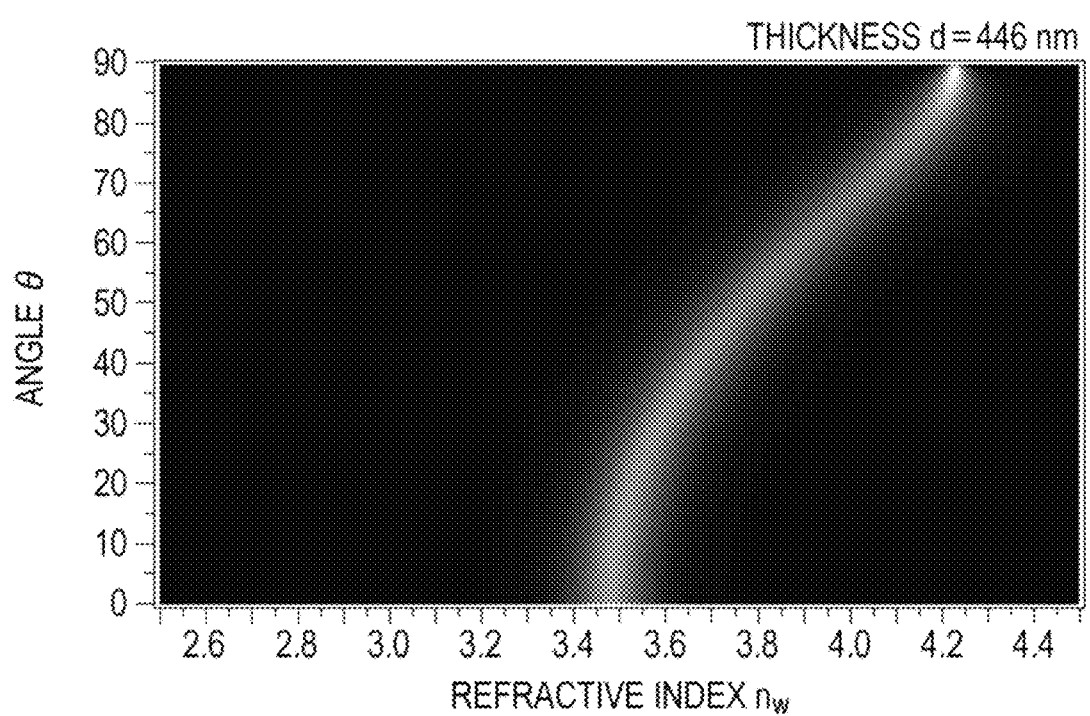
FIG. 16B shows a result of calculating a relationship between the refractive index $n_w$ of the optical guiding layer in a case where the thickness d of the optical guiding layer is 446 nm and the angle of emission θ of light whose mode number m is 1.

FIG. 16B shows a result of calculating a relationship between the refractive index $n_w$ of the optical guiding layer in a case where the thickness d of the optical guiding layer is 446 nm and the angle of emission θ of light whose mode number m is 1. As shown in FIG. 16B, the angle of emission θ of light with a mode number m of 1 is 0 degree near $n_w$=3.45. An example of a substance with a refractive index close to $n_w$=3.45 is silicon (Si).

By thus adjusting the thickness d of the optical guiding layer 20, a design can be made so that the angle of emission θ of light with a particular mode number (e.g., m=1) is 0 degree with respect to a particular refractive index $n_w$ of the optical guiding layer 20.

As shown in FIGS. 16A and 16B, it was confirmed that the angle of emission θ varies greatly with changes in refractive index. As will be mentioned later, a refractive-index change can be effected by any of various methods such as carrier injection, an electro-optic effect, and a thermo-optic effect. A refractive-index change effected by such a method is approximately 0.1, which is not so great. Therefore, it has so far been believed that such a small refractive-index change will not cause the angle of emission to vary so greatly. However, as shown in FIGS. 16A and 16B, it was found that near a refractive index at which the angle of emission θ is 0 degree, an increase of 0.1 in refractive index causes the angle of emission θ to change from 0 degree to approximately 30 degrees. In this way, the waveguide element 10 according to the present embodiment makes it possible to greatly adjust the angle of emission even with a small refractive-index change.

Similarly, as can be seen from a comparison between FIGS. 16A and 16B, it was confirmed that the angle of emission θ vary greatly with changes in the thickness d of the optical guiding layer 20. As will be mentioned later, the thickness d can be varied, for example, by an actuator connected to at least either of the two mirrors. The angle of emission can be greatly adjusted even with a small change in the thickness d.

Thus, it is only necessary to change the refractive index $n_w$ and/or thickness d of the optical guiding layer 20 in order to vary the direction of light that is emitted from the waveguide element 10. To achieve this, the optical scanning device 100 according to the present embodiment includes a first adjustment element that changes the refractive index and/or thickness of the optical guiding layer 20 of each waveguide element 10. An example configuration of the first adjustment element will be described later.

As noted above, use of the waveguide element 10 makes it possible to greatly vary the direction of emission of light by changing the refractive index $n_w$ and/or thickness d of the optical guiding layer 20. This allows the angle of emission of light that is emitted from the mirror 30 to vary in a direction along the waveguide element 10. In order to achieve such a one-dimensional scan, it is not necessary to use an array of waveguide elements 10 but it is only necessary to use at least one waveguide element 10.

Figure 45:
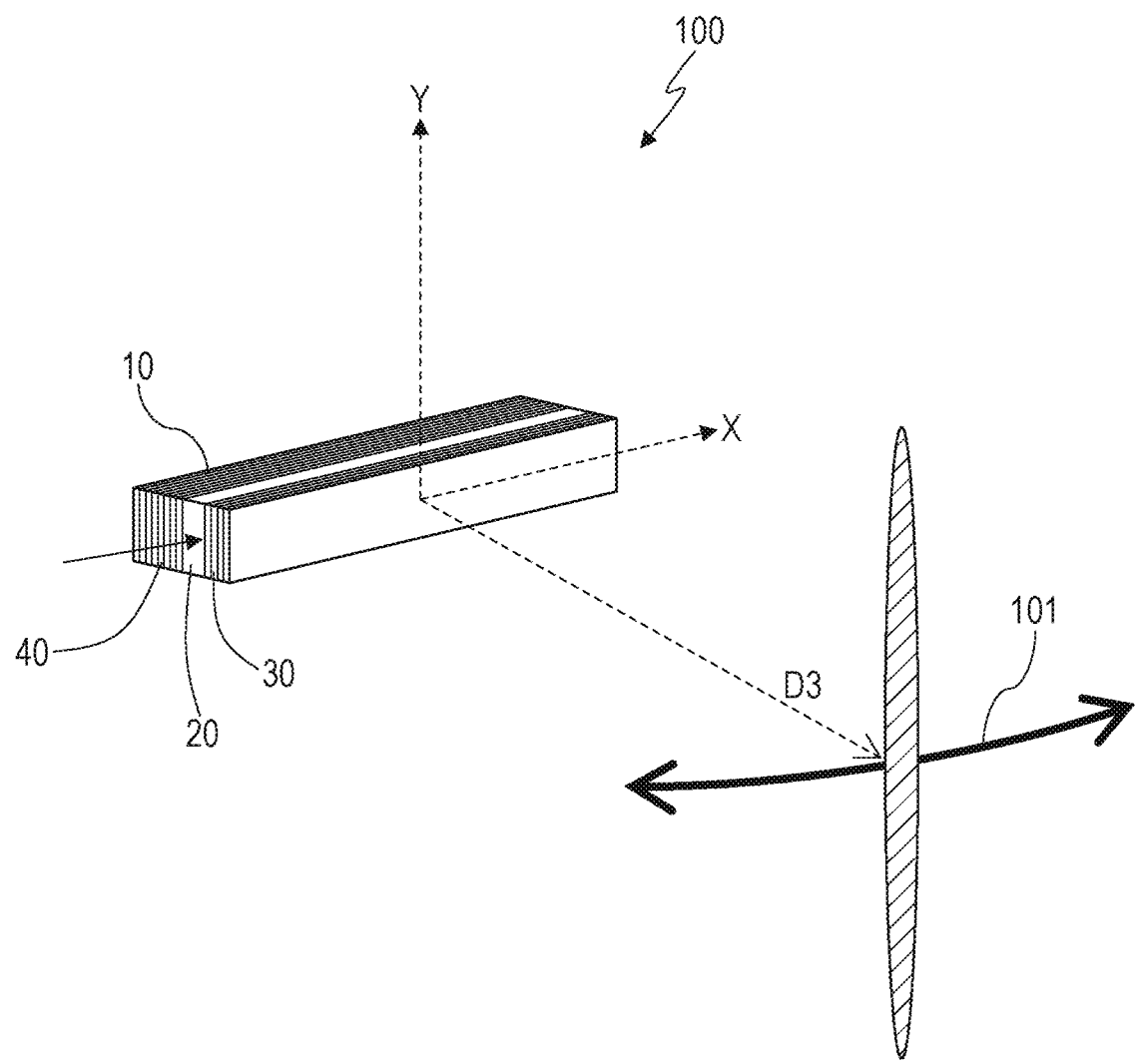
FIG. 45 is a diagram schematically showing an example of the optical scanning device that achieves a one-dimensional scan with a single waveguide element.

FIG. 45 is a diagram schematically showing an example of the optical scanning device 100 that achieves a one-dimensional scan with a single waveguide element 10. In this example, a beam spot that extends in the Y direction is formed. Changing the refractive index of the optical guiding layer 20 allows the beam spot to move along the X direction. This allows a one-dimensional scan to be achieved. Since the beam spot extends in the Y direction, a comparatively wide area extending two-dimensionally can be scanned even with a unidirectional scan. In a use where a two-dimensional scan is unnecessary, such a configuration as that shown in FIG. 45 can be employed.

In a case of achieving a two-dimensional scan, a waveguide array in which, as shown in FIG. 13, a plurality of waveguide elements 10 are arrayed is used. When the phases of light propagating through the plurality of waveguide elements 10 satisfy a particular condition, the light exits in a particular direction. When the condition of the phases varies, the direction of emission of light also changes in the array direction of the waveguide array. That is, a two-dimensional scan can be achieve by using the waveguide array. An example of a specific configuration for achieving a two-dimensional scan will be described later.

As noted above, with use of at least one waveguide element 10, the direction of emission of light can be varied by changing the refractive index and/or thickness of the optical guiding layer 20 of the waveguide element 10. However, there has been room for improvement in the configuration in which light is efficiently introduced into a waveguide element 10. Unlike a common waveguide (hereinafter sometimes referred to as "total reflection waveguide") that utilizes total reflection of light, a waveguide element 10 according to an embodiment of the present disclosure includes a waveguide structure (hereinafter sometimes referred to as "reflective waveguide") in which an optical guiding layer is sandwiched between a pair of mirrors (e.g., multilayer reflective films). No due consideration has so far been given to coupling of light to such a reflective waveguide. The present inventors conceived of a novel structure for efficiently introducing light into the optical guiding layer 20.

Figure 55A:
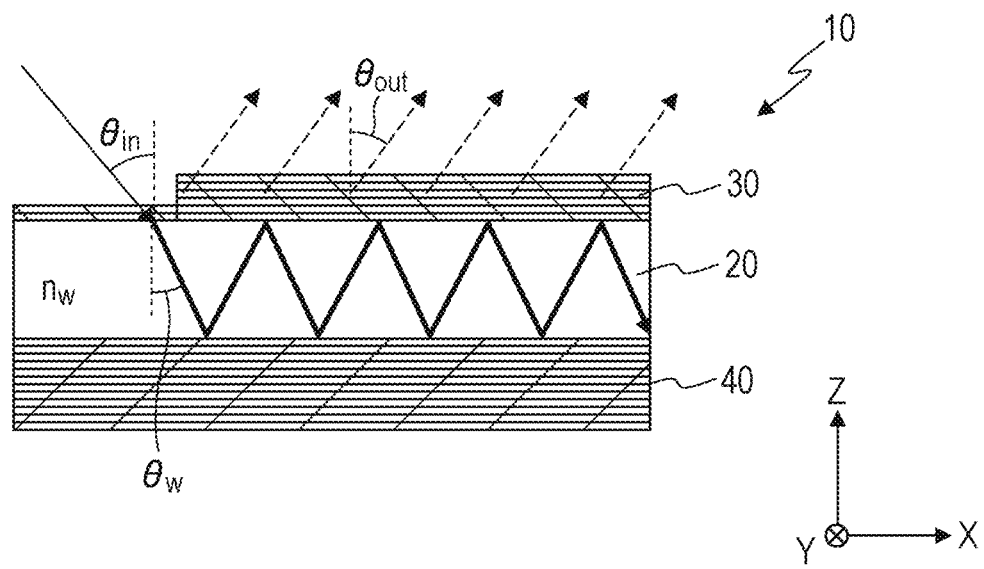
FIG. 55A is a cross-sectional view schematically showing a comparative example of a configuration in which light is inputted to a waveguide element.

FIG. 55A is a cross-sectional view schematically showing a comparative example of a configuration in which light is inputted indirectly to an optical guiding layer 20 via air and a mirror 30. In the present comparative example, propagating light is indirectly introduced from the outside via air and the mirror 30 into the optical guiding layer 20 of a waveguide element 10 that is a reflective waveguide. In order to introduce light into the optical guiding layer 20, it is necessary to satisfy Snell's law ($n_{in}$ sin $θ_{in}$=$n_w$ sin $θ_w$) with respect to the angle of reflection $θ_w$ of the guided light inside the optical guiding layer 20. Note here that $n_{in}$ is the refractive index of an external medium, $θ_{in}$ is the angle of incidence of propagating light, and $n_w$ is the refractive index of the optical guiding layer 20. By adjusting the angle of incidence $θ_{in}$ in consideration of this condition, the coupling efficiency of light can be maximized. Furthermore, in this example, a part of the first mirror 30 is provided with a portion with a reduced number of anti-nodes of the multilayer reflective film. Inputting of light from the portion makes it possible to enhance the coupling efficiency. However, such a configuration raises the need to vary the angle of incidence $θ_{in}$ of light on the optical guiding layer 20 with changes in the propagation constant (i.e., changes in $θ_{wav}$) of the optical guiding layer 20.

Figure 55B:
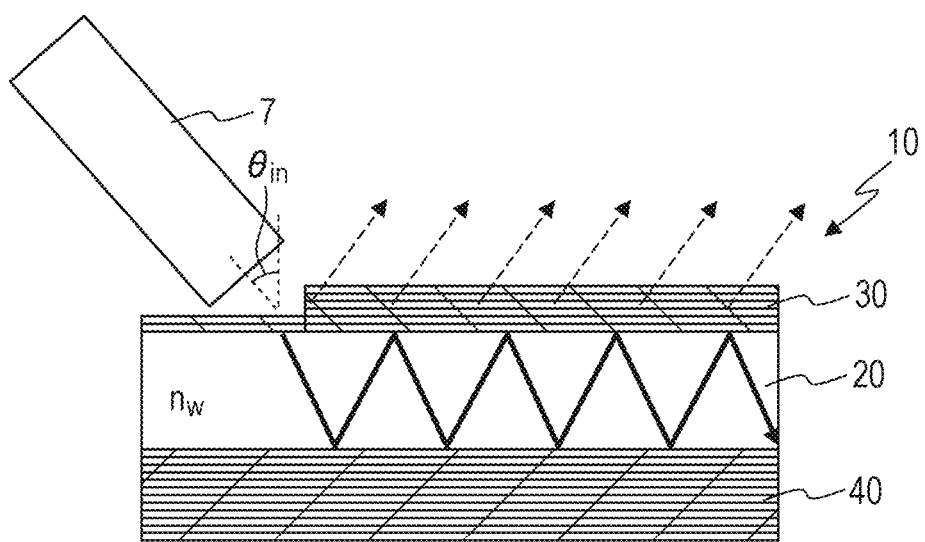
FIG. 55B is a diagram showing an example of a configuration in which light falls on a waveguide element through an optical fiber.

Even if there occurs a change in the propagation constant of the optical guiding layer 20, the condition in which light can always be coupled to a waveguide is held by a method by which to cause a beam with angle spread to fall on a portion of a multilayer reflective film with a reduced number of anti-nodes. In an example of such a method, as shown in FIG. 55B, an optical fiber 7 disposed at an angle of inclination $θ_{in}$ with respect to the direction normal to the mirror 30 causes light to indirectly fall on the waveguide element 10 from the outside via air and the mirror 30. The following discusses coupling efficiency that is achieved in this case. For simplicity, light is considered as a ray of light. The numerical aperture (NA) of a normal single-mode fiber is approximately 0.14. This is converted into an angle of approximately ±8 degrees. The range of angle of incidence of light that is coupled to a waveguide is comparable to the angle of divergence of light that is emitted from the waveguide. The angle of divergence $\theta_{div}$ of emitted light is expressed by Expression (4):

$$\theta_{div} \approx \frac{\lambda}{L \cos \theta_{out}} \quad (4)$$

Figure 56:
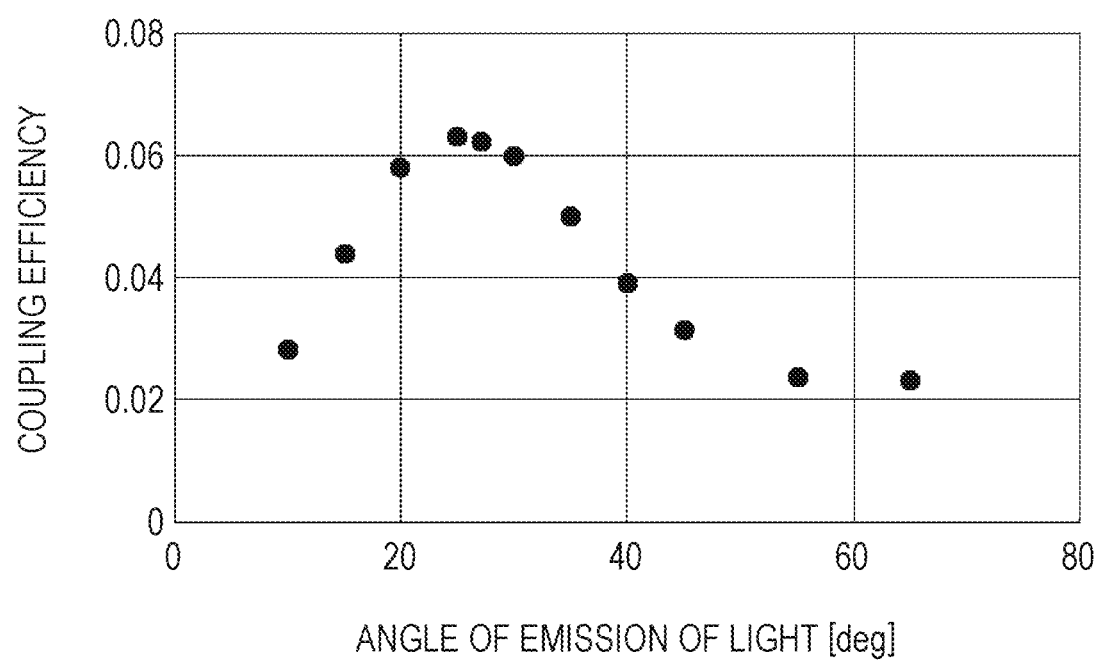
FIG. 56 is a graph showing changes in coupling efficiency that occur when the angle of emission $\theta_{out}$ of light is varied by changing the refractive index $n_w$ of a waveguide with the angle of incidence $\theta_{in}$ of light fixed.

Note here that L is the propagation length, λ is the wavelength of light, and $\theta_{out}$ is the angle of emission of light. When L is 10 μm or longer, $\theta_{div}$ is at most one degree or smaller. Therefore, the coupling efficiency of light from the optical fiber 7 is 1/16×100% (i.e., about 6.3%) or lower. Furthermore, FIG. 56 shows a result of calculating changes in coupling efficiency that occur when the angle of emission $\theta_{out}$ of light is varied by changing the refractive index $n_w$ of a waveguide with the angle of incidence $\theta_{in}$ of light fixed. The coupling efficiency represents the ratio of the energy of guided light to the energy of incident light. The result shown in FIG. 56 was obtained by calculating the coupling efficiency with an angle of incidence of 30 degrees, a waveguide film thickness of 1.125 μm, and a wavelength of 1.55 μm. In this calculation, the angle of emission $\theta_{out}$ was varied within a range of 10 degrees to 65 degrees by changing the refractive index $n_w$ within a range of 1.44 to 1.78. As shown in FIG. 56, in such a configuration, the coupling efficiency is at most lower than 7%. Further, with a change in the angle of emission $\theta_{out}$ by 20 degrees or more from the angle of emission at which the coupling efficiency reaches its peak, the coupling efficiency further becomes lower by half or more.

In this way, changing the propagation constant by changing the refractive index or the like of the waveguide for optical scanning, the coupling efficiency further becomes lower. In order to maintain the coupling efficiency, it is necessary to vary the angle of incidence $\theta_{in}$ of light with changes in the propagation constant. However, the introduction of a mechanism that varies the angle of incidence $\theta_{in}$ of light invites a complicated apparatus configuration. The present inventors conceived that the angle of incidence of light can be fixed by providing, in front of a region having a waveguide that effects a reflective-index or thickness change, a region having a waveguide whose refractive index and thickness are held constant.

Figure 46:
FIG. 46 is a diagram schematically showing a configuration of a total reflection waveguide.
Figure 47:
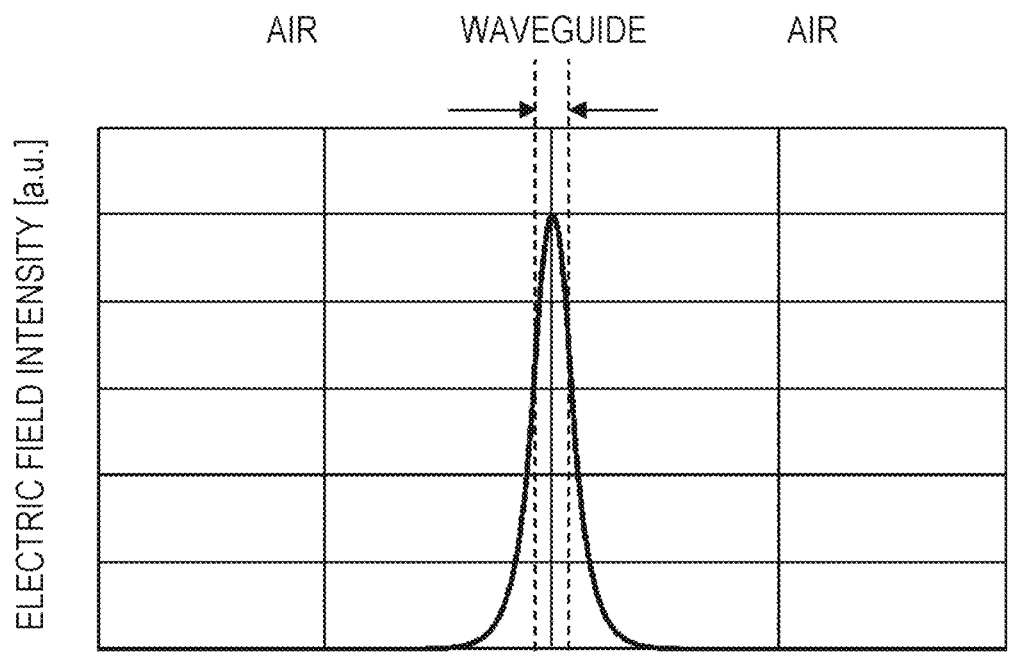
FIG. 47 is a diagram showing an electric field intensity distribution of the total reflection waveguide.
Figure 48:
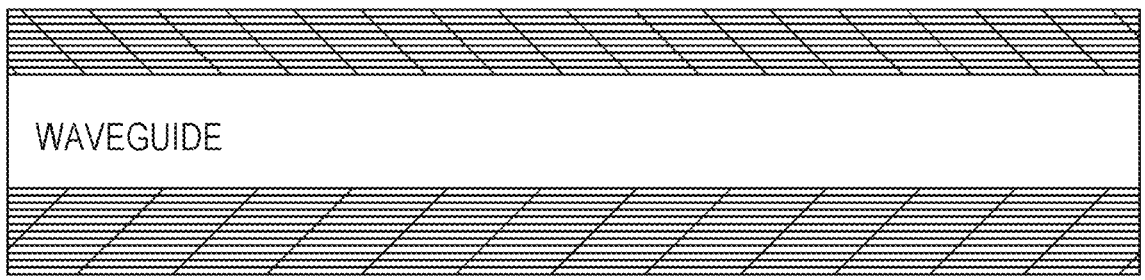
FIG. 48 is a diagram schematically showing a configuration of a slow light waveguide.
Figure 49:
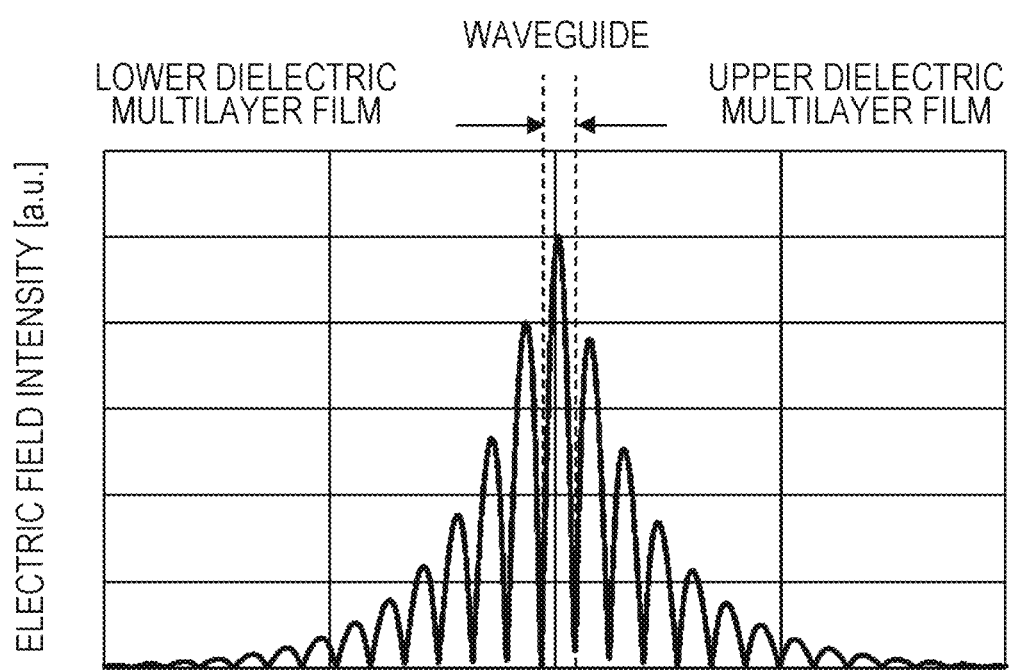
FIG. 49 is a diagram showing an electric field intensity distribution of the slow light waveguide.

Further, there are two major factors in the study of coupling of guided light in two different waveguides. The first major factor is the propagation constant of propagating light, and the second major factor is the electric field intensity distribution of a mode. The closer the two waveguides are in these factors to each other, the higher the coupling efficiency becomes. The propagation constant β of propagating light in a waveguide is expressed by β=k·sin $\theta_w$=(2π$n_w$ sin $\theta_w$)/λ, in terms of geometrical optics for simplicity. Let it be assumed that k is a wave number, $\theta_w$ is a waveguide angle, and $n_w$ is a guiding layer refractive index. A total reflection waveguide satisfies the total reflection condition $n_w$ sin $\theta_w$>1, as it confines guided light to the guiding layer by means of total reflection. Meanwhile, a slow light waveguide ends up with $n_w$ sin $\theta_w$<1, as it confines light to the waveguide by means of multilayer reflective films present on the upper and lower surfaces of the waveguide and emits a portion of the guided light over the multilayer reflective films. The total reflection waveguide and the slow light waveguide, which emits a portion of the guided light, cannot be equal in propagation constant to each other. As for the electric field intensity distribution, the electric field intensity distribution of a total reflection waveguide shown in FIG. 46 has a peak within the waveguide and monotonically decreases outside the waveguide as shown in FIG. 47. However, a slow light waveguide shown in FIG. 48 has an electric field intensity distribution shown in FIG. 49. This electric field intensity distribution, too, has a peak within the waveguide. However, since the guided light is reflected by interference of light within the dielectric multilayer films, the electric field intensity deeply seeps through the dielectric multilayer films and vibrationally changes as shown in FIG. 49. As noted above, the total reflection waveguide and the slow light waveguide differ greatly both in propagation constant of propagating light and in electric field intensity distribution from each other. Therefore, it has been hard to imagine joining a total reflection waveguide and a slow light waveguide directly to each other. The present inventors discovered that a total reflection waveguide can be joined directly to an optical guiding layer having a variable refractive index and/or a variable thickness.

Figure 50:
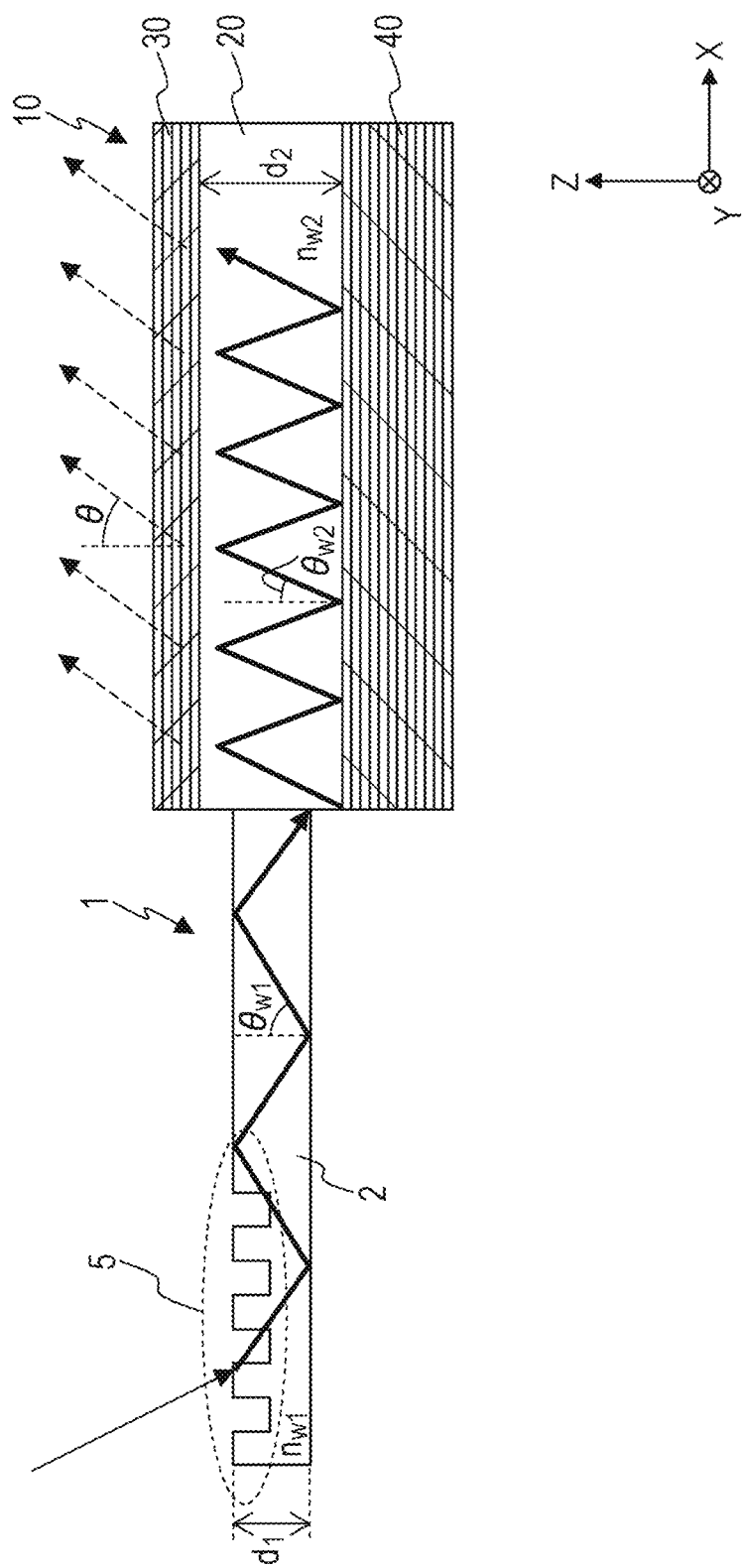
FIG. 50 is a cross-sectional view schematically showing an example of a structure of a part of the optical scanning device.

FIG. 50 is a cross-sectional view schematically showing an example of a structure of a part of the optical scanning device 100. In this example, the optical scanning device 100 includes a waveguide 1 and a waveguide element 10. The waveguide 1 propagates light from the light source 130 by means of total reflection. The waveguide element 10 includes a first mirror 30, a second mirror 40 facing the first mirror 30, and an optical guiding layer 20 joined directly to the waveguide 1 and located between the first mirror 30 and the second mirror 40. The optical guiding layer 20 has a variable thickness and/or a variable refractive index with respect to the light and propagates the light having propagated through the waveguide 1. The first mirror 30 has a higher light transmittance than the second mirror 40 and causes a portion of light propagating through the optical guiding layer 20 to be emitted as emitted light toward outside the waveguide element 10. In the present disclosure, when A is "joined directly" to B, any part of A is in direct contact with any part of B without a gap so that the giving and receiving of light is possible between A and B.

The waveguide 1 propagates light by means of total reflection. The waveguide 1 has a grating on a part of its surface. Light is inputted via the grating 5. In this example, the place where the grating 5 is provided functions as a light input section. Providing the grating 5 makes it easy to introduce light into the waveguide 1. Note here that a design is made so that the waveguide angle $\theta_{w1}$ satisfies the total reflection condition. The refractive index of the waveguide 1 does not change or changes by an amount which is different from by which the refractive index of the optical guiding layer 20 changes. Further, the thickness of the waveguide 1, i.e., the thickness of an optical guiding layer 2, does not change or changes by an amount which is different from that by which the thickness of the optical guiding layer 20 changes. Further, the optical guiding layer 20 propagates light in the same direction as the waveguide direction of the waveguide 1.

The waveguide 1 is for example the after-mentioned phase shifter 80 or another waveguide 85.

Figure 51:
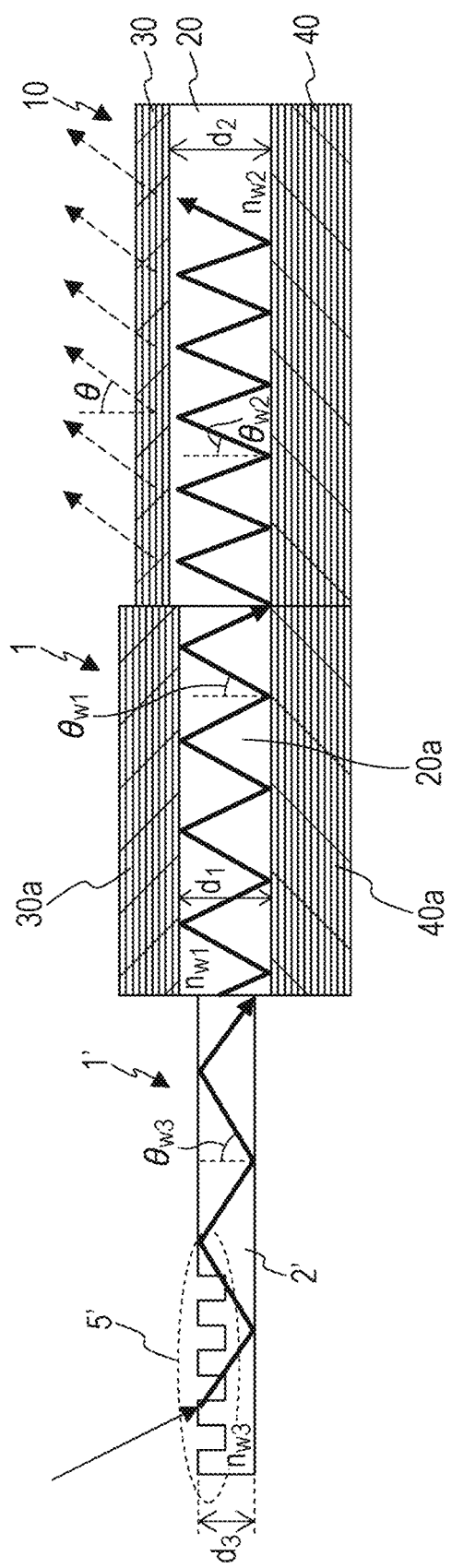
FIG. 51 is a cross-sectional view schematically showing another example of a structure of a part of the optical scanning device.

FIG. 51 is a cross-sectional view schematically showing another example of a structure of a part of the optical scanning device 100. In this example, the optical scanning device 100 includes a waveguide 1', a waveguide element 10, and a waveguide 1. The waveguide 1' propagates light from the light source 130 by means of total reflection. The waveguide element 10 includes a first mirror 30, a second mirror 40 facing the first mirror 30, and an optical guiding layer 20 located between the first mirror 30 and the second mirror 40. The waveguide 1 includes a third mirror 30a, a fourth mirror 40a facing the third mirror 30a, and an optical guiding layer 20a located between the third mirror 30a and the fourth mirror 40a. The optical guiding layer 20a is joined directly to the waveguide 1' and propagates light having propagated through the waveguide 1'. The optical guiding layer 20 is joined directly to the optical guiding layer 20, has a variable thickness and/or a variable refractive index with respect to the light, and propagates the light having propagated through the optical guiding layer 20a. The first mirror 30 has a higher light transmittance than the second mirror 40 and causes a portion of light propagating through the optical guiding layer 20 to be emitted as emitted light toward outside the waveguide element 10.

In this example, the waveguide 1 is a reflective waveguide and includes two multilayer reflective films 30a and 40a facing each other and an optical guiding layer 20a therebetween. The waveguide 1' is a reflective waveguide that propagates light by means of total reflection. The refractive index of the waveguide 1' does not change or changes by an amount which is different from that by which the refractive index of the optical guiding layer 20 changes. Further, the thickness of the waveguide 1', i.e., the thickness of an optical guiding layer 2', does not change or changes by an amount which is different from that by which the thickness of the optical guiding layer 20 changes. The optical guiding layer 20 propagates light in the same direction as the waveguide direction of the waveguide 1'. As with the waveguide 1 in the example shown in FIG. 50, the waveguide 1' has a grating 5' on a part of its surface. Light from the light source 130 is inputted into the waveguide 1' via the grating 5'. In this example, the place where the grating 5' is provided functions as a light input section. The optical guiding layer 20 of the waveguide 10 has its refractive index or thickness modulated by the after-mentioned first adjustment element. Meanwhile, the waveguide 1 has no such modulation function. For reduction of emission of light from the waveguide 1, the reflectance of the reflecting mirrors (i.e., multilayer reflective films 30a and 40a) of the waveguide 1 is set to be higher than the reflectance of the first mirror 30 of the waveguide element 10. The reflectance of the first mirror 30 of the waveguide element 10 is set to be lower than the reflectance of the second mirror 40. Such a configuration allows light inputted to the waveguide 1' to be inputted to the waveguide element 10 after propagating through the waveguide 1' and the waveguide 1. The light is emitted toward the outside via the first mirror 30 while further propagating through the optical guiding layer 20 of the waveguide element 10.

The waveguide 1' is for example the after-mentioned phase shifter 80, and the waveguide 1 is for example the after-mentioned another waveguide 85. Alternatively, the waveguides 1' and 1 may each be the after-mentioned another waveguide 85.

In the configuration shown in FIG. 50 or 51, the after-mentioned first adjustment element varies the direction of emitted light from the waveguide element 1 by changing the thickness of the optical guiding layer 20 and/or the refractive index of the optical guiding layer 20 with respect to light propagating in the optical guiding layer 20. The imaging element 400 includes a plurality of photo-detection cells that receive reflected light from a physical object reflecting emitted light from the waveguide element 10. Each of the photo-detection cells accumulates signal charge corresponding to the amount of light received and outputs an electric signal corresponding to the amount of signal charge thus accumulated. The control circuit 500 causes the light source 130 to repeatedly emit light pulses. Further, the control circuit 500 causes at least some of the plurality of photo-detection cells to accumulate signal charge in synchronization with the emission of the light pulses and thereby causes the imaging element 400 to generate every first period of time a frame based on the signal charge thus accumulated. Furthermore, the control circuit 500 causes the first adjustment element to vary the direction of emitted light from the waveguide element 10 every second period of time that is shorter than or equal to half the first period of time.

Although, in the example shown in FIG. 50, the waveguide 1 is provided with the grating 5, the grating 5 does not need to be provided and light may be allowed to enter the waveguide 1 through an end face of the waveguide 1. Further, a laser light source may be provided on the surface of the waveguide 1 instead of the grating 5, and light may be allowed to enter the waveguide 1 from this laser light source. Similarly, in the example shown in FIG. 51, the grating 5' does not need to be provided and light may be allowed to enter the waveguide 1' through an end face of the waveguide 1'. Further, a laser light source may be provided on the surface of the waveguide 1' instead of the grating 5, and light may be allowed to enter the waveguide 1' from this laser light source.

As shown in FIG. 50, let it be assumed that $n_{w1}$ is the refractive index of the optical guiding layer 2 of the waveguide 1, $n_{w2}$ is the refractive index of the optical guiding layer 2 of the waveguide element 10, θ is the angle of emission of light from the waveguide element 10, $θ_{w1}$ is the angle of reflection of guided light in the waveguide 1, and $θ_{w2}$ is the angle of reflection of guided light in the waveguide element 10. Further, as shown in FIG. 51, let it be assumed that $n_{w3}$ is the refractive index of the optical guiding layer 2' of the waveguide 1' and $θ_{w3}$ is the angle of reflection of guided light in the waveguide 1'. In the present embodiment, $n_{w2} \sin θ_{w2} = \sin θ < 1$ is satisfied so that light is taken out from the waveguide element 10 toward the outside (e.g., an air layer with a refractive index of 1).

Principle of Guided Light Coupling

The following explains the principle of coupling of guided light between the waveguides 1 and 10 with reference to FIG. 50. For simplicity, light propagating through the waveguides 1 and 10 is approximately considered as rays of light. Let it be assumed that light is totally reflected at the interface between the upper and lower multilayer reflective films on the upper and lower surface of the waveguide element 10 and the optical guiding layer 20 and the interface between the optical guiding layer 2 and the external medium. Let it be assumed that $d_1$ is the thickness of the optical guiding layer 2 of the waveguide 1 and $d_2$ is the thickness of the optical guiding layer 20 of the waveguide element 10. In each of the waveguides 1 and 10, the condition for the presence of propagating light is expressed by Expressions (5) and (6):

$$2d_1 n_{w1} \cos θ_{w1} = mλ \tag{5}$$

$$2d_2 n_{w2} \cos θ_{w2} = mλ \tag{6}$$

where λ is the wavelength of light and m is an integer of 1 or larger.

Considering Snell's law for the interfaces of the waveguides 1 and 10, Expression (7) holds:

$$n_{w1}\sin(90°-\theta_{w1}) = n_{w2}\sin(90°-\theta_{w2}) \quad (7)$$

Transforming Expression (7) gives Expression (8):

$$n_{w1}\cos\theta_{w1} = n_{w2}\cos\theta_{w2} \quad (8)$$

When Expressions (5) and (8) hold, Expression (6) holds even in a case were $n_{w2}$ changes, provided $d_1$ and $d_2$ are equal. That is, even in a case where the refractive index of the optical guiding layer 20 changes, light efficiently propagates from the optical guiding layer 2 to the optical guiding layer 20.

In the derivation of the foregoing expressions, light is considered as rays of light for simplicity. However, in actuality, guided light has a wave character, as the thicknesses $d_1$ and $d_2$ are comparable to the wavelength λ (at longest ten times or less as long as the wavelength). Therefore, it is technically necessary to consider not the refractive indices of materials for the optical guiding layers 2 and 20 but effective refractive indices as the aforementioned refractive indices $n_{w1}$ and $n_{w2}$. Further, in a case where the thickness $d_1$ of the optical guiding layer 2 and the thickness $d_2$ of the optical guiding layer 20 are not equal, or even in a case where Expression (8) is not technically satisfied, light can be guided from the optical guiding layer 2 to the optical guiding layer 20. This is because light is transmitted from the optical guiding layer 2 to the optical guiding layer 20 through a near field. That is, as long as there is an overlap between the electric field distribution of the optical guiding layer 2 and the electric field distribution of the optical guiding layer 20, light is transmitted from the optical guiding layer 2 to the optical guiding layer 20.

The same discussion applies to guided light between the waveguide 1' and the waveguide 1 in the example shown in FIG. 51.

Calculation Results

In order to confirm the effects of the present embodiment, the present inventors calculated the coupling efficiency of light under varying conditions. The calculations involved the use of Photon Design's FIMMWAVE.

Figure 52A:
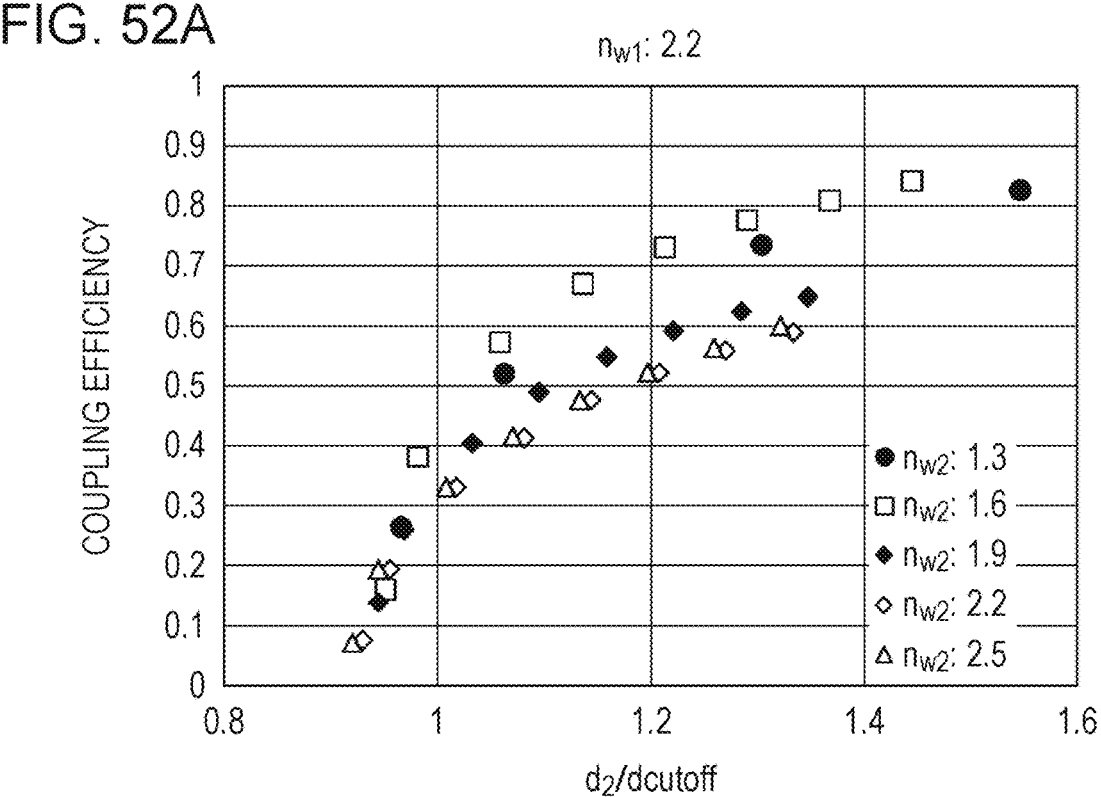
FIG. 52A shows the $d_2$ dependence of coupling efficiency in a case where $n_{w1}$ is 2.2, $d_1$ is 0.7 μm, and the wavelength $\lambda$ is 1.55 μm.
Figure 52B:
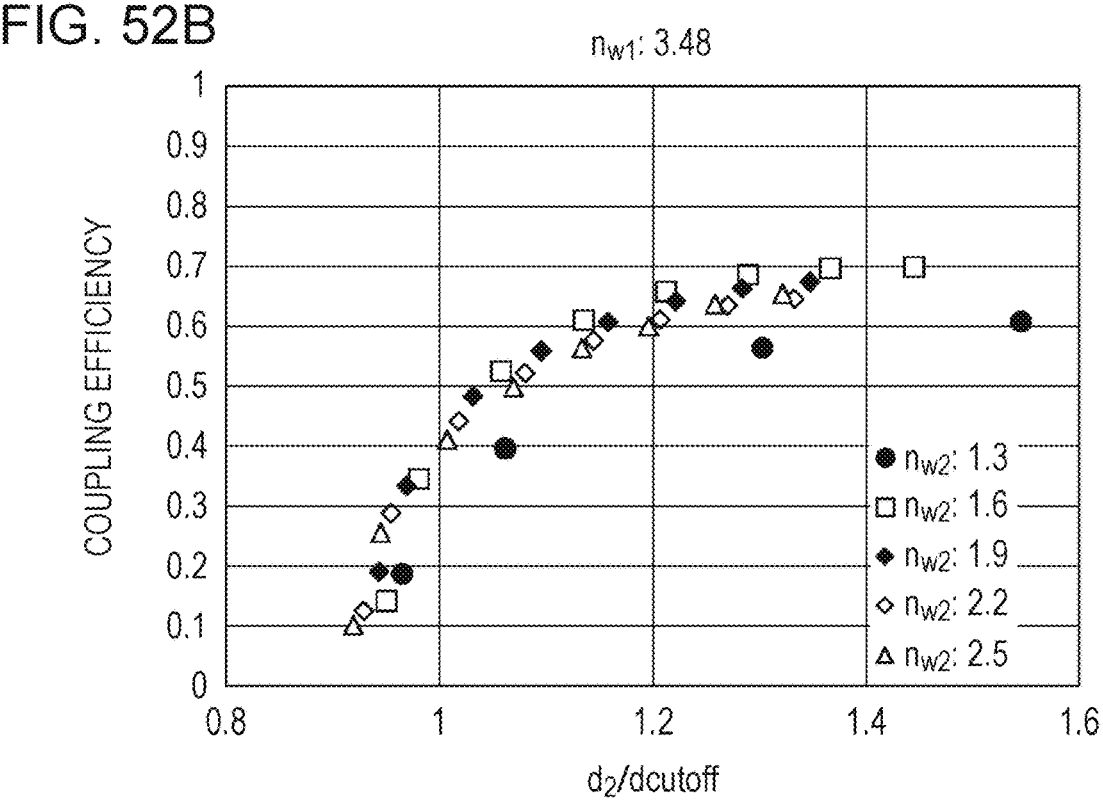
FIG. 52B shows the $d_2$ dependence of coupling efficiency in a case where $n_{w1}$ is 3.48, $d_1$ is 0.46 μm, and the wavelength $\lambda$ is 1.55 μm.

As shown in FIG. 50, in a configuration in which the waveguide 1 guides light by means of total reflection, rays of guided light propagating through the waveguides 1 and 10 can be coupled to each other. For the configuration shown in FIG. 50, the $d_2$ dependence of coupling efficiency of guided light from the waveguide 1 to the waveguide element 10 was found by calculation. FIG. 52A shows the $d_2$ dependence of coupling efficiency in a case where $n_{w1}$ is 2.2, $d_1$ is 0.7 μm, and the wavelength λ is 1.55 μm. FIG. 52B shows the $d_2$ dependence of coupling efficiency in a case where $n_{w1}$ is 3.48, $d_1$ is 0.46 μm, and the wavelength λ is 1.55 μm. In this case, if the following expression is satisfied, the coupling efficiency is 7% or higher.

$$0.95 \times d_{cutoff} < d_2 < 1.5 \times d_{cutoff} \quad (9)$$

(that is, $0.95 \times m\lambda/(2n_{w2}) < d_2 < 1.5 \times m\lambda/2n_{w2}$)

Further, if the following expression is satisfied, the coupling efficiency is 50% or higher.

$$1.2 \times d_{cutoff} < d_2 < 1.5 \times d_{cutoff} \quad (10)$$

(that is, $1.2 \times m\lambda/(2n_{w2}) < d_2 < 1.5 \times m\lambda/n_{w2}$)

It may be that $n_{w1} > n_{w2}$ or $n_{w1}$ $n_{w2}$.

The mode number of light propagating from the waveguide 1 to the waveguide element 10 is not limited to m=2.

Figure 53:
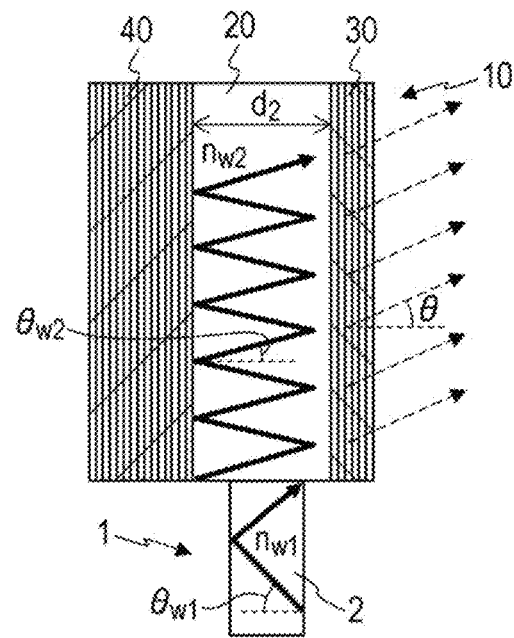
FIG. 53 is a diagram showing a computation mode used in a calculation indicating the propagation of light of another mode number.
Figure 54:
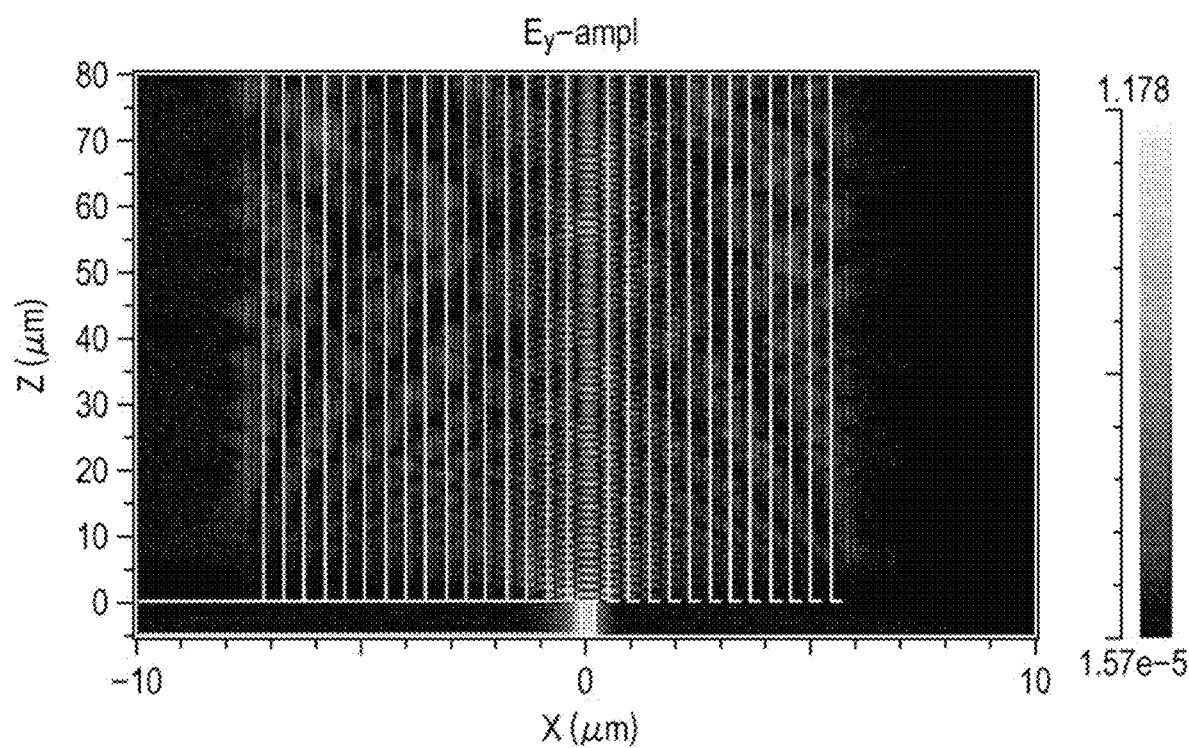
FIG. 54 is a diagram showing a result of the calculation indicating the propagation of light of another mode number.

For example, a calculation based on the model shown in FIG. 53 under the conditions where $n_{w1}$=1.883, $d_1$=0.3 μm, $n_{w2}$=1.6, and $d_2$=0.55 μm shows that light is coupled to the waveguide as shown in FIG. 54.

Operating Principle of Two-Dimensional Scan

In the waveguide array, the direction of emission of light varies due to the interference of rays of light that are emitted from the respective waveguide elements 10. In the present embodiment, the direction of emission of light can be varied by adjusting the phase of light that is supplied to each waveguide element 10. The following explains the principle.

Figure 17A:
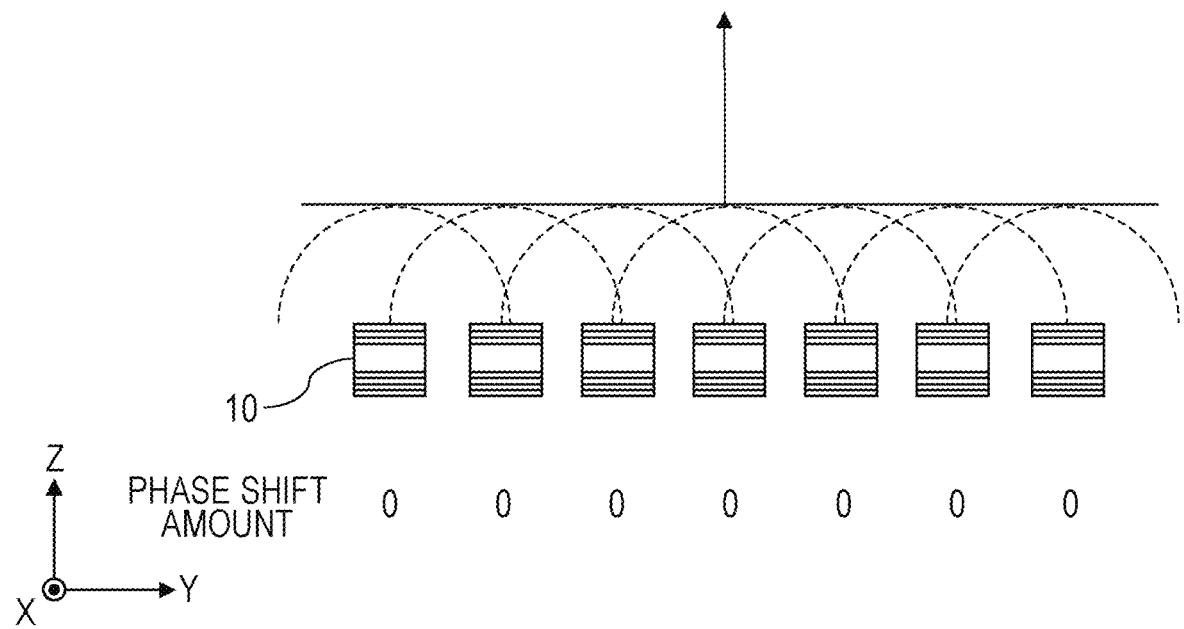
FIG. 17A is a diagram showing a cross-section of a waveguide array that emits light in a direction perpendicular to the plane of emission of the waveguide array.

FIG. 17A is a diagram showing a cross-section of a waveguide array that emits light in a direction perpendicular to the plane of emission of the waveguide array. FIG. 17A also describes the phase shift amount of light propagating through each waveguide element 10. Note here that the phase shift amount is a value based on the phase of light propagating through the leftmost waveguide element 10. The waveguide array according to the present embodiment includes a plurality of waveguide elements 10 arrayed at regular intervals. In FIG. 17A, the arcs of dashed lines indicate the wave front of light that is emitted from each waveguide element 10. The straight line indicates the wave front that is formed by the interference of light. The arrow indicates the direction of light that is emitted from the waveguide array (i.e., the direction of the wave vector). In the example shown in FIG. 17A, the phase of light propagating through the optical guiding layer 20 of each waveguide element 10 is the same as that of light propagating through the optical guiding layer 20 of the other waveguide element 10. In this case, light is emitted in a direction (Z direction) perpendicular to both the array direction (Y direction) of the waveguide elements 10 and the direction (X direction) in which the optical guiding layers 20 extend.

Figure 17B:
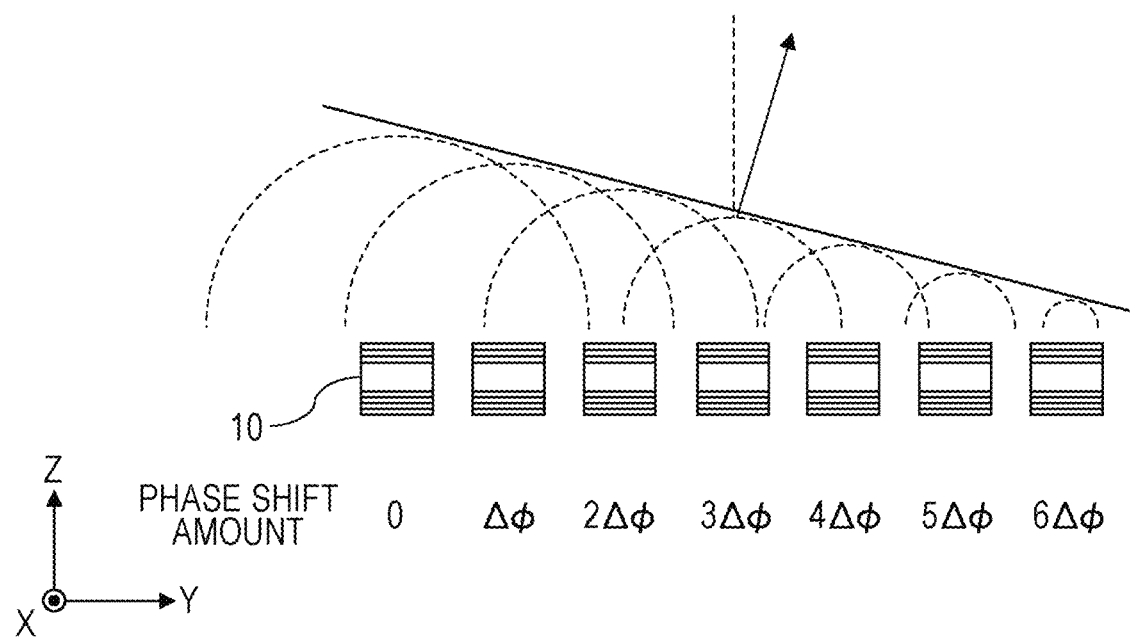
FIG. 17B is a diagram showing a cross-section of a waveguide array that emits light in a direction different from the direction perpendicular to the plane of emission of the waveguide array.

FIG. 17B is a diagram showing a cross-section of a waveguide array that emits light in a direction different from the direction perpendicular to the plane of emission of the waveguide array. In the example shown in FIG. 17B, the phases of light propagating through the optical guiding layers 20 of the plurality of waveguide elements 10 vary in increments of a constant amount (Δφ) in the array direction. In this case, light is emitted in a direction different from the Z direction. By varying this Δφ, the Y-direction component of the wave vector of the light can be varied.

The direction of light that is emitted from the waveguide array toward the outside (which is air here) can be quantitatively discussed in the following way.

Figure 18:
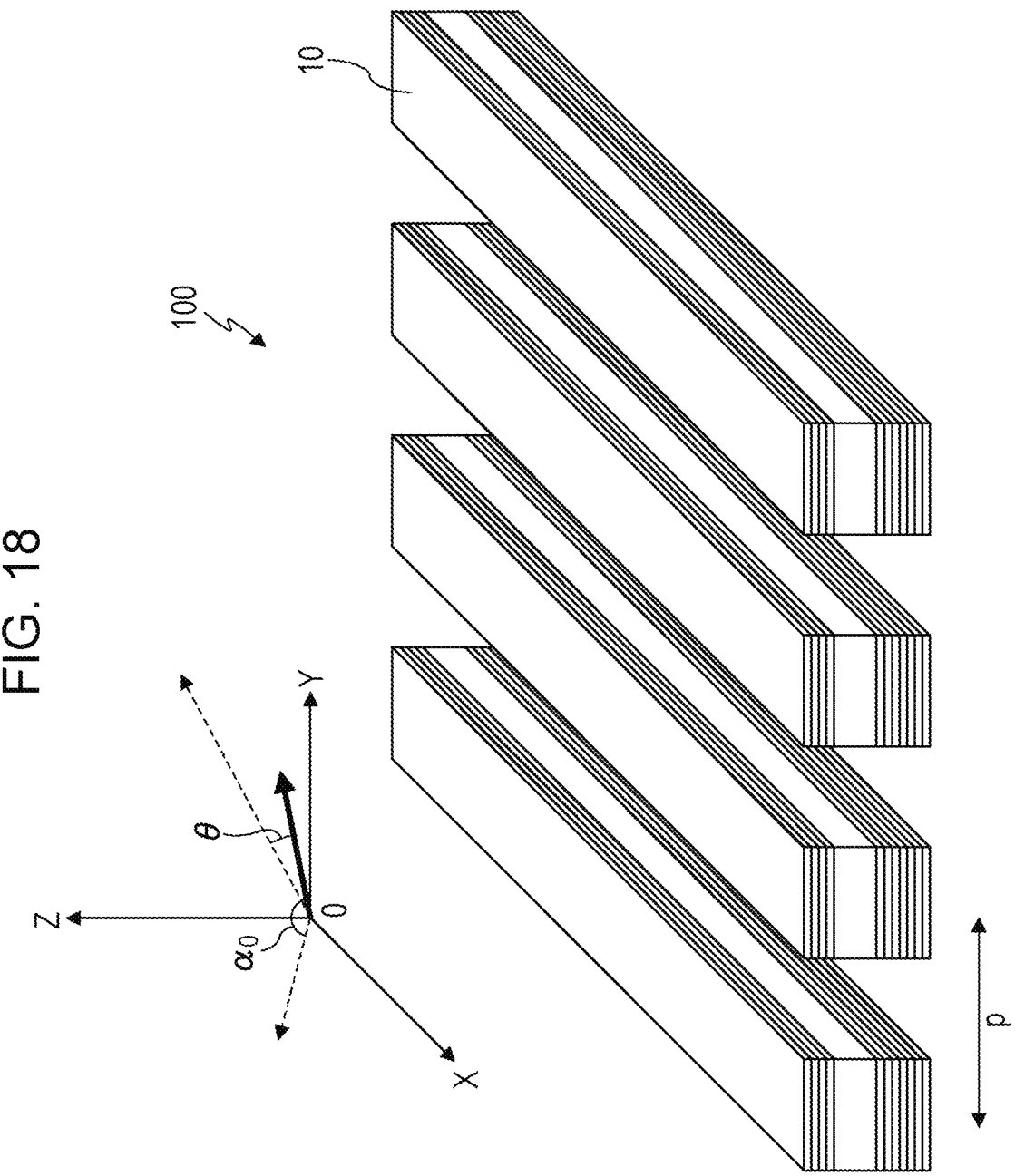
FIG. 18 is a perspective view schematically showing a waveguide array in a three-dimensional space.

FIG. 18 is a perspective view schematically showing a waveguide array in a three-dimensional space. In a three-dimensional space defined by the X, Y, and Z directions orthogonal to one another, the interface between a region where light is emitted to air and the waveguide array is expressed as $Z=z_0$. This interface includes the plane of emission of each of the plurality of waveguide elements 10. When $Z<z_0$, the plurality of waveguide elements 10 are arrayed at regular intervals in the Y direction and each of the plurality of waveguide elements 10 extends in the X direction. When $Z>z_0$, the electric field vector E(x, y, z) of light that is emitted to air is expressed by the following expression:

$$E(x,y,z) = E_0\exp[-j(k_x x + k_y y + k_z z)] \quad (11)$$

where $E_0$ is the amplitude vector of electric field, $k_x$, $k_y$, and $k_z$ are the wave numbers in the X, Y, and Z directions, respectively, and j is the imaginary unit. In this case, the direction of light that is emitted to air is parallel to the wave vector ($k_x$, $k_y$, $k_z$) indicated by a thick arrow in FIG. 18. The magnitude of the wave vector is expressed by the following expression:

$$\sqrt{k_x^2 + k_y^2 + k_z^2} = \frac{2\pi}{\lambda} \quad (12)$$

From the boundary condition of electric field at $Z=z_0$, the wave vector component $k_x$ and $k_y$, which are parallel to the interface, coincide with the X and Y directions, respectively, of light in the waveguide array. This is equivalent to the condition in which, as with Snell's law of Expression (2), the wavelength in a planar direction of light on the air side and the wavelength in a plane direction of light on the waveguide array side are equal at the interface.

$k_x$ is equal to the wavenumber of light propagating through the optical guiding layer 20 of a waveguide element 10 extending in the X direction. In the waveguide element 10 shown in FIG. 14 described above, $k_x$ is expressed by the following expression using Expressions (2) and (3):

$$k_x = \frac{2\pi}{\lambda} n_w \sin\theta_w = \frac{2\pi}{\lambda}\sqrt{n_w^2 - \left(\frac{m\lambda}{2d}\right)^2} \quad (13)$$

$k_y$ is derived from the phase difference of light between two adjacent waveguide elements 10. Let it be assumed that $y_q$ (q=0, 1, 2, . . . , N−1) is the center in the Y direction of each of N waveguide elements 10 arrayed at regular intervals in the Y direction and p is the distance (center-to-center distance) between two adjacent waveguide elements 10. Then, at $y_q$ and $y_{q+1}$ in the interface ($Z=z_0$), the electric field vector (Expression (11)) of light that is emitted to air satisfies the relationship represented by the following expression:

$$E(x, y_{q+1}, z_0) = \quad (14)$$
$$\exp[-jk_y(y_{q+1} - y_q)]E(x, y_q, z_0) = \exp[-jk_y p]E(x, y_q, z_0)$$

If the phase difference between any two adjacent waveguide elements 10 is set to be $\Delta\varphi = k_y p$ (constant), $k_y$ is expressed by the following expression:

$$k_y = \frac{\Delta\phi}{p} \quad (15)$$

In this case, the phase of light at $y_q$ is $\varphi_q = \varphi_0 + q\Delta\varphi$ ($\varphi_{q+1} - \varphi_q = \Delta\varphi$). That is, the phase $\varphi_q$ either is constant ($\Delta\varphi=0$) or proportionately increases ($\Delta\varphi>0$) or decreases ($\Delta\varphi<0$) along the Y direction. In a case where the waveguide elements 10 arrayed in the Y direction are not placed at regular intervals, it is only necessary to configure the settings so that, for the desired $k_y$, the phase difference at $y_q$ and $y_{q+1}$ is $\Delta\varphi_q = \varphi_{q+1} - \varphi_q = k_y(y_{q+1} - y_q)$. In this case, the phase of light at $y_q$ is $\varphi_q = \varphi_0 + k_y(y_q - y_0)$. Using $k_x$ and $k_y$ obtained from Expressions (14) and (15), respectively, allows $k_z$ to be derived from Expression (12). This gives the direction of emission of light (i.e., the direction of the wave vector).

For example, let it be assumed that, as shown in FIG. 18, $\theta$ is the angle formed by the wave vector ($k_x$, $k_y$, $k_z$) of emitted light and the vector (0, $k_y$, $k_z$) obtained by projecting the wave vector onto a YZ plane. $\theta$ is the angle formed by the wave number vector and the YZ plane. $\theta$ is expressed by the following expression using Expressions (12) and (13):

$$\sin\theta = \frac{k_x}{\sqrt{k_x^2 + k_y^2 + k_z^2}} = \frac{\lambda}{2\pi}k_x = \sqrt{n_w^2 - \left(\frac{m\lambda}{2d}\right)^2} \quad (16)$$

Expression (16) is exactly the same as Expression (3) limited to a case where emitted light is parallel to the XZ plane. As can be seen from Expression (16), the X component of the wave vector changes depending on the wavelength of light, the refractive index of each optical guiding layer 20, and the thickness of each optical guiding layer 20.

Similarly, let it be assumed that, as shown in FIG. 18, $\alpha_0$ is the angle formed by the wave vector ($k_x$, $k_y$, $k_z$) of emitted light (zeroth-order diffracted beam) and the vector ($k_x$, 0, $k_z$) obtained by projecting the wave vector onto the XZ plane. $\alpha_0$ is the angle formed by the wave number vector and the XZ plane. $\alpha_0$ is expressed by the following expression using Expressions (12) and (13):

$$\sin\alpha_0 = \frac{k_y}{\sqrt{k_x^2 + k_y^2 + k_z^2}} = \frac{\lambda}{2\pi}k_y = \frac{\Delta\phi\lambda}{2\pi p} \quad (17)$$

As can be seen from Expression (17), the Y component of the wave vector of light changes according to the phase difference $\Delta\varphi$ of light.

In this way, the direction of emission of light can also be identified by using $\theta$ and $\alpha_0$ obtained from Expressions (16) and (17), respectively, instead of using the wave vector ($k_x$, $k_y$, $k_z$). In that case, the direction of emission of light can be represented by a unit vector expressed as (sin $\theta$, sin $\alpha_0$, $(1-\sin^2\alpha_0-\sin^2\theta)^{1/2}$). Since all of these vector components must be real numbers in light emission, $\sin^2\alpha_0 + \sin^2\theta \leq 1$ is satisfied. From $\sin^2\alpha_0 \leq 1 - \sin^2\theta = \cos^2\theta$, it is found that emitted light varies within an angular range that satisfies $-\cos\theta \leq \sin\alpha_0 \leq \cos\theta$. From $-1 \sin\alpha_0 \leq 1$, emitted light varies within an angular range of $-90° \leq \alpha_0 \leq 90°$ at $\theta=0°$. However, as $\theta$ increases, cos $\theta$ becomes smaller and, accordingly, the angular range of $\alpha_0$ becomes narrower. At $\theta=90°$ (cos $\theta=0$), light is emitted only when $\alpha_0=0°$.

A two-dimensional scan with light according to the present embodiment can be achieved with at least two waveguide elements 10. However, in a case where the number of waveguide elements 10 is small, the angle of divergence $\Delta\alpha$ of $\alpha_0$ becomes larger. When the number of waveguide elements 10 increases, $\Delta\alpha$ becomes smaller. This can be explained in the following way. For simplicity, suppose a case where $\theta=0°$ in FIG. 18. That is, suppose a case where the direction of emission of light is parallel to the YZ plane.

Let it be assumed that rays of light having the same emission intensity and the aforementioned $\varphi_q$ are emitted from N (where N is an integer of 2 or larger) waveguide elements 10, respectively. Then, the absolute value of the amplitude distribution of a total of rays of light (electric fields) that are emitted from the N waveguide elements 10 is proportional in a far field to F(u) expressed by the following expression:

$$F(u) = \left| \frac{\sin(Nu/2)}{\sin(u/2)} \right| \qquad (18)$$

where u is expressed by the following expression:

$$u = \frac{2\pi p}{\lambda}(\sin\alpha - \sin\alpha_0) \qquad (19)$$

where $\alpha$ is the angle formed by a straight line connecting the observation point with the origin and the Z axis on the YZ plane. $\alpha_0$ satisfies Expression (17). F(u) of Expression (18) becomes N (maximum) at u=0 ($\alpha=\alpha_0$) and becomes 0 at u=±2π/N. Assuming that $\alpha_1$ and $\alpha_2$ are the angles that satisfy u=−2π/N and 2π/N, respectively ($\alpha_1<\alpha_0<\alpha_2$), the angle of divergence of $\alpha_0$ is $\Delta\alpha=\alpha_2-\alpha_1$. A peak within the range of −2π/N<u<2π/N ($\alpha_1<\alpha<\alpha_2$) is generally called "main lobe". Present on both sides of the main lobe are a plurality of small peaks called "side lobes". Comparing the width $\Delta u=4\pi/N$ of the main lobe and $\Delta u=2\pi p\Delta(\sin\alpha)/\lambda$, obtained from Expression (19) yields $\Delta(\sin\alpha)=2\lambda/(Np)$. If $\Delta\alpha$ is small, $\Delta(\sin\alpha)=\sin\alpha_2-\sin\alpha_1=[(\sin\alpha_2-\sin\alpha_1)/(\alpha_2-\alpha_1)]\Delta\alpha \approx [d(\sin\alpha)/d\alpha]_{\alpha=\alpha_0}\Delta\alpha=\cos\alpha_0\Delta\alpha$. For this reason, the angle of divergence is expressed by the following expression:

$$\Delta\alpha = \frac{2\lambda}{Np\cos\alpha_0} \qquad (20)$$

Therefore, as the number of waveguide elements 10 becomes larger, the angle of divergence $\Delta\alpha$ can be made smaller, and a high-definition optical scan can be achieved even in the distance. The same discussion can also apply to a case where $\theta\neq 0°$ in FIG. 18.

Diffracted Beams that are Emitted from Waveguide Array

Besides the zeroth-order diffracted beam, high-order diffracted beams can be emitted from the waveguide array. For simplicity, suppose a case where $\theta=0°$ in FIG. 18. That is, the direction of emission of diffracted beams is parallel to the YZ direction.

Figure 19A:
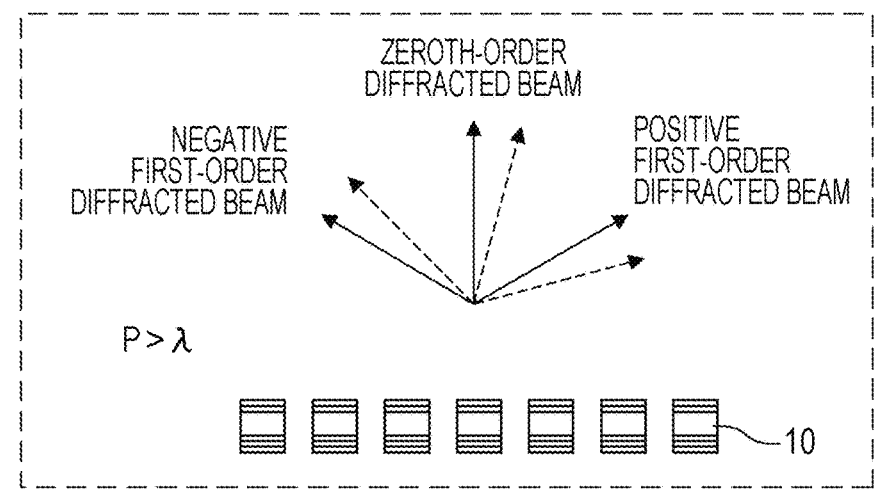
FIG. 19A is a schematic view showing how diffracted beams are emitted from a waveguide array in a case where p is greater than λ.

FIG. 19A is a schematic view showing how diffracted beams are emitted from a waveguide array in a case where p is greater than $\lambda$. In this case, without a phase shift ($\alpha_0=0°$), a zeroth-order diffracted beam and positive and negative first-order diffracted beams are emitted in the directions of solid arrows shown in FIG. 19A (depending on the magnitude of p, even higher-order diffracted beams can be emitted). With a phase shift from this state ($\alpha_0\neq 0°$), the angles of emission of the zeroth-order diffracted beam and the positive and negative first-order diffracted beams change in the same direction of rotation as indicated by dashed arrows shown in FIG. 19A. It is possible to perform a beam scan with high-order diffracted beams such as the positive and negative first-order diffracted beams, but in a case where a device is configured more simply, only the zeroth-order diffracted beam is used. For the avoidance of reduction in gain of the zeroth-order diffracted beam, the emission of the high-order diffracted beams may be suppressed by making the distance p between two adjacent waveguide elements 10 shorter than $\lambda$. Even when p>$\lambda$, it is possible to use only the zeroth-order diffracted beam by physically blocking the high-order diffracted beams.

Figure 19B:
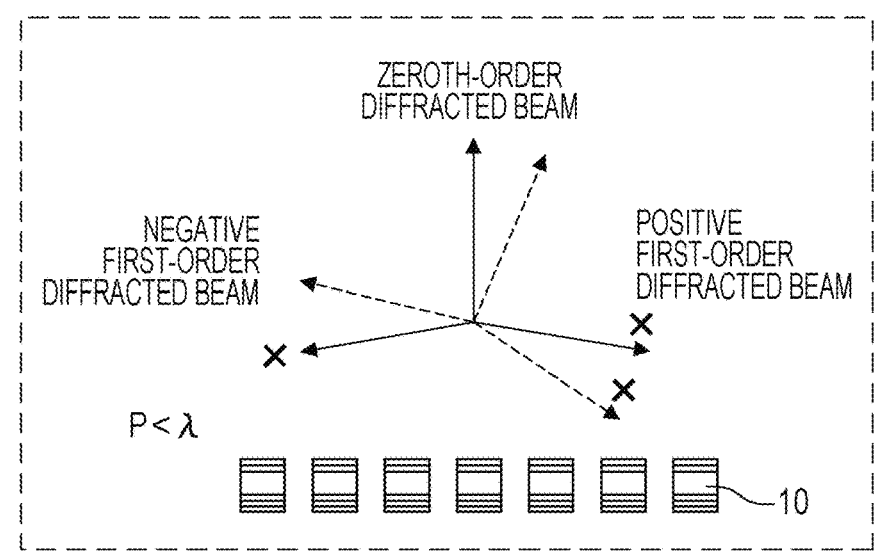
FIG. 19B is a schematic view showing how diffracted beams are emitted from the waveguide array in a case where p is less than λ.

FIG. 19B is a schematic view showing how diffracted beams are emitted from the waveguide array in a case where p is less than $\lambda$. In this case, without a phase shift ($\alpha_0=0°$), the angle of diffraction exceeds 90 degrees, so that high-order diffracted beams are not present and only a zeroth-order diffracted beam exits forward. Note, however, that in a case where p takes on a value that is close to $\lambda$, imparting a phase shift ($\alpha_0\neq 0°$) may cause positive and negative first-order diffracted beams to be emitted with a change in the angle of emission.

Figure 19C:
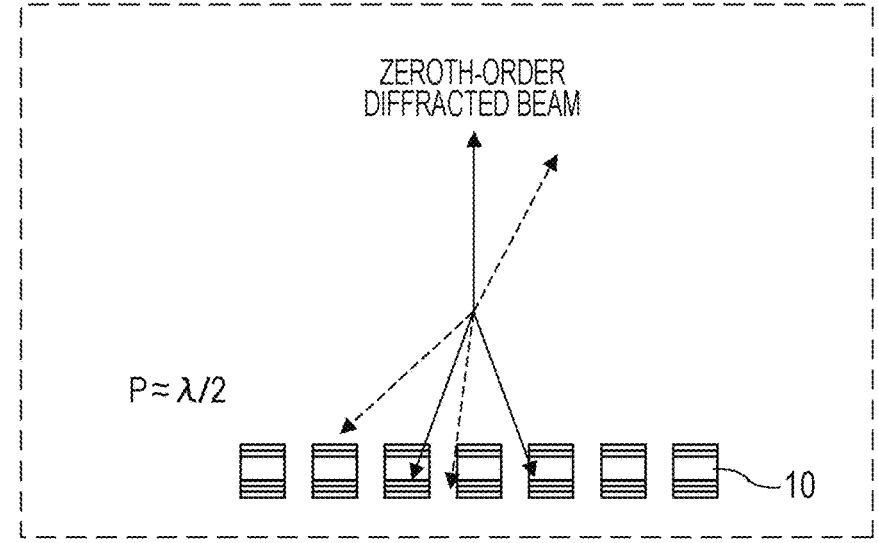
FIG. 19C is a schematic view showing how diffracted beams are emitted from the waveguide array in a case where p≈λ/2.

FIG. 19C is a schematic view showing how diffracted beams are emitted from the waveguide array in a case where p≈$\lambda$/2. In this case, even with a phase shift ($\alpha_0=0°$), positive and negative first-order diffracted beams do not exit, or even if they do, they exit at very large angles. In a case where p<$\lambda$/2, no high-order diffracted beams exit even with a phase shift. However, there is no much merit in making p further smaller. Therefore, p can be set, for example, to be greater than or equal to $\lambda$/2.

The relationship between the zeroth-order diffracted beam and the positive and negative first-order diffracted beams that are emitted to air in FIGS. 19A to 19C can be quantitatively discussed in the following way. Since F(u) of Expression (18) is F(u)=F(u+2π), it is a periodic function of 2π. When u=±2mπ, F(u)=N (maximum). At that time, positive and negative mth-order diffracted beams are emitted at angles of emission that satisfy u=±2mπ. A peak (whose peak width is $\Delta u=4\pi/N$) near u=±2mπ (m≠0) is called "grating lobe".

Considering only the positive and negative first-order diffracted beams of the high-order diffracted beams (u=±2π), the angles of emission $\alpha_\pm$ of the positive and negative first-order diffracted beams satisfy the following expression:

$$\sin\alpha_\pm = \sin\alpha_0 \pm \frac{\lambda}{p} \qquad (21)$$

From the condition $\sin\alpha_+>1$ in which no positive first-order diffracted beam is emitted, p<$\lambda$/(1−sin $\alpha_0$) is obtained. Similarly, from the condition $\sin\alpha_-<-1$ in which no negative first-order diffracted beam is emitted, p<$\lambda$/(1+sin $\alpha_0$) is obtained.

Conditions as to whether positive and negative first-order diffracted beams are emitted with respect to a zeroth-order diffracted beam at the angle of emission $\alpha_0$ (>0) are classified in the following way. In a case where p≥$\lambda$/(1−sin $\alpha_0$), both positive and negative first-order diffracted beams are emitted. In a case where $\lambda$/(1+sin $\alpha_0$)≤p<$\lambda$/(1−sin $\alpha_0$), no positive first-order diffracted beam is emitted but a negative first-order diffracted beam is emitted. In a case where p<$\lambda$/(1+sin $\alpha_0$), neither a positive nor negative first-order diffracted beam is emitted. In particular, if p<$\lambda$/(1+sin $\alpha_0$) is satisfied, no positive and negative first-order diffracted beams are emitted even in a case where $\theta\neq 0$ in FIG. 18. For example, in order to attain a scan of 10 degrees or larger on one side in a case where no positive and negative first-order diffracted beams are emitted, it is only necessary to satisfy the relationship p≤$\lambda$/(1+sin 10°)≈0.85$\lambda$, assuming that $\alpha_0=10°$. In combination with the condition for the aforementioned lower limit of p, $\lambda$/2≤p≤$\lambda$/(1+sin 10° needs only be satisfied.

However, in order to satisfy the condition in which no positive and negative first-order diffracted beams are emitted, it is necessary to make p very small. This makes it difficult to fabricate the waveguide array. To address this problem, imagine performing a scan with a zeroth-order diffracted beam in a range of 0°<$\alpha_0$<$\alpha_{max}$. Let it be assumed, however, no positive and negative first-order diffracted beams are present in this angular range. In order for this condition to be satisfied, the angle of emission of a positive first-order diffracted beam must be $\alpha_+ \geq \alpha_{max}$ at $\alpha_0 = 0°$ (i.e., $\sin \alpha_+ = (\lambda/p) \geq \beta \alpha_{max}$) and the angle of emission of a negative first-order diffracted beam must be $\alpha_- \leq 0$ at $\alpha_0 = \alpha_{max}$ (i.e., $\sin \alpha_- = \sin \alpha_{max} - (\lambda/p) \leq 0$). From these restrictions, $p \leq \lambda/\sin \alpha_{max}$ is obtained.

From the foregoing discussion, the maximum value $\alpha_{max}$ of the angle of emission $\alpha_0$ of a zeroth-order diffracted beam in a case where no positive and negative first-order diffracted beams are present in the scan angular range satisfy the following expression:

$$\sin \alpha_{max} = \frac{\lambda}{p} \quad (22)$$

For example, in order to attain a scan of 10 degrees or larger on one side in a case where no positive and negative first-order diffracted beams are present in the scan angular range, it is only necessary to satisfy the relationship $p \leq \lambda/\sin 10° \approx 5.76\lambda$, assuming that $\alpha_{max} = 10°$. In combination with the condition for the aforementioned lower limit of p, $\lambda/2 \leq p \leq \lambda/\sin 10°$ can be satisfied. Since this upper limit ($p \approx 5.76\lambda$) of p is larger than the upper limit ($p \approx 0.85\lambda$) in a case where no positive and negative first-order diffracted beams are emitted, it is comparatively easy to fabricate the waveguide array. Note here that in a case where the light used is not light of a single wavelength, λ is the center wavelength of the light used.

From the above, in order to scan a wider angular range, it is necessary to shorten the distance p between waveguides. Meanwhile, in order to decrease the angle of divergence of Δα of emitted light in Expression (20) in a case where p is small, it is necessary to increase the number of waveguide arrays. The number of waveguide arrays is determined as appropriate according to the intended use and the required performance. The number of waveguide arrays can for example be 16 or larger and, depending on the intended use, can be 100 or larger.

Phase Control of Light that is Introduced into Waveguide Array

In order to control the phase of light that is emitted from each of the waveguide elements 10, it is only necessary to introduce a phase shifter that changes the phase of light prior to the introduction of the light into the waveguide element 10. The optical scanning device 100 according to the present embodiment includes a plurality of phase shifters connected to the plurality of waveguide elements 10, respectively, and a second adjustment element that adjusts the phase of light propagating through each phase shifter. Each phase shifter includes a waveguide joined directly or via another waveguide to the optical guiding layer 20 of the corresponding one of the plurality of waveguide elements 10. The second adjustment element varies differences in phase among rays of light propagating from the plurality of phase shifters to the plurality of waveguide elements 10 and thereby varies the direction (third direction D3) of light that is emitted from the plurality of waveguide elements 10. In the following description, as with the waveguide array, a plurality of arrayed phase shifters are sometimes called "phase shifter array".

Figure 20:
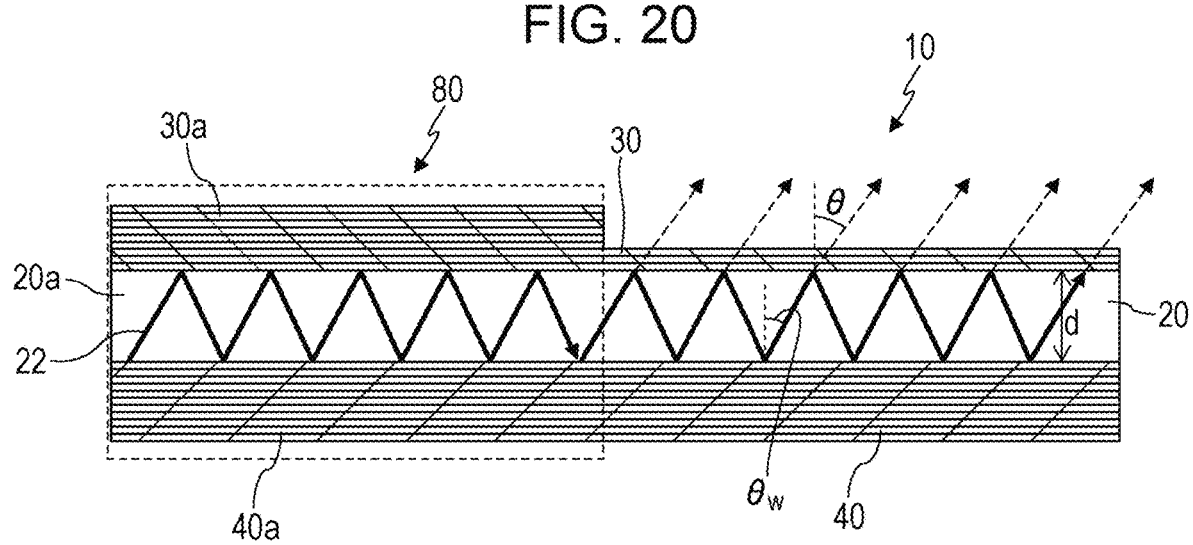
FIG. 20 is a schematic view showing an example of a configuration in which a phase shifter is connected directly to a waveguide element.

FIG. 20 is a schematic view showing an example of a configuration in which a phase shifter 80 is connected directly to a waveguide element 10. In FIG. 20, the part surrounded by a dashed frame corresponds to the phase shifter 80. The phase shifter 80 includes a pair of mirrors facing each other (namely a fifth mirror 30a and a sixth mirror 40a; hereinafter sometimes simply referred to as "mirrors") and a waveguide 20a provided between the mirror 30a and the mirror 40a. In this example, the waveguide 20a is constituted by the same member as the optical guiding layer 20 of the waveguide element 10 and joined directly to the optical guiding layer 20. Similarly, the mirror 40a is constituted by the same member as the mirror 40 of the waveguide element 10 and connected to the mirror 40. The mirror 30 has a lower transmittance (higher reflectance) than the mirror 30 of the waveguide element 10. The mirror 30a is connected to the mirror 30. For the avoidance of radiation of light, the phase shifter 80 is designed such that the transmittance of the mirror 30a takes on as low a value as those of the mirrors 40 and 40a. That is, the light transmittances of the fifth and sixth mirrors 30a and 40a are lower than the light transmittance of the first mirror 30. The aforementioned waveguide 1 or 1' may function as a phase shifter.

Figure 21:
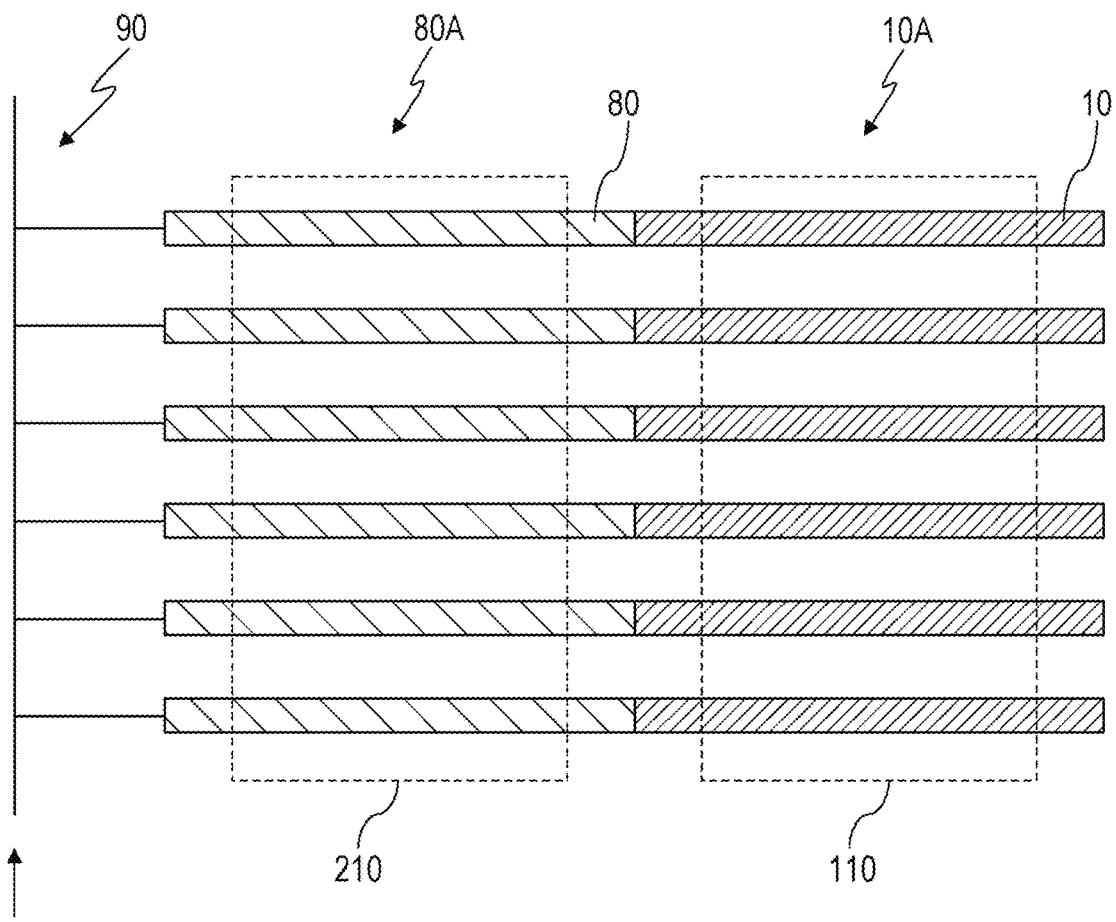
FIG. 21 is a schematic view of a waveguide array and a phase shifter array as seen from the direction (Z direction) normal to the plane of light emission.

FIG. 21 is a schematic view of a waveguide array 10A and a phase shifter array 80A as seen from the direction (Z direction) normal to the plane of light emission. In the example shown in FIG. 21, all of the phase shifters 80 have the same propagation characteristics, and all of the waveguide elements 10 have the same propagation characteristics. The phase shifters 80 and the waveguide elements 10 may be of the same length or of different lengths. In a case where the phase shifters 80 are of the same length, their respective phase shift amounts need only be adjusted by driving voltages. Further, by making a structure in which the lengths of the phase shifters 80 vary in equal steps, phase shifts can be imparted in equal steps by the same driving voltage. Furthermore, the optical scanning device 100 further includes an optical divider 90 that divides and supplies light to the plurality of phase shifters 80, a first driving circuit 110 that drives each waveguide element 10, and a second driving circuit 210 that drives each phase shifter 80. In FIG. 21, the straight arrow indicates the inputting of a ray of light. A two-dimensional scan can be achieved by independently controlling each of the first and second driving circuit 110 and 210, which are separately provided. In this example, the first driving circuit 110 functions as one element of the first adjustment element, and the second driving circuit 210 functions as one element of the second adjustment element.

As will be described later, the first driving circuit 110 changes (modulates) the refractive index or thickness of the optical guiding layer 20 of each waveguide element 10 and thereby varies the angle of light that is emitted from the optical guiding layer 20. As will be described later, the second driving circuit 210 changes the refractive index of the waveguide 20a of each phase shifter 80 and thereby changes the phase of light propagating through the waveguide 20a. The optical divider 90 may be constituted by a dielectric waveguide through which light propagates by means of total reflection or may be constituted by a reflective waveguide similar to a waveguide element 10.

It should be noted that the rays of light divided from one another by the optical divider 90 may be introduced into the respective phase shifters 80 after having their phase controlled. This phase control may for example involve the use of a passive phase control structure based on the adjustment of the lengths of waveguides leading to the phase shifters 80. Alternatively, it is possible to use phase shifters that have the same function as the phase shifters 80 and are controllable by electric signals. Such a method may be used, for example, to adjust the phases of the rays of light before the rays of light are introduced into the phase shifters 80, in order that rays of light of equal phase are supplied to all of the phase shifters 80. Such an adjustment makes it possible to simplify the control of each phase shifter 80 by the second driving circuit 210.

Figure 22:
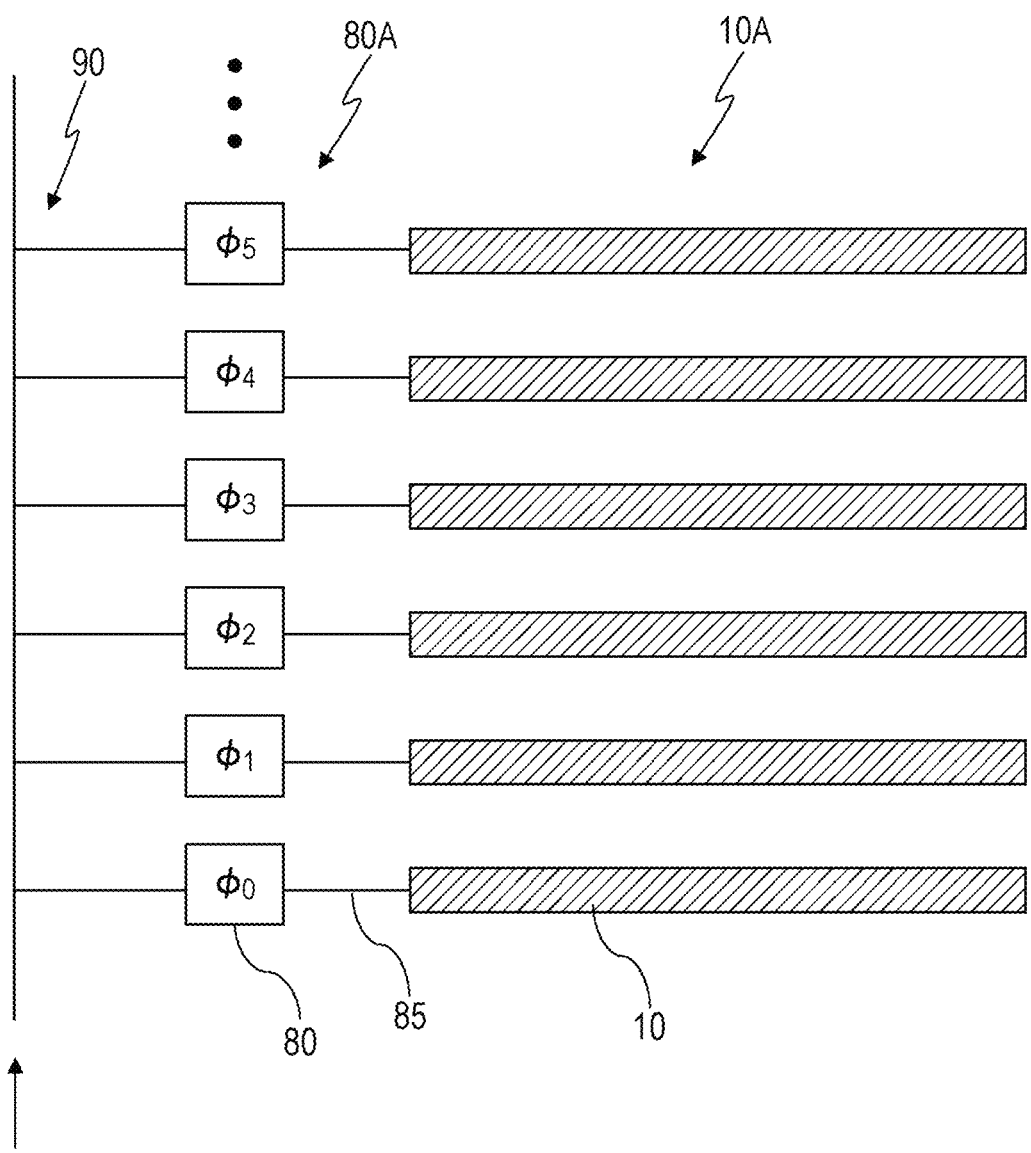
FIG. 22 is a diagram schematically showing an example of a configuration in which the waveguide of each phase shifter is connected to the optical guiding layer of the corresponding one of the waveguide elements via another waveguide.

FIG. 22 is a diagram schematically showing an example of a configuration in which the waveguide of each phase shifter 80 is connected to the optical guiding layer 20 of the corresponding one of the waveguide elements 10 via another waveguide 85. The another waveguide 85 may be a waveguide 1 shown in FIG. 50. Further, the another waveguide 85 may be waveguides 1 and 1' shown in FIG. 51. Each phase shifter 80 may be the same in configuration as or different in configuration from the phase shifter 80 shown in FIG. 20. In FIG. 22, the phase shifters 80 are simply expressed by using symbols $\varphi_0$ to $\varphi_5$ representing the phase shift amounts. Some of the subsequent drawings use similar expressions. As the phase shifters 80, dielectric waveguides that propagate light by means of total reflection can be utilized. In that case, there is no need for such mirrors 30a and 40a as those shown in FIG. 20.

Figure 23:
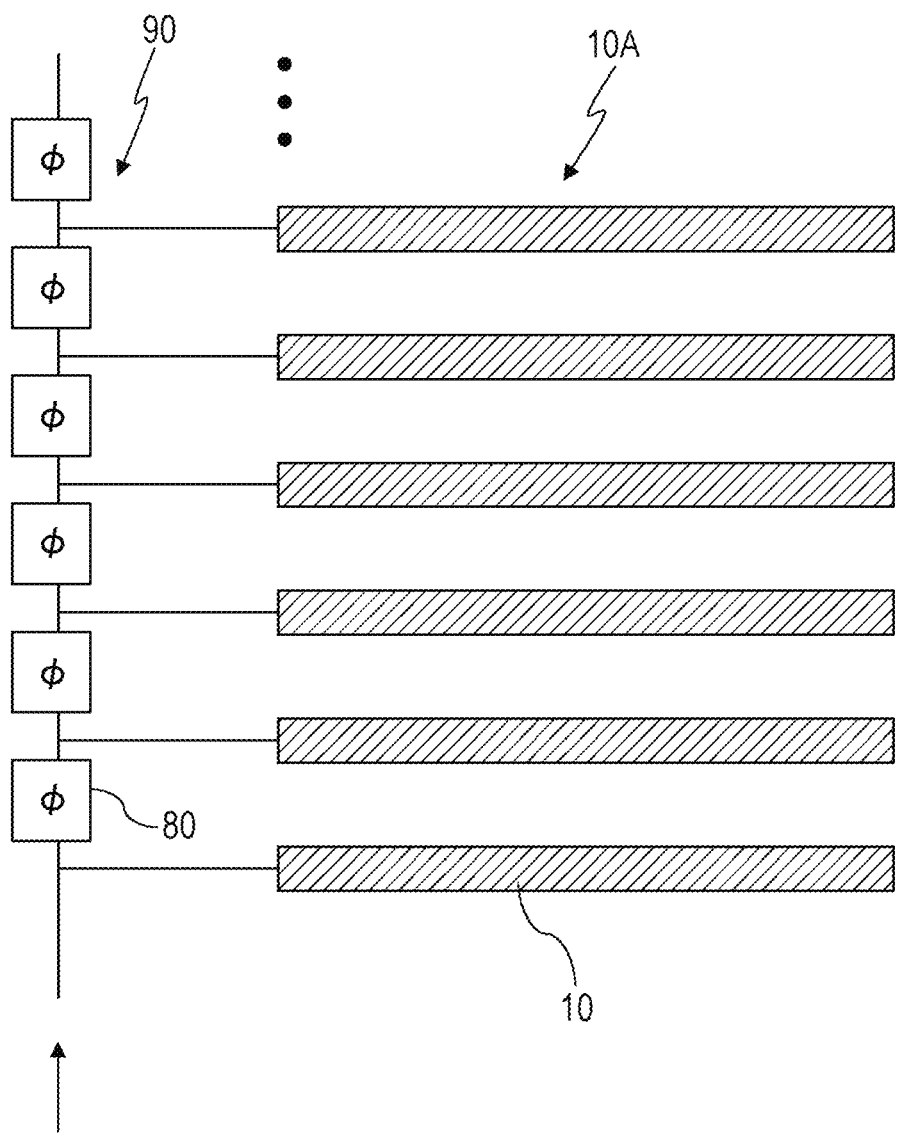
FIG. 23 is a diagram showing an example configuration in which a plurality of phase shifters connected in a cascade arrangement are inserted in an optical divider.

FIG. 23 is a diagram showing an example configuration in which a plurality of phase shifters 80 connected in a cascade arrangement are inserted in an optical divider 90. In this example, the plurality of phase shifters 80 are connected along the path of the optical divider 90. Each phase shifter 80 imparts a constant phase shift amount $\varphi$ to propagating light. By causing each of the phase shifters 80 to impart a constant phase shift amount to propagating light, the phase difference between two adjacent waveguide elements 10 is made equal. Therefore, the second adjustment element can send a common phase control signal to all of the phase shifters 80. This offers the advantage of simplified configuration.

Dielectric waveguides can be utilized to allow light to efficiently propagate among the optical divider 90, the phase shifters 80, the waveguide elements 10, and the like. The dielectric waveguides can be made of an optical material that has a higher refractive index than surrounding materials and absorbs less light. Examples of usable materials include Si, GaAs, GaN, $SiO_2$, $TiO_2$, $Ta_2O_5$, AlN, and SiN. Further, the waveguide 1 shown in FIG. 50 may be used to allow light to propagate from the optical divider 90 to the waveguide elements 10. Further, the waveguide 1 and 1' shown in FIG. 51 may be used to allow light to propagate from the optical divider 90 to the waveguide elements 10.

Each phase shifter 80 needs a mechanism that changes the optical path length in order to impart a phase difference to light. In order to change the optical path length, the present embodiment modulates the refractive index of the waveguide of each phase shifter 80. This makes it possible to adjust the phase difference between rays of light that are supplied from two adjacent phase shifters 80 to the corresponding waveguide elements 10. More specifically, a phase shift can be imparted by performing refractive-index modulation of a phase shift material in the waveguide of each phase shifter 80. A specific example of a configuration for performing refractive-index modulation will be described later. Example of First Adjustment Element The following describes an example configuration of a first adjustment element that adjusts the refractive index or thickness of the optical guiding layer 20 of each waveguide element 10. First, an example configuration in which the refractive index is adjusted is described.

Figure 24A:
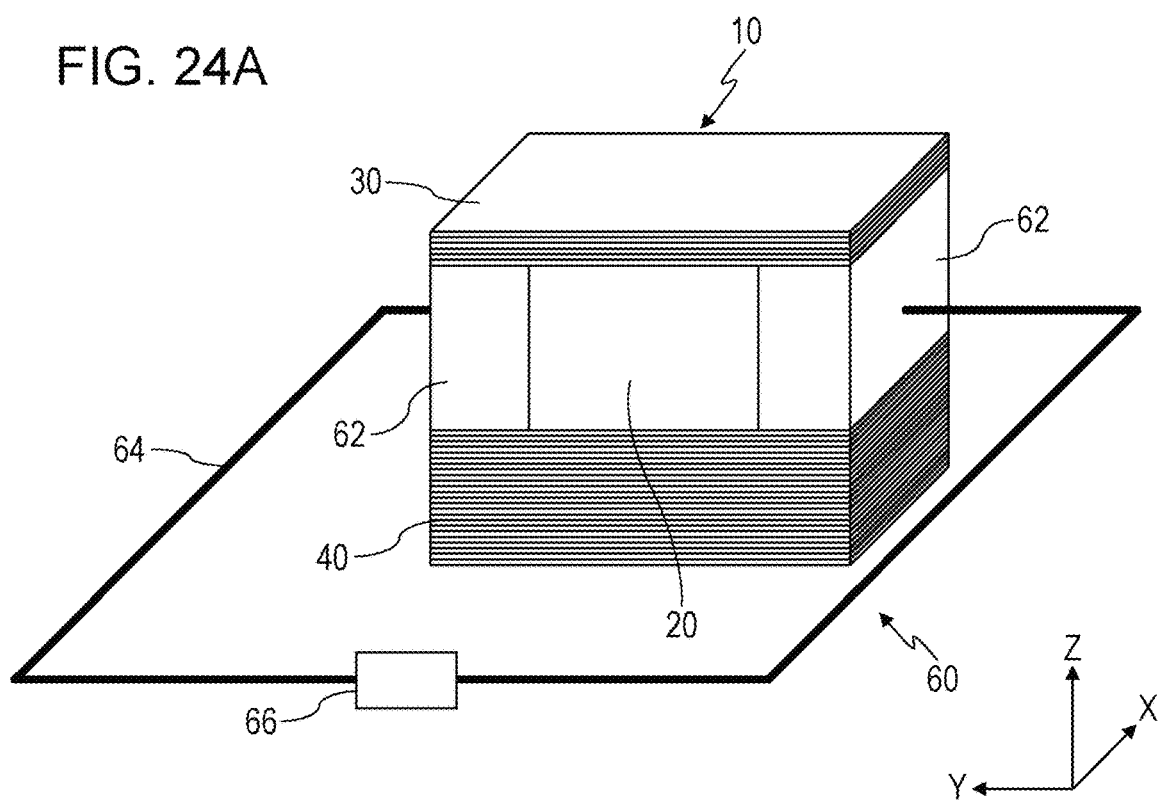
FIG. 24A is a perspective view schematically showing an example of a configuration of a first adjustment element.

FIG. 24A is a perspective view schematically showing an example of a configuration of a first adjustment element 60 (hereinafter sometimes simply referred to as "adjustment element"). In the example shown in FIG. 24A, the adjustment element 60 includes a pair of electrodes 62 and is incorporated in a waveguide element 10. The optical guiding layer 20 is sandwiched between the pair of electrodes 62. The optical guiding layer 20 and the pair of electrodes 62 are provided between the first mirror 30 and the second mirror 40. The optical guiding layer 20 has side surfaces (surfaces parallel to the XZ plane) entirely in contact with the electrodes 62, respectively. The optical guiding layer 20 contains a refractive-index modulation material whose refractive index with respect to light propagating through the optical guiding layer 20 changes in a case where a voltage is applied. The adjustment element 60 further includes a wire 64 drawn out from the pair of electrodes 62 and a power source 66 connected to the wire 64. The refractive index of the optical guiding layer 20 can be modulated by turning on the power source 66 to apply a voltage to the pair of electrodes 62 through the wire 64. For this reason, the adjustment element 60 can also be called "refractive-index modulation element".

Figure 24B:
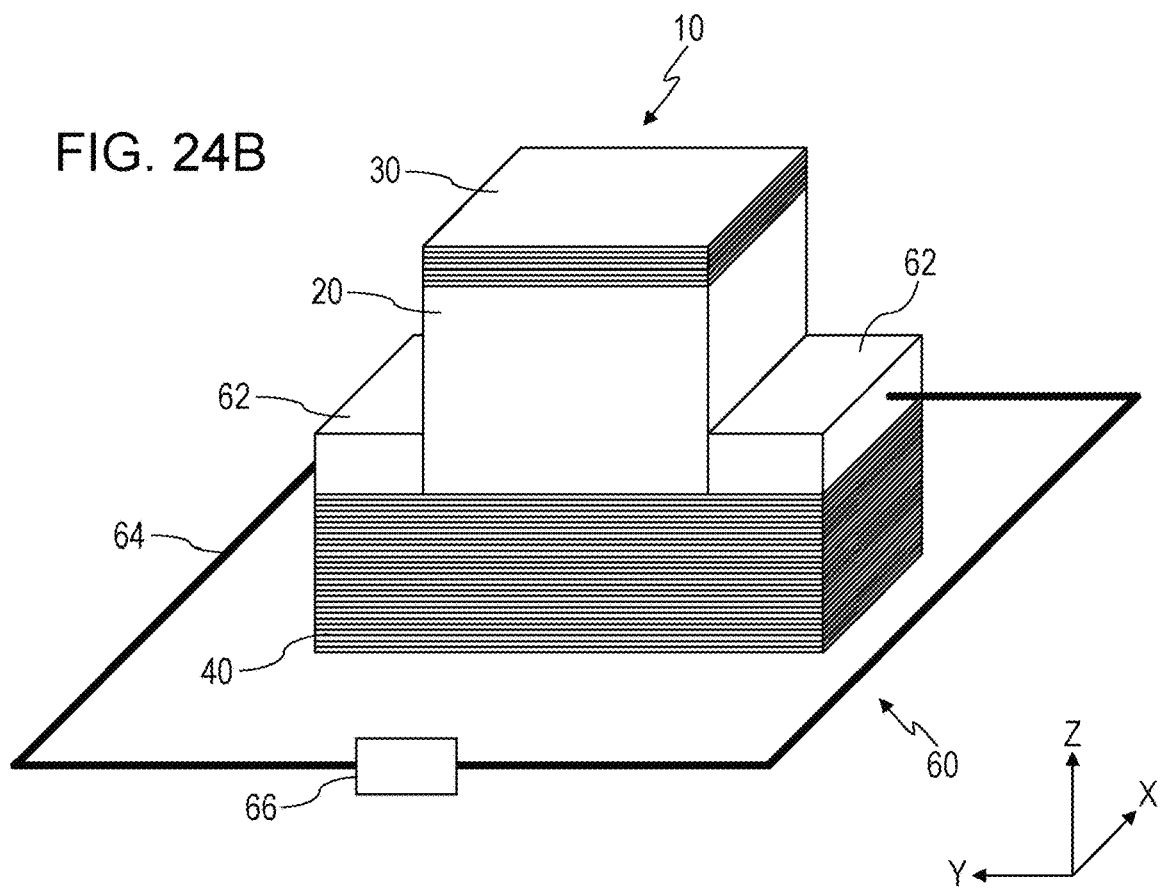
FIG. 24B is a perspective view schematically showing another example configuration of the first adjustment element.

FIG. 24B is a perspective view schematically showing another example configuration of the first adjustment element 60. In this example, the optical guiding layer 20 has side surfaces partially in contact with the electrodes 62, respectively. In other respects, the configuration shown in FIG. 24B is identical to that shown in FIG. 24A. In this way, the direction of emitted light can be varied even with a configuration in which the refractive index of the optical guiding layer 20 is partially changed.

Figure 24C:
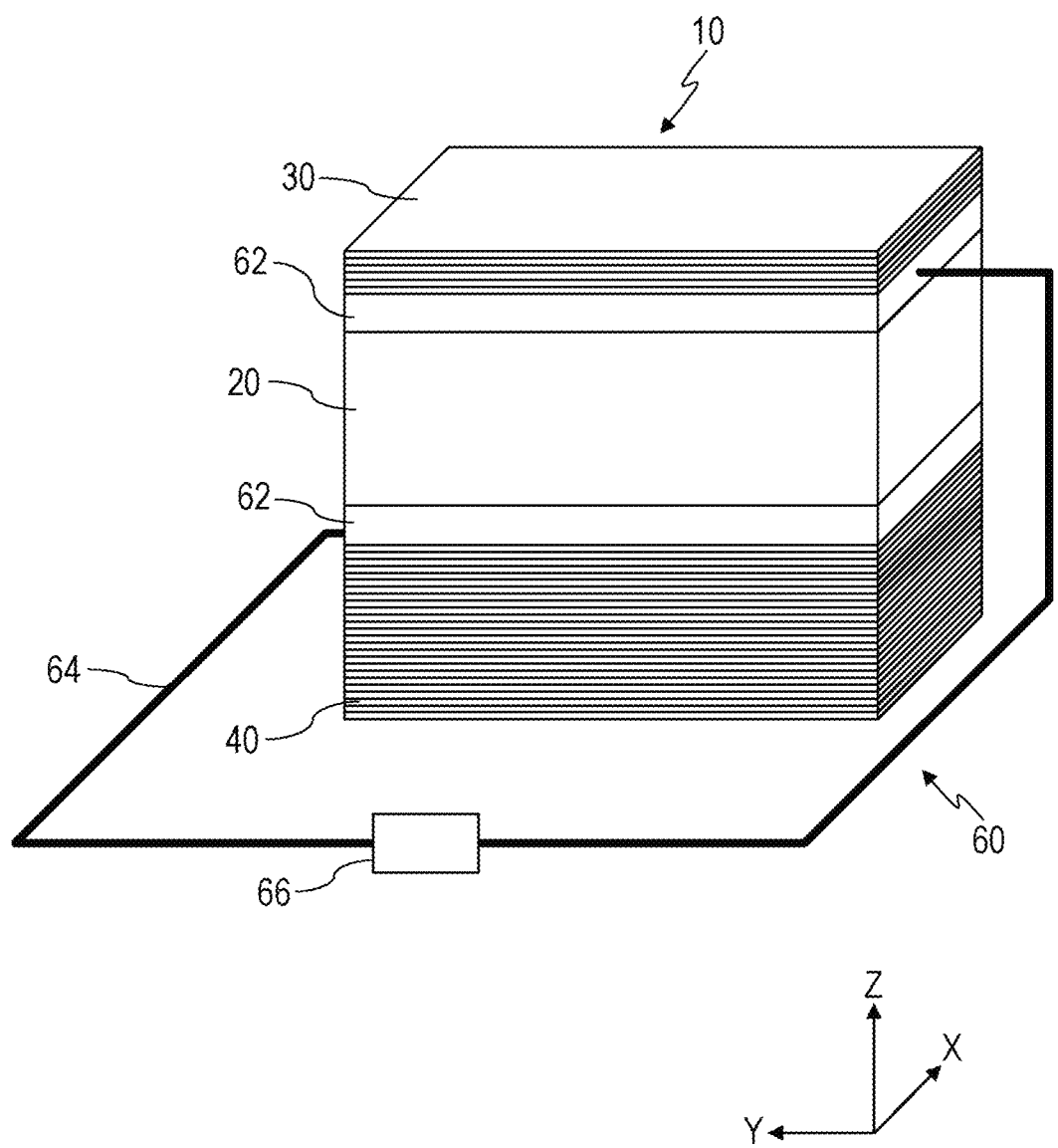
FIG. 24C is a perspective view schematically showing still another example configuration of the first adjustment element.

FIG. 24C is a perspective view schematically showing still another example configuration of the first adjustment element 60. In this example, the pair of electrodes 62 have lamellar shapes that are substantially parallel to the reflecting surfaces of the mirrors 30 and 40. A first one of the electrodes 62 is sandwiched between the first mirror 30 and the optical guiding layer 20. A second one of the electrodes 62 is sandwiched between the second mirror 40 and the optical guiding layer 20. In a case where such a configuration is employed, transparent electrodes can be used as the electrodes 62. Such a configuration offers the advantage of being comparatively easy to manufacture.

In the examples shown in FIGS. 24A to 24C, the optical guiding layer 20 of each waveguide element 10 contains a material whose refractive index with respect to light propagating through the optical guiding layer 20 changes in a case where a voltage is applied. The first adjustment element 60 includes the pair of electrodes 62 between which the optical guiding layer 20 is sandwiched, and changes the refractive index of the optical guiding layer 20 by applying a voltage to the pair of electrodes 62. The application of a voltage can be performed by the aforementioned first driving circuit 110.

The following describes examples of materials that can be used for the constituent elements.

Usable examples of materials for the mirrors 30, 40, 30a, and 40a include multilayer films made of a dielectric substance. A multilayered mirror can be fabricated by periodically forming a plurality of films each having a quarter-wavelength optical thickness and a different refractive index. Such a multilayer mirror can give a high reflectance. Usable examples of materials for such films include $SiO_2$, $TiO_2$, $Ta_2O_5$, Si, SiN, and the like. Each mirror is not limited to being a multilayer mirror but may be formed of a metal such as Ag or Al.

The electrodes 62 and the wire 64 can be made of any of various materials having electric conductivity. Usable examples of electrically conductive materials include metal materials such as Ag, Cu, Au, Al, Pt, Ta, W, Ti, Rh, Ru, Ni, Mo, Cr, and Pd, inorganic compounds such as ITO, tin oxide, zinc oxide, IZO (registered trademark), and SRO, and electrically conductive polymers such as PEDOT and polyaniline.

The optical guiding layer 20 can be made of any of various translucent materials such as dielectric substances, semiconductors, electro-optic materials, and liquid crystal molecules. Examples of dielectric substances include $SiO_2$, $TiO_2$, $Ta_2O_5$, SiN, and AlN. Examples of semiconductor materials include Si, GaAs, and GaN materials. Examples of electro-optic materials include lithium niobium ($LiNbO_3$), barium titanate ($BaTi_3$), lithium tantalate ($LiTaO_3$), zinc oxide (ZnO), lanthanum-doped lead zirconium titanate (PLZT), and potassium tantalate niobate (KTN).

An example of a method for modulating the refractive index of an optical guiding layer 20 is a method based on a carrier injection effect, an electro-optic effect, a birefringence effect, or a thermo-optic effect. The following describes an example of each method.

The method based on the carrier injection effect can be realized by a configuration based on a pin junction of semiconductors. This method involves the use of a structure in which a low-doping-concentration semiconductor is sandwiched between a p-type semiconductor and an n-type semiconductor, and modulates the refractive index by injecting carriers into the semiconductors. In this configuration, the optical guiding layer 20 of each waveguide element 10 contains a semiconductor material. A first one of the pair of electrodes 62 can contain a p-type semiconductor, and a second one of the pair of electrodes 60 can contain an n-type semiconductor. The first adjustment element 60 changes the refractive index of the optical guiding layer 20 by injecting carriers into the semiconductor materials by applying a voltage to the pair of electrodes 62. The optical guiding layer 20 needs only be made of an undoped or low-doping-concentration semiconductor and provided with a p-type semiconductor and an n-type semiconductor in contact therewith. Alternatively, the optical guiding layer 20 may be compositely configured such that a p-type semiconductor and an n-type semiconductor are disposed in contact with a low-doping-concentration semiconductor and, furthermore, an electrically conductive material is in contact with the p-type semiconductor and the n-type semiconductor. For example, the injection into Si of carriers of the order of $10^{20}$ $cm^{-3}$ causes the refractive index of Si to change by approximately 0.1 (see, for example, "Free charge carrier induced refractive index modulation of crystalline silicon", 7th IEEE International Conference on Group IV Photonics, P. 102-104, 1-3 Sep. 2010). In a case where this method is employed, a p-type semiconductor and an n-type semiconductor can be used as materials for the pair of electrodes 62 in FIGS. 24A to 24C. Alternatively, the pair of electrodes 62 may be constituted by metal with a p-type or n-type semiconductor contained in a layer between each electrode 62 and the optical guiding layer 20 or in the optical guiding layer 20 per se.

The method based on the electro-optic effect can be realized by applying an electric field to an optical guiding layer 20 containing an electro-optic material. In particular, use of KTN as the electro-optic material can bring about a great electro-optic effect. Since KTN remarkably increases in dielectric constant at a temperature a little higher than the phase transition temperature from a tetragonal crystal to a cubic crystal, this effect can be utilized. For example, according to "Low-driving-voltage electro-optic modulator with novel KTa1−xNbxO3 crystal waveguides", Jpn. J. Appl. Phys., Vol. 43, No. 8B (2004), the electro-optic constant $g=4.8\times10^{-15}$ $m^2/V^2$ can be obtained with respect to light of a wavelength of 1.55 μm. Accordingly, the application of an electric field of, for example, 2 kV/mm causes the refractive index to change by approximately 0.1 ($=gn^3E^3/2$). Thus, in the configuration based on the electro-optic effect, the optical guiding layer 20 of each waveguide element 10 contains an electro-optic material such as KTN. The first adjustment element 60 changes the refractive index of the electro-optic material by applying a voltage to the pair of electrodes 62.

In the method based on the birefringence effect of liquid crystals, the refractive-index anisotropy of liquid crystals can be changed by driving an optical guiding layer 20 containing a liquid crystal material with the electrodes 62. This makes it possible to modulate the refractive index with respect to light propagating through the optical guiding layer 20. Since liquid crystals generally have a birefringent index difference of approximately 0.1 to 0.2, a refractive-index change comparable to the birefringent index difference can be effected by varying the direction of alignment of liquid crystals with an electric field. Thus, in the configuration based on the birefringence effect of liquid crystals, the optical guiding layer 20 of each waveguide element 10 contains a liquid crystal material. The first adjustment element 60 changes the refractive index of the optical guiding layer 20 by changing the refractive index anisotropy of the liquid crystal material by applying a voltage to the pair of electrodes 62.

The thermo-optic effect is an effect by which the refractive index changes with changes in temperature of the material. For driving by the thermo-optic effect, the refractive index may be modulated by heating an optical guiding layer 20 containing a thermo-optic material.

Figure 25:
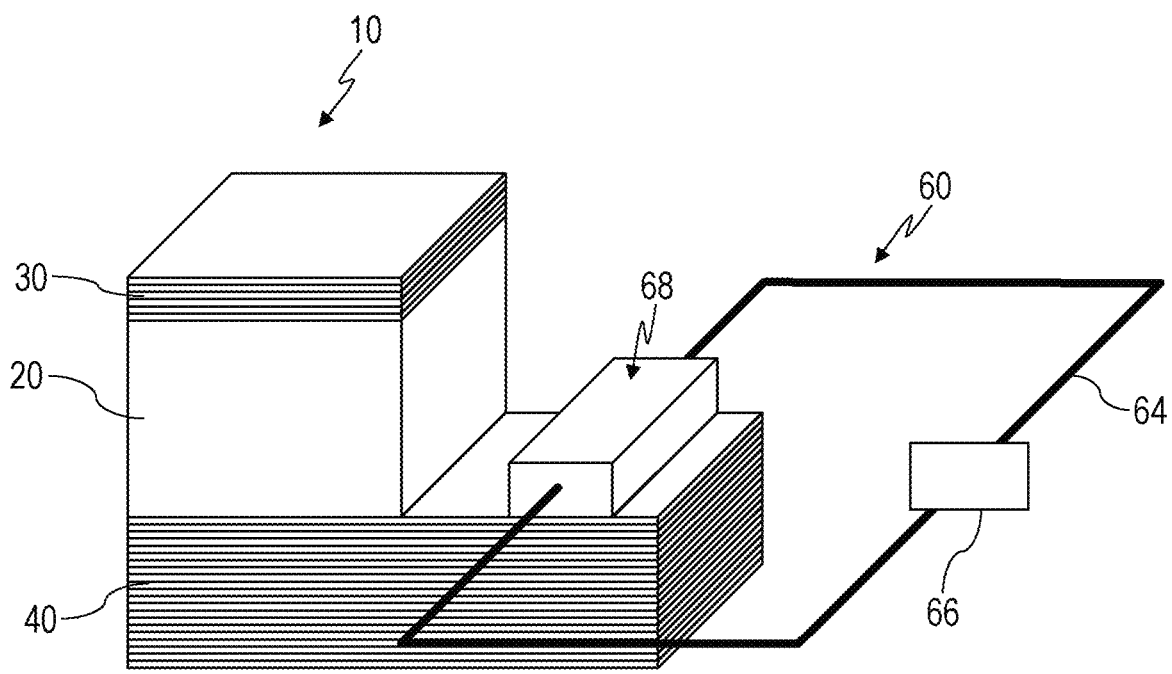
FIG. 25 is a diagram showing an example of a configuration of a combination of an adjustment element including a heater constituted by a material having a high electric resistance and a waveguide element.

FIG. 25 is a diagram showing an example of a configuration of a combination of an adjustment element 60 including a heater 68 constituted by a material having a high electric resistance and a waveguide element 10. The heater 68 can be disposed near the optical guiding layer 20. Heating can be achieved by turning on the power source 66 to apply a voltage to the heater 68 through a wire 64 containing an electrically conductive material. The heater 68 may be in contact with the optical guiding layer 20. In the present example configuration, the optical guiding layer 20 of each waveguide element 10 contains a thermo-optic material whose refractive index changes with changing temperature. The first adjustment element 60 includes the heater 68 disposed in contact with or near the optical guiding layer 20. The first adjustment element 60 changes the refractive index of the optical guiding layer 20 by heating the thermo-optic material with the heater 68.

The optical guiding layer 20 per se may be made of a high electric resistance material, and the optical guiding layer 20 may be heated by sandwiching it directly between a pair of electrodes 62 and applying a voltage to it. In that case, the first adjustment element 60 includes the pair of electrodes 62 between which the optical guiding layer 20 is sandwiched. The first adjustment element 60 changes the refractive index of the optical guiding layer 20 by heating the thermo-optic material (e.g., a high electric resistance material) contained in the optical guiding layer 20 by applying a voltage to the pair of electrodes 62.

As a high electric resistance material for use in the heater 68 or the optical guiding layer 20, a semiconductor or a high-resistivity metal material can be used. Usable examples of semiconductors include Si, GaAs, GaN, and the like. Usable examples of high-resistivity metals include iron, nickel, copper, manganese, chromium, aluminum, silver, gold, platinum, and an alloy thereof. For example, the temperature dependence dn/dT of the refractive index of Si with respect to light of a wavelength of 1500 nm is $1.87 \times 10^{-4}$ ($K^{-1}$) (see "Temperature-dependent refractive index of silicon and germanium", Proc. SPIE 6273, Optomechanical Technologies for Astronomy, 62732J). Therefore, a change in temperature by 500° C. can effect a change in the refractive index by approximately 0.1. When the heater 68 is provided near the optical guiding layer 20 to locally heat it, even a large temperature change of 500° C. can be made at a comparatively high speed.

The response speed of a refractive-index change caused by carrier injection is determined by the life of carriers. In general, the response speed ranges from approximately 100 MHz to 1 GHz, as the life of carriers is on the order of nanoseconds (ns).

In a case where an electro-optic material is used, a refractive-index change is effected by inducing polarization of electrons by applying an electric field. In general, polarization is induced at an extremely high speed. In the case of a material such as $LiNbO_3$ or $LiTaO_3$, the response time is on the order of femtoseconds (fs). Therefore, high-speed driving exceeding 1 GHz is possible.

In a case where a thermo-optic material is used, the response speed of a refractive-index change is determined by the speed of a rise or fall in temperature. An abrupt rise in temperature is achieved by locally heating only an area near the waveguide. Further, turning off the heater in a state where the temperature has locally risen can effect an abrupt fall in temperature by radiating heat around the area. A response speed of at highest approximately 100 KHz is achieved.

In the foregoing example, the first adjustment element 60 changes the X component of the wave vector of emitted light by simultaneously changing the refractive index of each optical guiding layer 20 by a constant value. In refractive-index modulation, the amount of the modulation depends on the properties of a material, and in order to obtain a large modulation amount, it is necessary to apply a high voltage or align liquid crystals. Meanwhile, the direction of light that is emitted from a waveguide element 10 also depends on the distance between the mirror 30 and the mirror 40. Therefore, the thickness of the optical guiding layer 20 may be changed by varying the distance between the mirror 30 and the mirror 40. The following describes an example of a configuration in which the thickness of an optical guiding layer 20 is changed.

In order for the thickness of an optical guiding layer 20 to be changed, the optical guiding layer 20 can be constituted by an easily-deformable material such as a gas or a liquid. The thickness of the optical guiding layer 20 can be changed by moving at least either of the mirrors 30 and 40 between which the optical guiding layer 20 is sandwiched. In so doing, in order to keep the degree of parallelization between the upper and lower mirrors 30 and 40, such a configuration can be employed as to minimize the deformation of the mirror 30 or 40.

Figure 26:
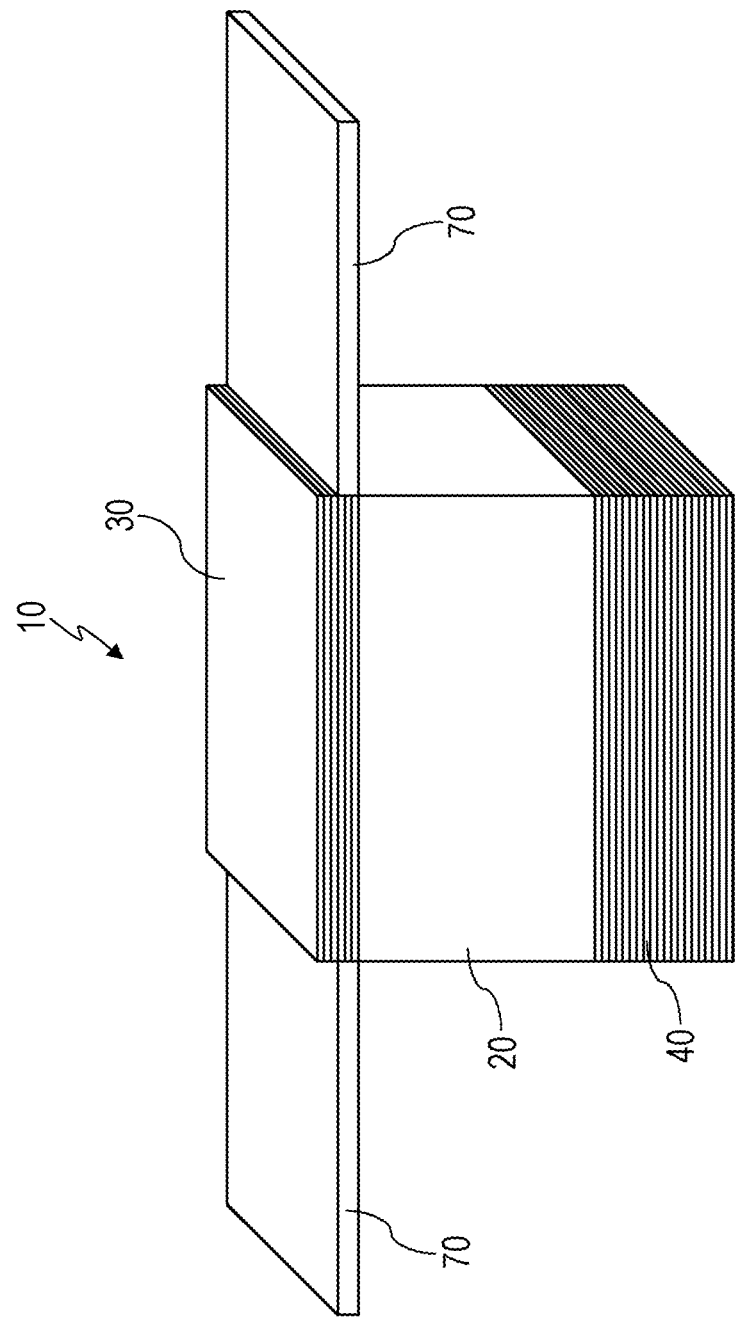
FIG. 26 is a diagram showing an example configuration in which a mirror is supported by supporting members constituted by an easily-deformable material.

FIG. 26 is a diagram showing an example configuration in which a mirror 30 is supported by supporting members 70 constituted by an easily-deformable material. The supporting members 70 can each include a thin member or a thin frame that is relatively more easily deformable than the mirror 30. In this example, the first adjustment element includes an actuator connected to the first mirror 30 of each waveguide element 10. The actuator changes the thickness of the optical guiding layer 20 by varying the distance between the first mirror 30 and the second mirror 40. It should be noted that the actuator can be connected to the first mirror 30 and/or the second mirror 40. Examples of the actuator that drives the mirror 30 include various actuators based on electrostatic force, electromagnetic induction, a piezoelectric material, a shape-memory alloy, or heat.

In the configuration based on electrostatic force, the actuator of the first adjustment element moves the mirror 30 and/or the mirror 40 by means of interelectrode attractive force or repulsive force generated by electrostatic force. The following describes some examples of such configurations.

Figure 27:
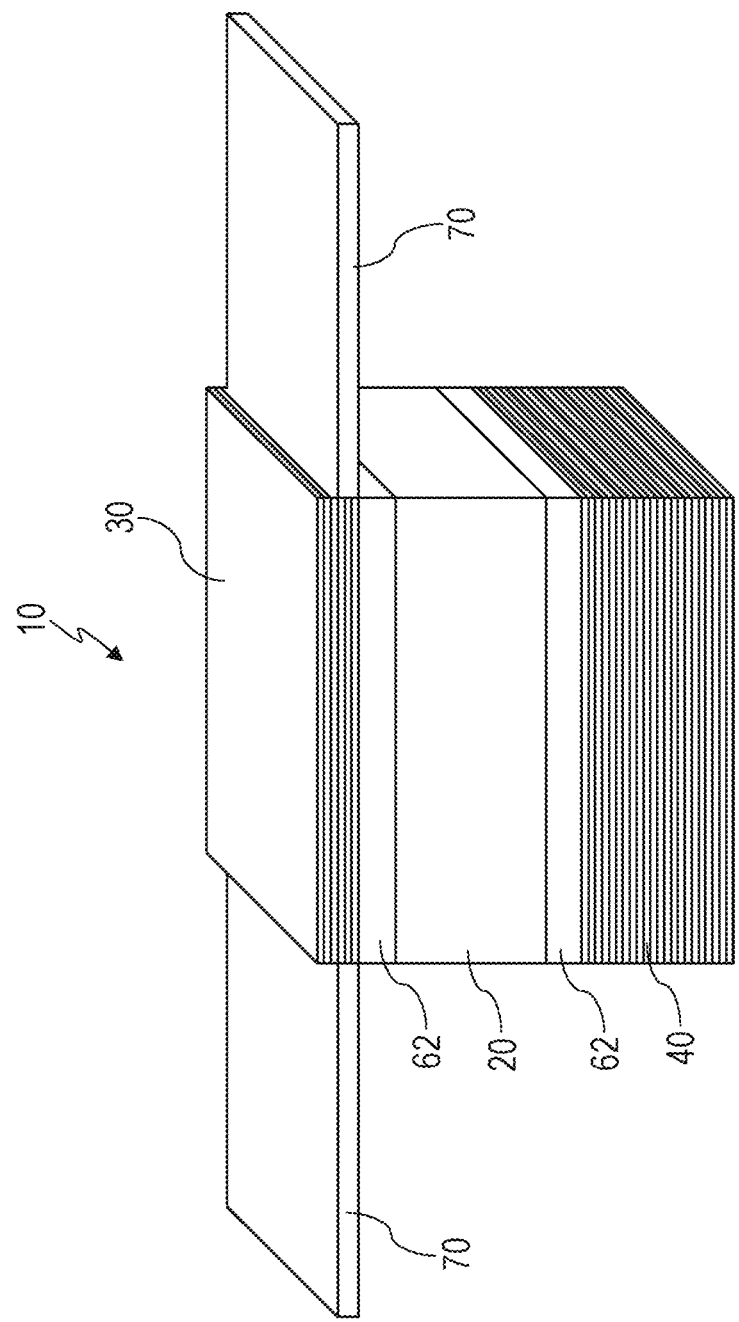
FIG. 27 is a diagram showing an example of a configuration in which mirrors are moved by electrostatic force generated between electrodes.

FIG. 27 is a diagram showing an example of a configuration in which the mirror 30 and/or the mirror 40 is/are moved by electrostatic force generated between electrodes. In this example, translucent electrodes 62 (e.g., transparent electrodes) are provided between the mirror 30 and the optical guiding layer 20 and between the mirror 40 and the optical guiding layer 20, respectively. Each of the supporting members 70 disposed on both sides, respectively, of the mirror 30 has one end fixed to the mirror 30 and the other end fixed to a housing (not illustrated). Applying positive and negative voltages to the pair of electrodes 62 generates attractive force that reduce the distance between the mirror 30 and the mirror 40. Stopping applying the voltages causes the supporting members 70 supporting the mirror 30 to generate restoring force that returns the distance between the mirror 30 and the mirror 40 to the original length. Such electrodes 62 that generate attractive force do not need to be provided all over the mirrors 30 and 40. The pair of electrodes 62 are included by an actuator in this example. A first one of the pair of electrodes 62 is fixed to the first mirror 30, and a second one of the pair of electrodes 62 is fixed to the second mirror 40. The actuator varies the distance between the first mirror 30 and the second mirror 40 by generating interelectrode electrostatic force by applying a voltage to the pair of electrodes 62. It should be noted that the application of a voltage to the electrodes 62 is performed by the aforementioned first driving circuit 110 (see, for example, FIG. 21).

Figure 28:
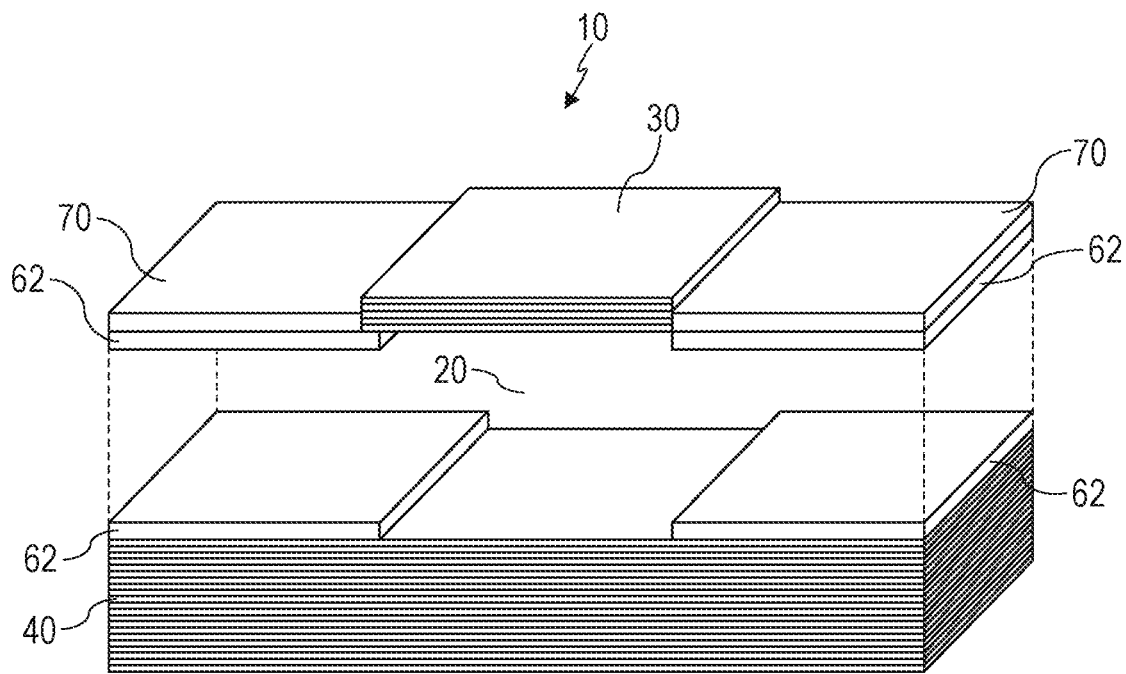
FIG. 28 is a diagram showing an example configuration in which electrodes that generates attractive force are disposed in such positions as not to hinder propagation of light.

FIG. 28 is a diagram showing an example configuration in which electrodes 62 that generates attractive force are disposed in such positions as not to hinder propagation of light. In this example, the electrodes 62 do not need to be transparent. As illustrated, the electrode 62 fixed to each of the mirrors 30 and 40 does not need to be a single electrode but may be a divided electrode. The distance between the mirror 30 and the mirror 40 is measured by measuring a capacitance of a part of the divided electrode. This makes it possible to perform feedback control such as an adjustment of the degree of parallelization between the mirror 30 and the mirror 40.

The mirror 30 and/or the mirror 40 may be driven by, instead of utilizing interelectrode electrostatic force, utilizing electromagnetic induction that causes a magnetic body in a coil to generate attractive force or repulsive force.

An actuator based on a piezoelectric material, a shape-memory alloy, or thermal deformation utilizes a phenomenon in which a material is deformed by energy applied from an outside source. For example, piezoelectric zirconate titanate (PZT), which is a typical piezoelectric material, expands and contracts in the presence of the application of an electric field in the direction of polarization. This piezoelectric material makes it possible to directly vary the distance between the mirror 30 and the mirror 40. However, since the piezoelectric constant of PZT is approximately 100 pm/V, the amount of displacement is as small as approximately 0.01% even in the presence of the application of an electric field of, for example, 1 V/μm. For this reason, in a case where such a piezoelectric material is used, no sufficient distances can be allowed for the mirrors 30 and 40 to move. To address this problem, a configuration called "unimorph" or "bimorph" can be used to increase the amount of displacement.

Figure 29:
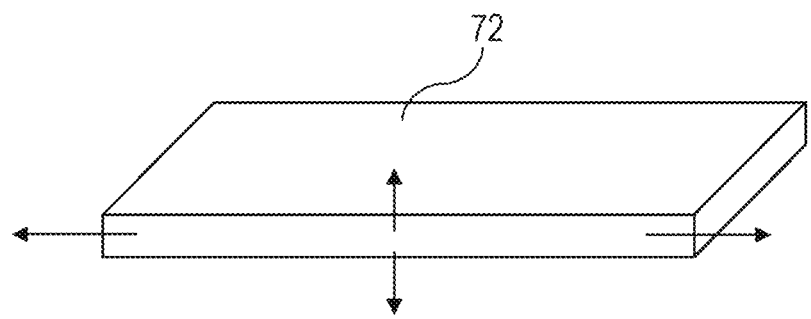
FIG. 29 is a diagram showing an example of a piezoelectric element containing a piezoelectric material.

FIG. 29 is a diagram showing an example of a piezoelectric element 72 containing a piezoelectric material. Each arrow indicates a direction of displacement of the piezoelectric element 72, and the magnitude of that arrow indicates an amount of displacement. As shown in FIG. 29, an amount of displacement in a plane direction is larger than an amount of displacement in a thickness direction, as the amount of displacement of the piezoelectric element 72 depends on the length of the material.

Figure 30A:
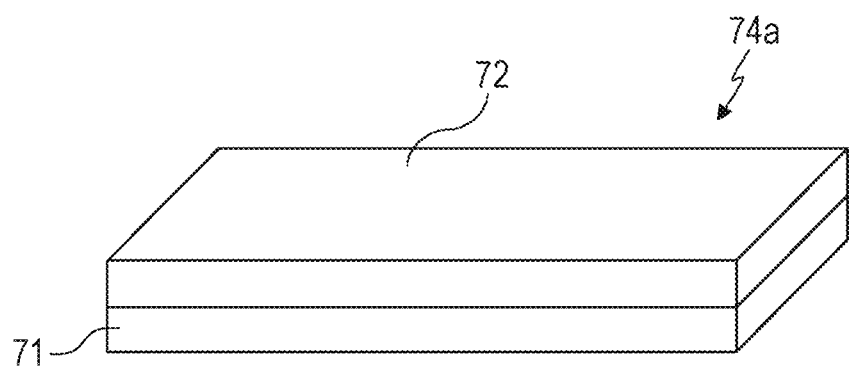
FIG. 30A is a diagram showing an example configuration of a supporting member having a unimorph structure including a piezoelectric element shown in FIG. 29.

FIG. 30A is a diagram showing an example configuration of a supporting member 74a having a unimorph structure including a piezoelectric element 72 shown in FIG. 29. The supporting member 74a has a structure in which a layer of piezoelectric element 72 and a layer of non-piezoelectric element 71 are stacked. The distance between the mirror 30 and the mirror 40 can be varied by deforming such a supporting member 74a fixed to at least either of the mirrors 30 and 40.

Figure 30B:
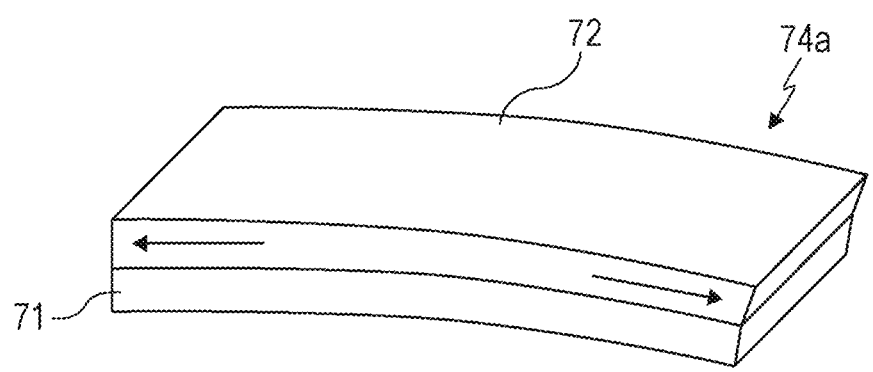
FIG. 30B is a diagram showing an example of a state where the supporting member has become deformed by applying a voltage to the piezoelectric element.

FIG. 30B is a diagram showing an example of a state where the supporting member 74a has been deformed by applying a voltage to the piezoelectric element 72. When a voltage is applied to the piezoelectric element 72, only the piezoelectric element 72 expands in a plane direction, so that the whole supporting member 74a bends. This makes it possible to make the amount of displacement larger than in the absence of the non-piezoelectric element 71.

Figure 31A:
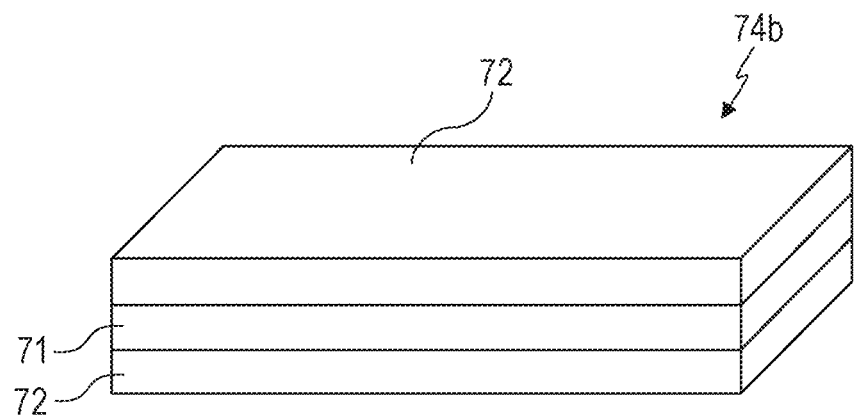
FIG. 31A is a diagram showing an example configuration of a supporting member having a bimorph structure including piezoelectric elements shown in FIG. 29.

FIG. 31A is a diagram showing an example configuration of a supporting member 74b having a bimorph structure including piezoelectric elements 72 shown in FIG. 29. The supporting member 74b has a structure in which two layers of piezoelectric element 72 and one layer of non-piezoelectric element 71 therebetween are stacked. The distance between the mirror 30 and the mirror 40 can be varied by deforming such a supporting member 74b fixed to at least either of the mirrors 30 and 40.

Figure 31B:
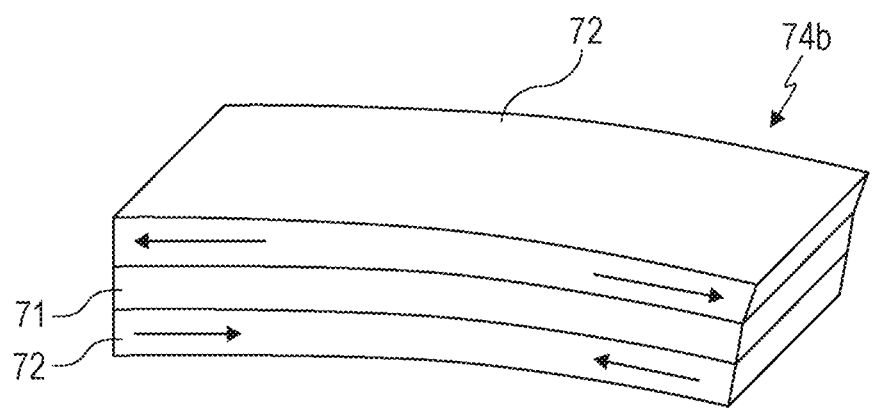
FIG. 31B is a diagram showing an example of a state where the supporting member has become deformed by applying a voltage to both piezoelectric elements.

FIG. 31B is a diagram showing an example of a state where the supporting member 74a has been deformed by applying a voltage to both piezoelectric elements 72. In a bimorph, the upper and lower piezoelectric elements 72 are opposite in direction of displacement to each other. Therefore, using a bimorph configuration can further increase the amount of displacement than using a unimorph configuration.

FIG. 32 is a diagram showing an example of an actuator in which supporting members 74a shown in FIG. 30A are disposed on both sides, respectively, of the mirror 30. The distance between the mirror 30 and the mirror 40 can be varied by using such a piezoelectric element to deform the supporting members 74a in such a manner as to bend beams. The supporting members 74a shown in FIG. 30A may be replaced by supporting members 74b shown in FIG. 31A.

Figure 33A:
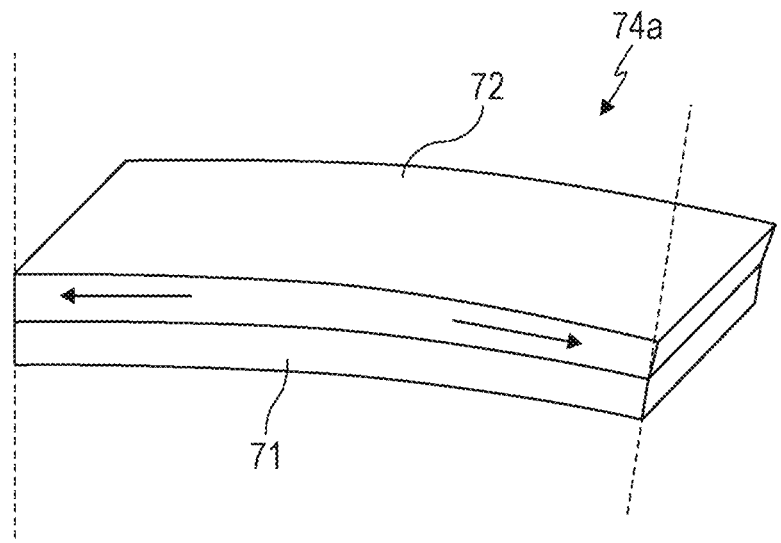
FIG. 33A is a diagram for explaining a tip tilt that occurs in a unimorph actuator.
Figure 33B:
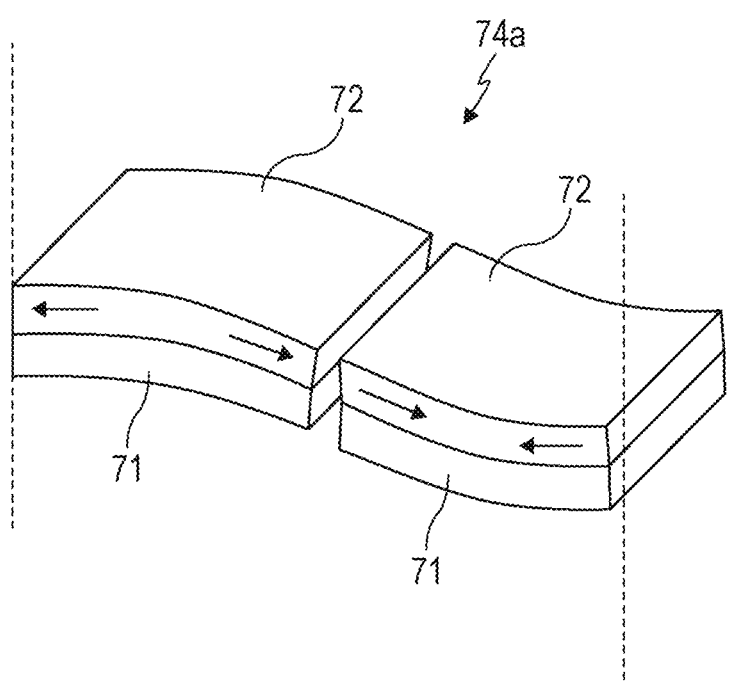
FIG. 33B is a diagram showing an example of a serial connection of two unimorph supporting members that expand and contract in different directions.

It should be noted that a unimorph actuator deforms into an arc shape and therefore has its unfixed end tilted as shown in FIG. 33A. Therefore, when the mirror 30 is low in rigidity, it is difficult to hold the mirror 30 and the mirror 40 parallel to each other. To address this problem, it is possible, as shown in FIG. 33B, to form a serial connection of two unimorph supporting members 74a that expand and contract in different directions. In the example shown in FIG. 33B, a region in a supporting member 74a that expands and contracts and a region in a supporting member 74a that extends are opposite in bending direction to each other. This as a result makes it possible to prevent the unfixed end from being tilted. Using such supporting members 74a makes it possible to prevent the mirrors 30 and 40 from tilting.

In the same way as above, a beam structure that is capable of flexural deformation can be realized by bonding together materials having different coefficients of thermal expansion. Furthermore, a beam structure can also be realized by a shape-memory alloy. Either beam structure can be utilized to adjust the distance between the mirror 30 and the mirror 40.

Alternatively, it is possible to vary the distance between the mirror 30 and the mirror 40 by forming the optical guiding layer 20 as an enclosed space and changing the volume of the optical guiding layer 20 by taking the inside air or liquid into and out of the optical guiding layer 20 with a small-size pump.

As noted above, the actuator of the first adjustment element can have any of diverse structures to change the thickness of an optical guiding layer 20. Such a change in thickness may be individually made for each of the plurality of waveguide elements 10, or may be uniformly made for all of the waveguide elements 10. In particular, in a case where the plurality of waveguide elements 10 are all the same in structure, the distance between the mirror 30 and the mirror 40 of each waveguide element 10 is constantly controlled. This allows one actuator to drive all of the waveguide elements 10 en bloc.

FIG. 34 is a diagram showing an example of a configuration in which a supporting member (auxiliary substrate) 52 supporting a plurality of first mirrors 30 is driven en bloc by an actuator. In FIG. 34, the second mirror 40 is a single plate-shaped mirror. As in an embodiment described previously, the mirror 40 may be divided into a plurality of mirrors. The supporting member 52 is constituted by a translucent material and has a unimorph piezoelectric actuator provided on each side.

Figure 35:
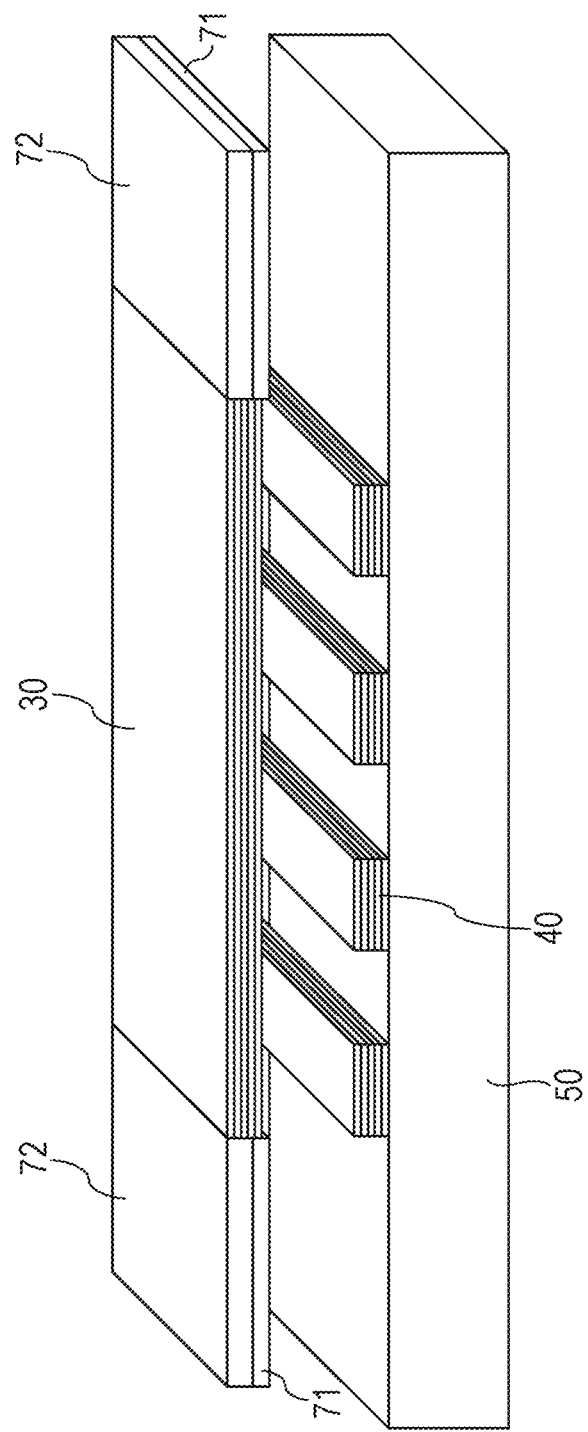
FIG. 35 is a diagram showing an example configuration in which a first mirror of a plurality of waveguide elements is one plate-shaped mirror.

FIG. 35 is a diagram showing an example configuration in which a first mirror 30 of a plurality of waveguide elements 10 is one plate-shaped mirror. In this example, the second mirror 40 is divided into a plurality of mirrors respectively corresponding to the plurality of waveguide elements 10. As in the examples shown in FIGS. 37 and 38, at least either of the mirrors 30 and 40 of each waveguide element 10 may be a part of a single-plate-shaped mirror. The actuator may vary the distance between the mirror 30 and the mirror 40 by moving the plate-shaped mirror.

Refractive-Index Modulation for Phase Shift

The following describes a configuration for the adjustment of phases in the plurality of phase shifters 80 by the second adjustment element. The adjustment of phases in the plurality of phase shifters 80 can be achieved by changing the refractive indices of the waveguides 20a of the phase shifters 80. This refractive-index adjustment can be achieved by a method that is exactly the same as the already-described method for adjusting the refractive index of the optical guiding layer 20 of each waveguide element 10. For example, it is possible to directly apply the configuration and method for refractive-index modulation described with reference to FIGS. 24A to 25. The terms "waveguide element 10", "first adjustment element 60", "optical guiding layer 20", and "first driving circuit 110" used in the descriptions of FIGS. 24A to 25 shall be read as "phase shifter 80", "second adjustment element", "waveguide 20a", and "second driving circuit 210", respectively. For this reason, a detailed description of refractive-index modulation in the phase shifters 80 is omitted.

The waveguide 20a of each phase shifter 80 contains a material whose refractive index changes in response to the application of a voltage or temperature change. The second adjustment element changes the refractive index in the waveguide 20a of each phase shifter 80 by applying a voltage to the waveguide 20a or changing the temperature of the waveguide 20a. This allows the second adjustment element to vary differences in phase among rays of light propagating from the plurality of phase shifters 80 to the plurality of waveguide elements 10.

Each phase shifter 80 can be configured to be capable of a phase shift of at least $2\pi$ by the time light passes. In a case where the amount of change in refractive index per unit length of the waveguide 20a of a phase shifter 80 is small, the length of the waveguide 20a may be increased. For example, the size of a phase shifter 80 may range from hundreds of micrometers (μm) to several millimeters (mm) or, in some cases, may be larger than that. On the other hand, the length of each waveguide element 10 can range in value from several tens of micrometers to several tens of millimeters.

Configuration for Synchronous Driving

In the present embodiment, the first adjustment element drives each waveguide element 10 so that rays of light that are emitted from the plurality of waveguide elements 10 are the same in direction. In order that rays of light that are emitted from the plurality of waveguide elements 10 are the same in direction, it is only necessary, for example, to synchronously drive the plurality of waveguide elements 10 by providing each individual waveguide element 10 with a driver.

Figure 36:
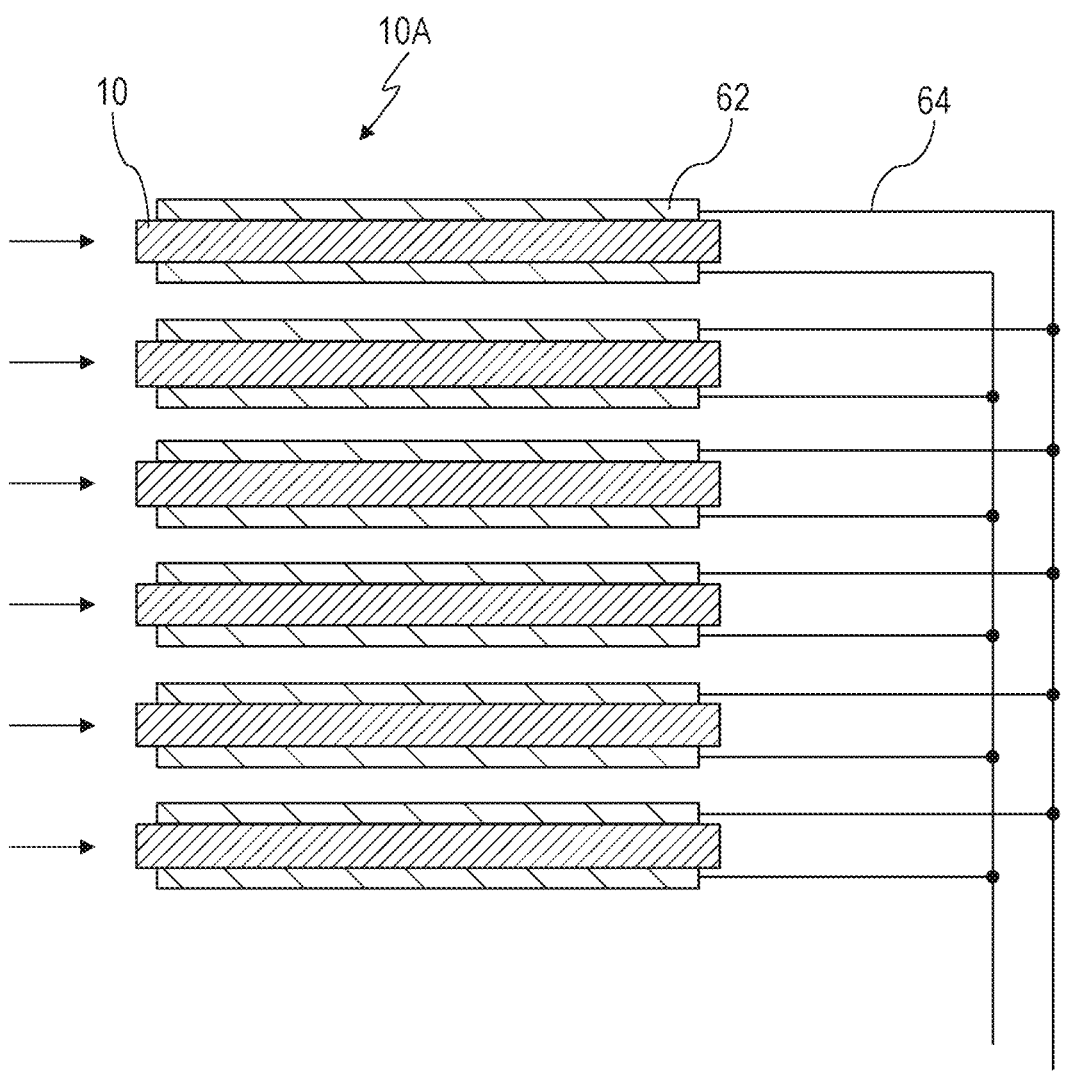
FIG. 36 is a diagram showing an example of a configuration in which wires are commonly drawn from electrodes of each waveguide element.
Figure 37:
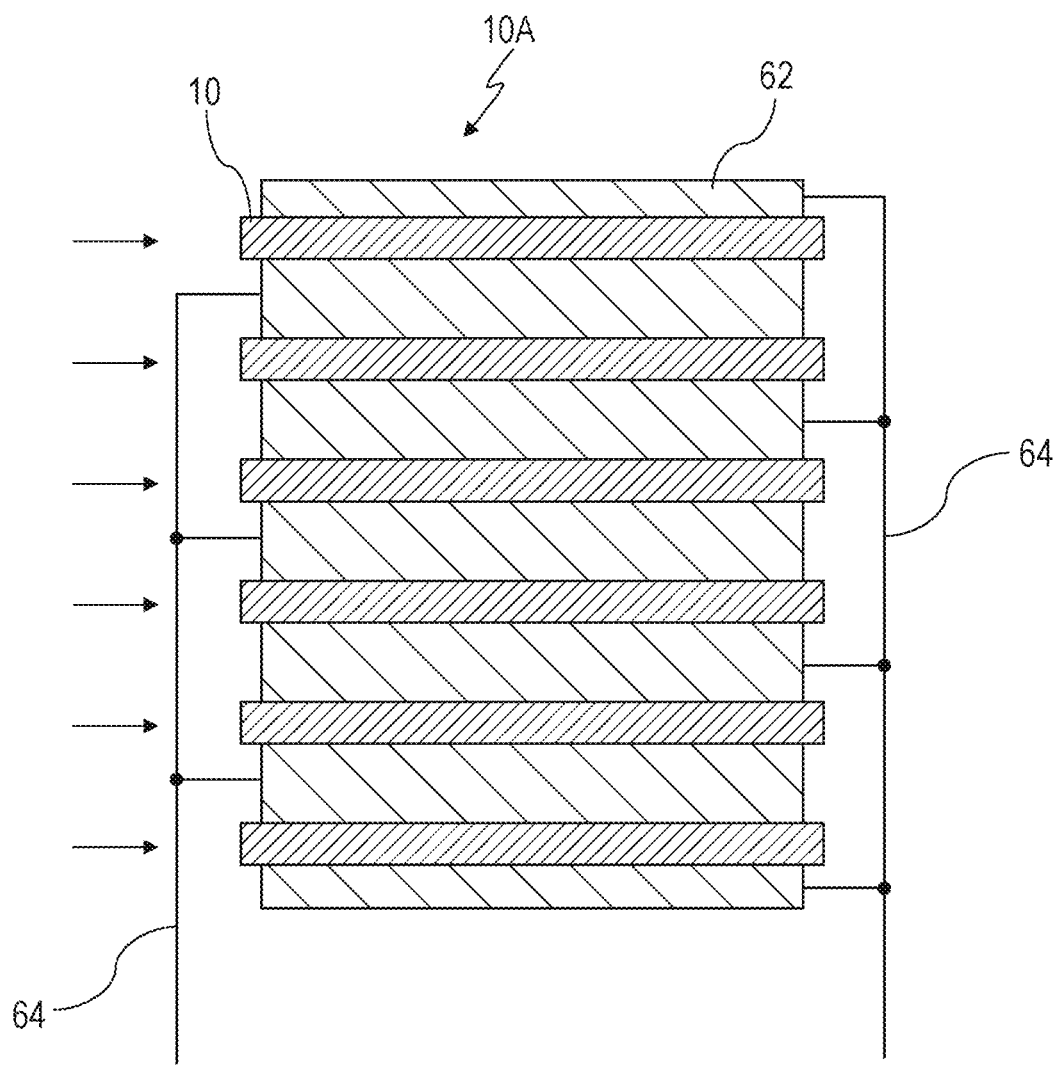
FIG. 37 is a diagram showing an example of a configuration providing commonality of some of the electrodes and some of the wires.
Figure 38:
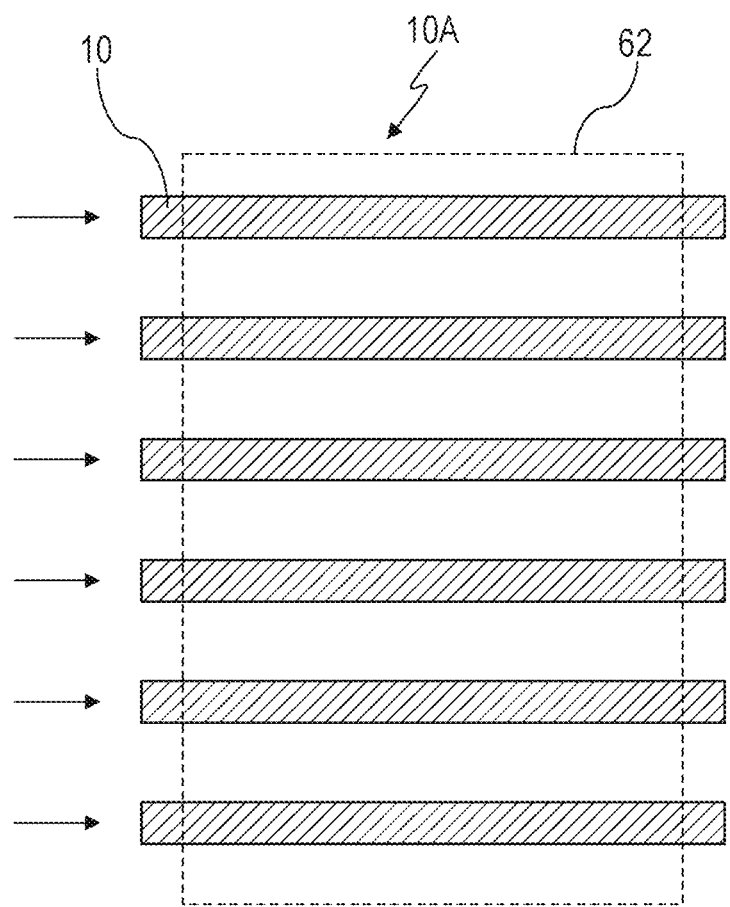
FIG. 38 is a diagram showing an example of a configuration of a common electrode is disposed for a plurality of waveguide elements.

FIG. 36 is a diagram showing an example of a configuration in which wires 64 are commonly drawn from electrodes 62 of each waveguide element 10. FIG. 37 is a diagram showing an example of a configuration providing commonality of some of the electrodes 62 and some of the wires 64. FIG. 38 is a diagram showing an example of a configuration of a common electrode 62 is disposed for a plurality of waveguide elements 10. In FIGS. 36 to 38, the straight arrows indicate the inputting of rays of light. With such a configuration as that shown in any of these drawings, wires for driving the waveguide array 10A can be made simple.

A configuration of the present embodiment makes it possible to perform a two-dimensional scan with light with a simple device configuration. For example, in the case of synchronous driving of a waveguide array constituted by N waveguide elements 10, providing each independent driving circuits requires N driving circuits. However, a special way of providing commonality of electrodes or wires as described above makes operation possible with a single driving circuit.

In a case where a phase shifter array 80A is provided in front of a waveguide array 10A, further N driving circuits are needed to independently actuate each phase shifter 80. However, such a cascade arrangement of phase shifters 80 as the example shown in FIG. 23 makes operation possible even with a single driving circuit. That is, a configuration of the present disclosure can achieve an operation of performing a two-dimensional scan with light with two or 2N driving circuits. Further, since the waveguide array 10A and the phase shifter array 80A may be each independently actuated, their wires can be easily drawn out without interfering with each other.

Manufacturing Method

A waveguide array, a phase shifter array 80A, and dielectric waveguides joining them can be manufactured by a process that is capable of high-accuracy micromachining, such as a semiconductor process, a three-dimensional printer, self-organization, or nanoimprinting. These processes make it possible to integrate necessary elements into a small region.

In particular, utilization of the semiconductor process offers the advantage of extremely high machining accuracy and high mass-productivity. In a case where the semiconductor process is utilized, films of various materials can be formed on a substrate by vapor deposition, sputtering, CVD, coating, and the like. Furthermore, micromachining is possible with photolithography and an etching process. Usable examples of materials for the substrate include Si, $SiO_2$, $Al_2O_3$, AlN, SiC, GaAs, GaN, and the like.

Modifications

The following describes modifications of optical scanning devices.

Figure 39:
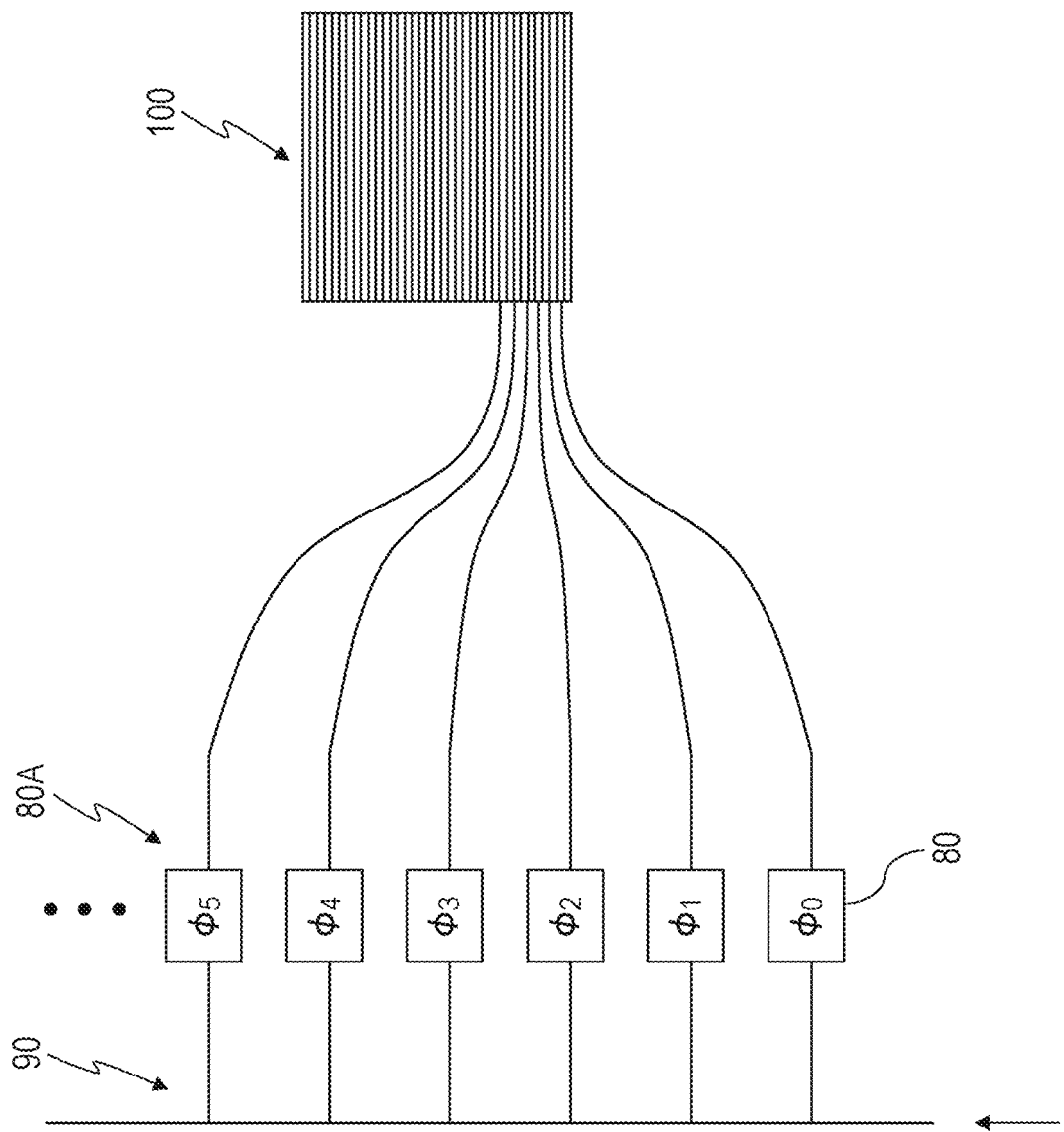
FIG. 39 is a diagram schematically showing an example of a configuration in which a large region is secured for a phase shifter array to be disposed in and a waveguide array is integrated to be small.

FIG. 39 is a diagram schematically showing an example of a configuration in which a large region is secured for a phase shifter array 80A to be disposed in and a waveguide array is integrated to be small. Such a configuration makes it possible to secure a sufficient phase shift amount even in a case where only a small refractive-index change occurs in the material constituting the waveguide of each phase shifter 80. Further, in a case where a phase shifter 80 is driven by heat, a wide space can be left, so that an adjacent phase shifter 80 is less affected.

Figure 40:
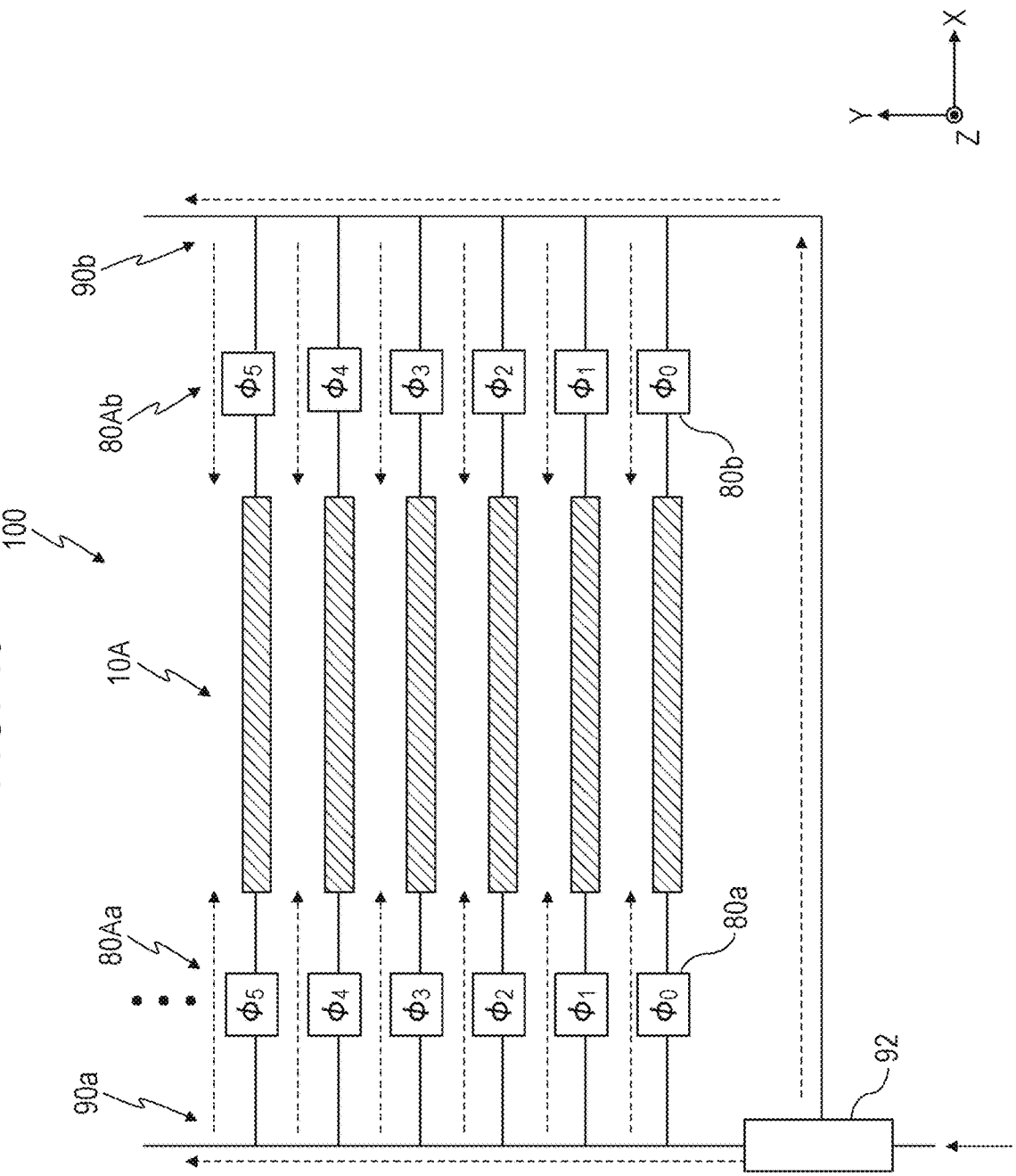
FIG. 40 is a diagram showing an example configuration in which two phase shifter arrays are disposed on both sides, respectively, of a waveguide array.

FIG. 40 is a diagram showing an example configuration in which two phase shifter arrays 80Aa and 80Ab are disposed on both sides, respectively, of a waveguide array 10A. In this example, the optical scanning device 100 includes two optical dividers 90a and 90b and the two phase shifter arrays 80Aa and 80Ab on both sides, respectively, of the waveguide array 10A. In FIG. 40, the straight arrows indicated by dashed lines indicate rays of light propagating through the optical dividers 90a and 90b and phase shifters 80a and 80b. The phase shifter array 80Aa and the optical divider 90a are connected to a first side of the waveguide array 10A, and the phase shifter array 80Ab and the optical divider 90b are connected to a second side of the waveguide array 10A. The optical scanning device 100 further includes an optical switch 92 that switches between supplying light to the optical divider 90a and supplying light to the optical divider 90b. Switching the optical switch 92 makes it possible to switch between a state where light is inputted to the waveguide array 10A from the left side of FIG. 40 and a state where light is inputted to the waveguide array 10A from the right side of FIG. 40.

The configuration of the present modification offers the advantage of making it possible to enlarge the range in an X direction of a scan with light that is emitted from the waveguide array 10A. In a configuration in which light is inputted to the waveguide array 10A from one side, the driving of each waveguide element 10 makes it possible to perform a scan with light passed from the front direction (+Z direction) to the +X direction or to the −X direction. On the other hand, in the present modification, in a case where light is inputted from the optical divider 90a on the left side of FIG. 40, a scan can be performed with light passed from the front direction to the +X direction. Meanwhile, in a case where light is inputted from the optical divider 90b on the right side, a scan can be performed with light passed from the front direction to the −X direction. That is, in the configuration shown in FIG. 40, a scan can be performed with light passed both leftward and rightward on FIG. 40 as viewed from the front. This makes it possible to make the angular range of a scan wider than in the configuration in which light is inputted from one side. The optical switch 92 is controlled in accordance with an electric signal from a control circuit (e.g., a microcontroller unit; not illustrated). The present example configuration makes it possible to control the driving of all elements in accordance with an electric signal.

Figure 41A:
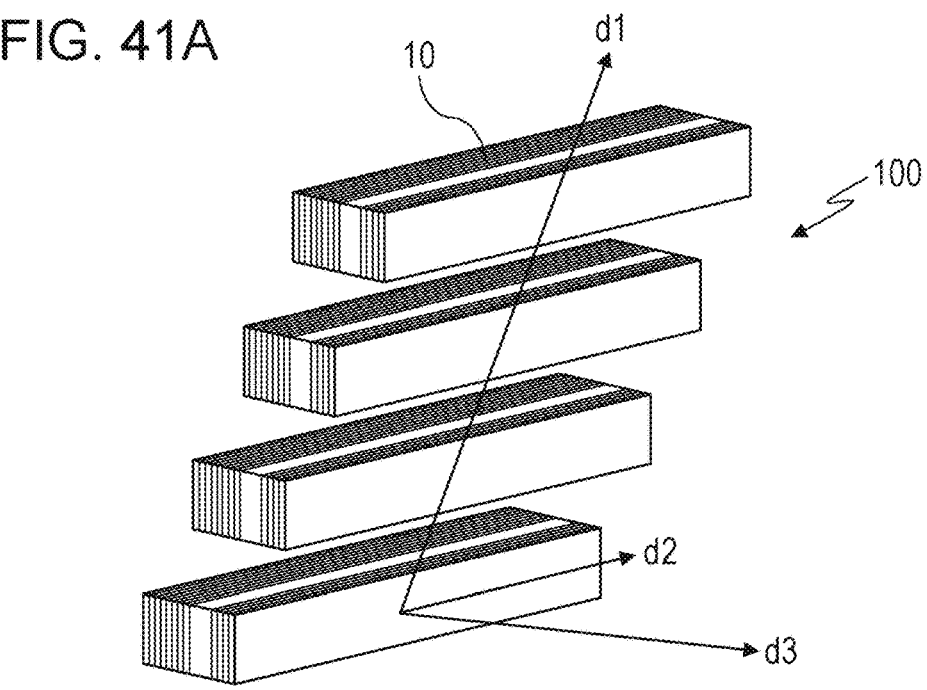
FIG. 41A shows an example configuration of a waveguide array in which an array direction of waveguide elements and a direction in which the waveguide elements extend are not orthogonal to each other.

The foregoing description has dealt only with a waveguide array in which the array direction of the waveguide elements 10 and the direction in which the waveguide elements 10 extend are orthogonal to each other. However, these directions do not need to be orthogonal to each other. For example, such a configuration as that shown in FIG. 41A may be used. FIG. 41A shows an example configuration of a waveguide array in which the array direction d1 of the waveguide elements 10 and the direction d2 in which the waveguide elements 10 extend are not orthogonal to each other. In this example, the plane of light emission of each waveguide element 10 does not need to lie in the same plane as that of the other waveguide element 10. Even with such a configuration, the direction d3 of emission of light can be two-dimensionally varied by appropriately controlling each waveguide element 10 and each phase shifter.

Figure 41B:
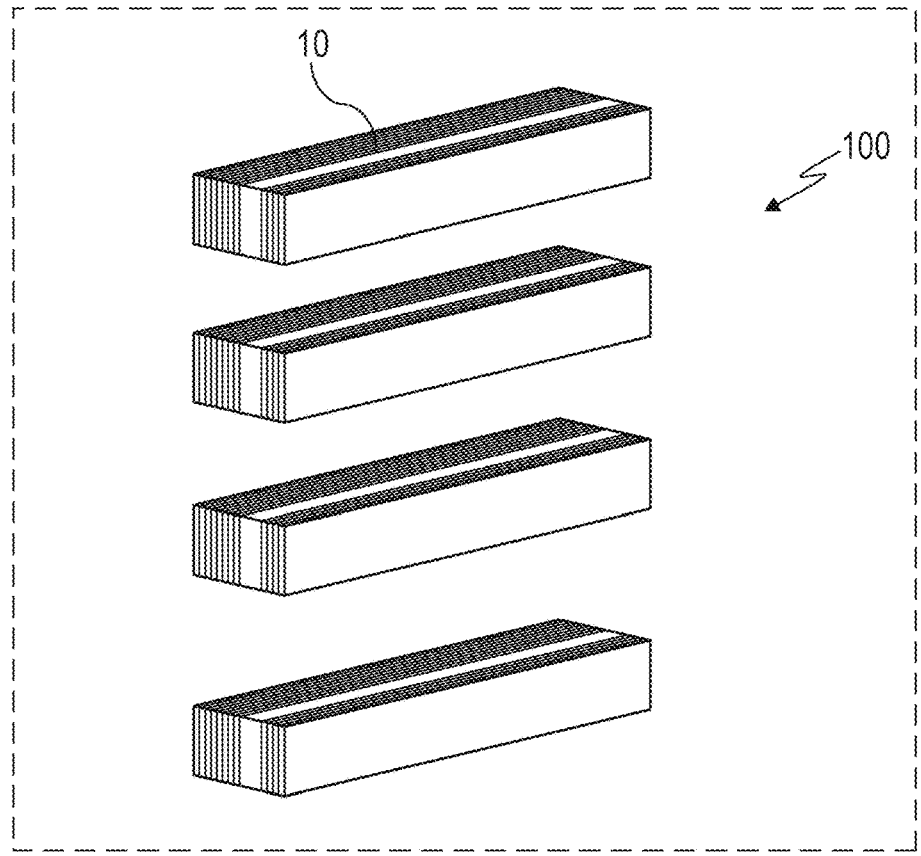
FIG. 41B shows an example configuration of a waveguide array in which waveguide elements are not arrayed at regular intervals.

FIG. 41B shows an example configuration of a waveguide array in which waveguide elements 10 are not arrayed at regular intervals. Even in a case where such a configuration is employed, a two-dimensional scan can be performed by appropriately setting the phase shift amount that each phase shifter imparts. In the configuration shown in FIG. 41B, too, the array direction d1 of the waveguide array and the direction d2 in which each waveguide element 10 extends do not need to be orthogonal to each other.

Examples of Application

Figure 42:
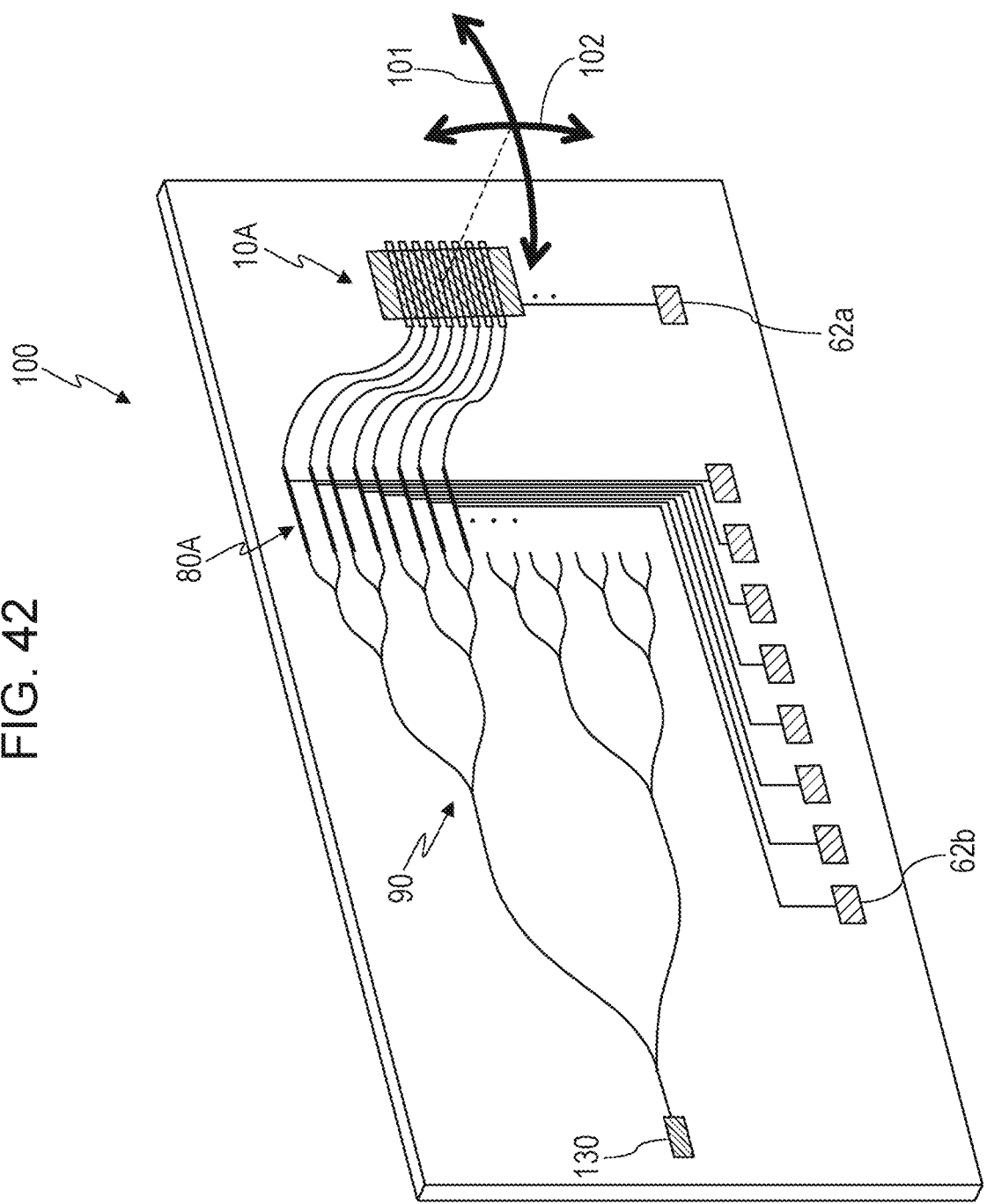
FIG. 42 is a diagram showing an example configuration of an optical scanning device including an integration of elements such as an optical divider, a waveguide array, a phase shifter array, and a light source on a circuit board (i.e., chip)

FIG. 42 is a diagram showing an example configuration of an optical scanning device 100 including an integration of elements such as an optical divider 90, a waveguide array 10A, a phase shifter array 80A, and a light source 130 on a circuit board (e.g., a chip). A possible example of the light source 130 is a light-emitting element such as a semiconductor laser. In this example, the light source 130 emits single-wavelength light whose free space wavelength is λ. The optical divider 90 divides the light from the light source 130 into rays of light and introduces the rays of light into the waveguides of the plurality of phase shifters 80. In the example configuration shown in FIG. 42, an electrode 62*a* and a plurality of electrodes 62*b* are provided on the chip. The waveguide array 10A is supplied with a control signal from the electrode 62*a*. The plurality of phase shifters 80 of the phase shifter array 80A receive control signals from the plurality of electrodes 62*b*, respectively. The electrodes 62*a* and 62*b* can be connected to a control circuit (not illustrated) that generates the aforementioned control signals. The control circuit may be provided on the chip shown in FIG. 42 or may be provided on another chip of the optical scanning device 100.

As shown in FIG. 42, the integration of all components on the chip makes it possible to achieve a wide-range optical scan with a small-size device. All of the components shown in FIG. 42 can be integrated onto a chip measuring, for example, approximately 2 mm by 1 mm.

Figure 43:
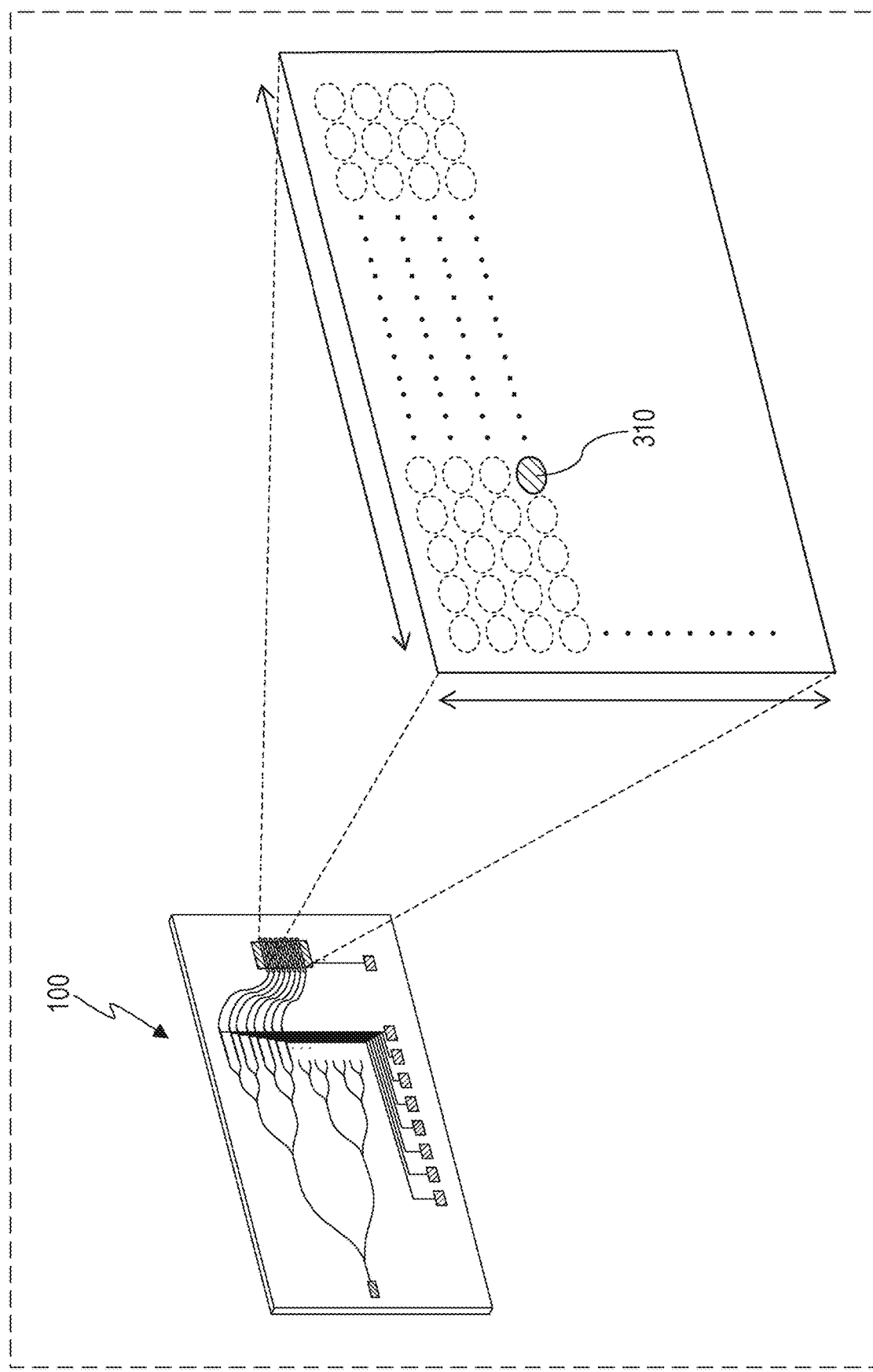
FIG. 43 is a schematic view showing how a two-dimensional scan is executed by radiating a light beam such as a laser far away from the optical scanning device.

FIG. 43 is a schematic view showing how a two-dimensional scan is executed by radiating a light beam such as a laser far away from the optical scanning device 100. The two-dimensional scan is executed by moving the beam spot 310 in horizontal and vertical directions. For example, when combined with a publicly-known TOF (time-of-flight) method, the two-dimensional scan makes it possible to acquire a two-dimensional distance-measuring image. The TOF method is a method for finding the distance by calculating the time of flight of light by observing reflected light from a physical object irradiated with a laser.

Figure 44:
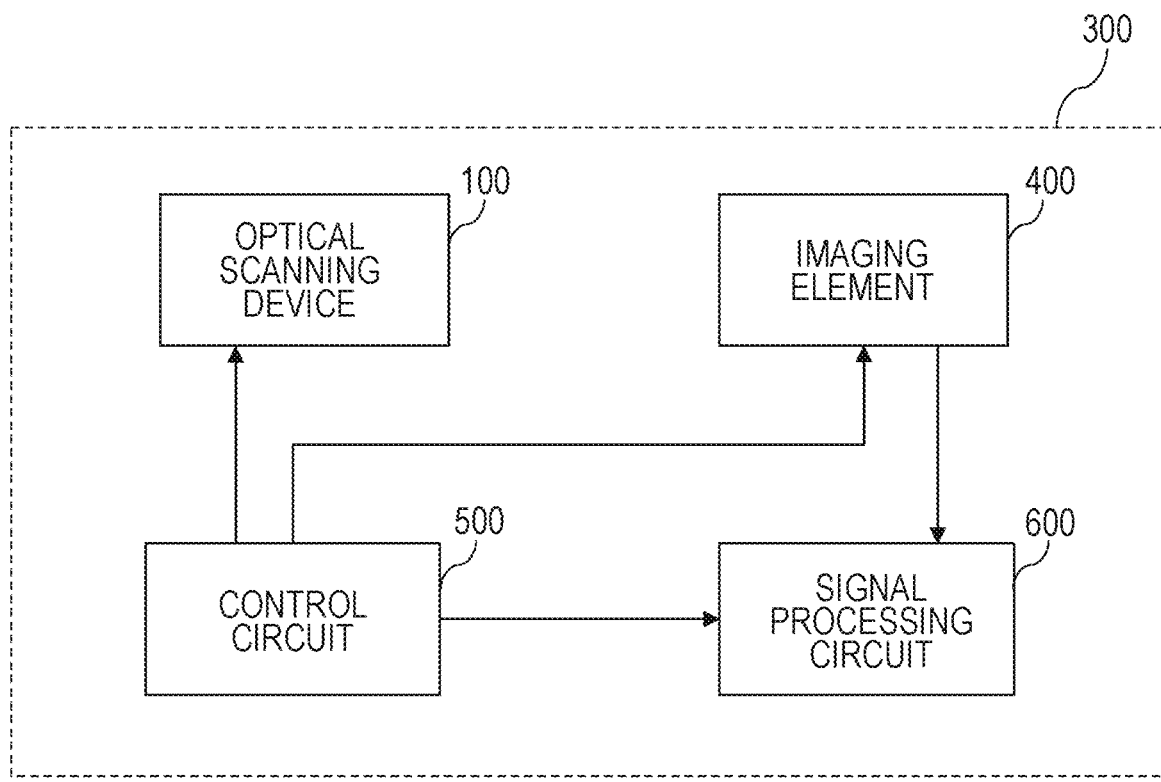
FIG. 44 is a block diagram showing an example configuration of a LiDAR system.

FIG. 44 is a block diagram showing an example configuration of a LiDAR system 300, which is an example of a photo-detection system that can generate such a distance-measuring image. The lidar system 300 includes an optical scanning device 100, an imaging element 400, a signal processing circuit 600, and a control circuit 500. The imaging element 400 detects light emitted from the optical scanning device 100 and reflected from a physical object. A possible example of the imaging element 400 is an image sensor that has sensitivity to the wavelength λ of light that is emitted from the optical scanning device 100. The imaging element 400, which may be an imaging element based on a photodetector in which light receiving elements such as photodiodes are one-dimensionally arrayed, outputs an electric signal corresponding to the amount of light received. The signal processing circuit 600 calculates the distance to the physical object on the basis of the electric signal outputted from the imaging element 400 and generates distance distribution data. The distance distribution data is data (i.e., distance-measuring data) representing a two-dimensional distribution of distance. The control circuit 500 is a processor that controls the optical scanning device 100, the imaging element 400, and the signal processing circuit 600. The control circuit 500 controls the timing of radiation of a light beam from the optical scanning device 100 and the timing of exposure and signal readout of the imaging element 400 and instructs the signal processing circuit 600 to generate a distance-measuring image.

In a two-dimensional scan, a frame rate at which a distance-measuring image is acquired can be selected from among 60 fps, 50 fps, 30 fps, 25 fps, 24 fps, and the like, which are commonly used for moving images. Further, considering application to an onboard system, a higher frame rate allows a distance image to be acquired more frequently and allows an obstacle to be detected more accurately. For example, when a car travels at 60 km/h, a frame rate of 60 fps allows an image to be acquired every time the car travels approximately 28 cm. A frame rate of 120 fps allows an image to be acquired every time the car travels approximately 14 cm. A frame rate of 180 fps allows an image to be acquired every time the car travels approximately 9.3 cm.

The time required to acquire one distance-measuring image depends on the speed of a beam scan. For example, in order for an image of 100×100 resolvable points to be acquired at 60 fps, it is necessary to perform a beam scan at 1.67 µs per point. In this case, the control circuit 500 controls, at an operating speed of 600 kHz, the emission of a light beam by the optical scanning device 100 and the accumulation and readout of signals by the imaging element 400.

Examples of Application to Optical Receiver Devices

A optical scanning device according to the present disclosure can also be used as an optical receiver device with substantially the same configuration. The optical receiver device includes a waveguide array 10A having the same configuration as any of the aforementioned optical scanning devices and a first adjustment element 60 that adjusts the direction of receivable light. Each first mirror 30 of the waveguide array 10A transmits light falling on the side opposite to the first reflecting surface from the third direction. Each optical guiding layer 20 of the waveguide array 10A propagates light transmitted by the first mirror 30 in the second direction. The direction of receivable light can be varied by the first adjustment element 60 changing the refractive index and/or thickness of the optical guiding layer 20 of each waveguide element 10. Furthermore, the optical receiver device includes a plurality of phase shifters 80 or 80a and 80b having the same configuration as any of the aforementioned optical scanning devices and a second adjustment element that varies differences in phase among rays of light that are outputted through the plurality of phase shifters 80 or 80a and 80b from the plurality of waveguide elements 10, the direction of receivable light can be two-dimensionally varied.

For example, an optical receiver device can be configured by replacing the light source 130 of the optical scanning device shown in FIG. 42 with a receiving circuit. When light of wavelength λ falls on the waveguide array 10A, the light is sent to the optical divider 90 through the phase shifter array 80A, finally concentrated on one spot, and sent to the receiving circuit. The intensity of the light concentrated on that one spot can be said to indicate the sensitivity of the optical receiver device. The sensitivity of the optical receiver device can be adjusted by adjustment elements separately incorporated in the waveguide array 10A and the phase shifter array 80A. In the optical receiver device, the direction of the wave vector (thick arrow) is opposite to that shown, for example, in FIG. 18. The incident light has a light component in the direction (X direction) in which the waveguide elements 10 extend and a light component in the array direction (Y direction) of the waveguide elements 10. The sensitivity of the X-direction light component can be adjusted by the adjustment element incorporated in the waveguide array 10A. Meanwhile, the sensitivity of the light component in the array direction of the waveguide elements 10 can be adjusted by the adjustment element incorporated in the phase shifter array 80A. θ and $\alpha_0$ (Expressions (16) and (17)) can be found from the phase difference $\Delta\varphi$ of light and the refractive index $n_w$ and thickness d of each optical guiding layer 20 at which the sensitivity of the optical receiver device reaches its maximum. This makes it possible to identify the direction of incidence of light. The aforementioned embodiments and modifications can be appropriately combined.

An imaging system according to an embodiment of the present disclosure is applicable to the use of a LiDAR system or the like that is mounted on a vehicle such as an automobile, a UAV, or an AGV.

What is claimed is:
1. An imaging system comprising:
   a light-emitting device;
   an image sensor; and
   a control circuit that controls the light-emitting device and the image sensor, wherein
   the light-emitting device includes:
      a light source;
      a first waveguide that propagates light from the light source by means of total reflection;
      a second waveguide; and
      a first adjustment element,
   the second waveguide includes:
      a first multilayer reflective film;
      a second multilayer reflective film facing the first multilayer reflective film; and
      a first optical guiding layer joined directly to the first waveguide and located between the first multilayer reflective film and the second multilayer reflective film,
   the first optical guiding layer has a variable thickness and/or a variable refractive index with respect to the light and propagates the light having propagated through the first waveguide,
   the first multilayer reflective film has a higher light transmittance than the second multilayer reflective film and causes a portion of the light propagating through the first optical guiding layer to be emitted as emitted light toward outside the second waveguide,
   the first adjustment element changes a direction of the emitted light from the second waveguide by changing the thickness of the first optical guiding layer and/or the refractive index of the first optical guiding layer,
   the image sensor includes a plurality of photo-detection cells that receive reflected light from a physical object reflecting at least a portion of the emitted light from the second waveguide,
   each of the photo-detection cells accumulates signal charge corresponding to an amount of light received, and
   the control circuit
      causes the light source to repeatedly emit light pulses as the light,
      causes at least some of the plurality of photo-detection cells to accumulate the signal charge in synchronization with the emission of the light pulses by the light source and thereby causes the image sensor to generate every first period of time a frame based on the signal charge thus accumulated, and
      causes the first adjustment element to change the direction of the emitted light from the second waveguide every second period of time that is shorter than or equal to half the first period of time.

2. The imaging system according to claim 1, wherein the first period of time is n times (where n is an integer or 2 or larger) as long as the second period of time.

3. The imaging system according to claim 1, wherein the control circuit scans an object region by causing the first adjustment element to change the direction of the emitted light from the second waveguide every second period of time, and
   a period of time required to scan the whole object region is equal to or longer than the first period of time.

4. The imaging system according to claim 3, wherein the period of time required to scan the whole object region is m time(s) (where m is an integer of 1 or larger) as long as the first period of time.

5. The imaging system according to claim 1, wherein the control circuit allows only at least one of the photo-detection cells to accumulate the signal charge and does not allow the remaining photo-detection cells to accumulate the signal charge.

6. The imaging system according to claim 1, wherein the control circuit allows some of the plurality of photo-detection cells that are chosen according to a position and size of a light spot that is formed by the light-emitting device to accumulate the signal charge and does not allow the remaining photo-detection cells to accumulate the signal charge.

7. The imaging system according to claim 1, wherein the plurality of photo-detection cells are arrayed in a row-wise direction and a column-wise direction, the light-emitting device forms, within an object region, a light spot extending in a direction corresponding to the row-wise direction or the column-wise direction, and the control circuit moves the light spot every second period of time in a direction perpendicular to the direction in which the light spot extends, and causes the plurality of photo-detection cells to accumulate the signal charge row by row or column by column.

8. The imaging system according to claim 1, further comprising a plurality of one-dimensionally or two-dimensionally arrayed image sensors including the image sensor, wherein the control circuit causes the first adjustment element to change the direction of the emitted light from the second waveguide and thereby causes the reflected light to fall on the plurality of image sensors in sequence so that the plurality of image sensors generate frames in sequence.

9. The imaging system according to claim 1, wherein the emitted light includes a zeroth-order diffracted beam and positive and negative first-order diffracted beams, and the control circuit allows only some of the plurality of photo-detection cells that receive at least portions of the zeroth-order diffracted beam and the positive and negative first-order diffracted beams to accumulate the signal charge and does not allow the remaining photo-detection cells to accumulate the signal charge.

10. The imaging system according to claim 1, wherein the control circuit scans an object region by causing the first adjustment element to change the direction of the emitted light from the second waveguide every second period of time, the imaging system further comprising a signal processing circuit that generates, on the basis of the frame generated by the image sensor, an image signal representing a distance distribution in the object region.

11. The imaging system according to claim 10, wherein the control circuit causes the at least some photo-detection cells to repeatedly accumulate the signal charge more than once in synchronization with the emission of the light pulses within the second period of time and an amount of the signal charge that is accumulated in the at least some photo-detection cells within the second period of time varies according to distance to the physical object, and the signal processing circuit generates, on the basis of at least one frame generated by the image sensor, an image signal representing the distance distribution in the object region.

12. The imaging system according to claim 10, wherein the signal processing circuit measures distance to the physical object on the basis of a period of time from emission of light by the light-emitting device to reception of light by the at least some photo-detection cells.

13. The imaging system according to claim 1, wherein the light has a particular wavelength range, the imaging system further comprising an optical filter that faces the plurality of photo-detection cells and selectively transmits the light of the particular wavelength range.

14. An imaging system comprising:
a light-emitting device;
an image sensor; and
a control circuit that controls the light-emitting device and the image sensor, wherein
the light-emitting device includes:
 a light source;
 a first waveguide that propagates light from the light source by means of total reflection;
 a second waveguide;
 a third waveguide; and
 a first adjustment element,
the second waveguide includes:
 a first multilayer reflective film;
 a second multilayer reflective film facing the first multilayer reflective film; and
 a first optical guiding layer located between the first multilayer reflective film and the second multilayer reflective film,
the third waveguide includes:
 a third multilayer reflective film;
 a fourth multilayer reflective film facing the third multilayer reflective film; and
 a second optical guiding layer located between the third multilayer reflective film and the fourth multilayer reflective film,
the second optical guiding layer is joined directly to the first waveguide and propagates the light having propagated through the first waveguide,
the first optical guiding layer is joined directly to the second optical guiding layer, has a variable thickness and/or a variable refractive index with respect to the light, and propagates the light having propagated through the second optical guiding layer,
the first multilayer reflective film has a higher light transmittance than the second multilayer reflective film and causes a portion of the light propagating through the first optical guiding layer to be emitted as emitted light toward outside the second waveguide,
the first adjustment element changes a direction of the emitted light from the second waveguide by changing the thickness of the first optical guiding layer and/or the refractive index of the first optical guiding layer,
the image sensor includes a plurality of photo-detection cells that receive reflected light from a physical object reflecting at least a portion of the emitted light from the second waveguide,
each of the photo-detection cells accumulates signal charge corresponding to an amount of light received, and
the control circuit
 causes the light source to repeatedly emit light pulses as the light,
 causes at least some of the plurality of photo-detection cells to accumulate the signal charge in synchronization with the emission of the light pulses by the light source and thereby causes the image sensor to generate every first period of time a frame based on the signal charge thus accumulated, and
 causes the first adjustment element to change the direction of the emitted light from the second waveguide every second period of time that is shorter than or equal to half the first period of time.

15. An imaging system comprising:
a light-emitting device;
an image sensor; and
a control circuit that controls the light-emitting device and the image sensor, wherein
the light-emitting device includes:
 a light source;
 a plurality of waveguide units arrayed in a first direction; and
 a first adjustment element,
each of the plurality of waveguide units includes:
 a first waveguide that propagates light from the light source by means of total reflection; and
 a second waveguide, the second waveguide includes:
a first multilayer reflective film;
a second multilayer reflective film facing the first multilayer reflective film; and
a first optical guiding layer joined directly to the first waveguide and located between the first multilayer reflective film and the second multilayer reflective film,
the first optical guiding layer has a variable thickness and/or a variable refractive index with respect to the light and causes the light having propagated through the first waveguide to propagate in a second direction crossing the first direction,
the first multilayer reflective film has a higher light transmittance than the second multilayer reflective film and causes a portion of the light propagating through the first optical guiding layer to be emitted as emitted light toward outside the second waveguide,
the first adjustment element changes a direction of the emitted light from the second waveguide by changing the thickness of the first optical guiding layer and/or the refractive index of the first optical guiding layer, in each of the plurality of waveguide units,
the image sensor includes a plurality of photo-detection cells that receive reflected light from a physical object reflecting at least a portion of the emitted light,
each of the photo-detection cells accumulates signal charge corresponding to an amount of light received, and
the control circuit
causes the light source to repeatedly emit light pulses as the light,
causes at least some of the plurality of photo-detection cells to accumulate the signal charge in synchronization with the emission of the light pulses by the light source and thereby causes the image sensor to generate every first period of time a frame based on the signal charge thus accumulated, and
causes the first adjustment element to change the direction of the emitted light from each second waveguide every second period of time that is shorter than or equal to half the first period of time.

16. The imaging system according to claim 15, further comprising:
a plurality of phase shifters connected between the light source and the plurality of waveguide units and each including a waveguide joined directly to a corresponding first waveguide; and
a second adjustment element that changes the direction of the emitted light from each second waveguide by causing each of the plurality of phase shifters to change a phase of the light propagating to the corresponding first waveguide.

17. The imaging system according to claim 16, wherein the waveguide of each phase shifter contains a material whose refractive index changes in response to application of a voltage or temperature change, and
the second adjustment element changes the refractive index in the waveguide of each phase shifter by applying a voltage to the waveguide or changing the temperature of the waveguide and thereby changes a phase of the light propagating to the first waveguide in each waveguide unit.

18. The imaging system according to claim 16, wherein when a component of a wave vector of the emitted light in the second direction is an X component and a component of the wave vector of the emitted light in the first direction is a Y component, the first adjustment element changes the X component of the wave vector and the second adjustment element changes the Y component of the wave vector.

19. An imaging system comprising:
a light-emitting device;
an image sensor; and
a control circuit that controls the light-emitting device and the image sensor, wherein
the light-emitting device includes:
a light source;
a plurality of waveguide units arrayed in a first direction; and
a first adjustment element,
each of the plurality of waveguide units includes:
a first waveguide that propagates light from the light source by means of total reflection;
a second waveguide; and
a third waveguide,
the second waveguide includes:
a first multilayer reflective film;
a second multilayer reflective film facing the first multilayer reflective film; and
a first optical guiding layer located between the first multilayer reflective film and the second multilayer reflective film,
the third waveguide includes:
a third multilayer reflective film;
a fourth multilayer reflective film facing the third multilayer reflective film; and
a second optical guiding layer located between the third multilayer reflective film and the fourth multilayer reflective film,
the second optical guiding layer is joined directly to the first waveguide and propagates the light having propagated through the first waveguide,
the first optical guiding layer is joined directly to the second optical guiding layer, has a variable thickness and/or a variable refractive index with respect to the light, and causes the light having propagated through the second optical guiding layer to propagate in a second direction crossing the first direction,
the first multilayer reflective film has a higher light transmittance than the second multilayer reflective film and causes a portion of the light propagating through the first optical guiding layer to be emitted as emitted light toward outside the second waveguide,
the first adjustment element changes a direction of the emitted light from the second waveguide by changing the thickness of the first optical guiding layer and/or the refractive index of the first optical guiding layer, in each of the plurality of waveguide units,
the image sensor includes a plurality of photo-detection cells that receive reflected light from a physical object reflecting at least a portion of the emitted light,
each of the photo-detection cells accumulates signal charge corresponding to an amount of light received, and
the control circuit
causes the light source to repeatedly emit light pulses as the light,
causes at least some of the plurality of photo-detection cells to accumulate the signal charge in synchronization with the emission of the light pulses by the light source and thereby causes the image sensor to generate every first period of time a frame based on the signal charge thus accumulated, and causes the first adjustment element to change the direction of the emitted light from each second waveguide every second period of time that is shorter than or equal to half the first period of time.

* * * * *